United States Patent [19]
Carr et al.

[11] Patent Number: 5,404,501
[45] Date of Patent: Apr. 4, 1995

[54] FAULT-TOLERANT METHOD OF COMMUNICATING BETWEEN PROCESSES IN A MULTI PROCESSOR SYSTEM BY KEEPING TRACK OF THE CURRENT NODE LOCATION OF MESSAGES

[75] Inventors: Patricia A. Carr, Hoffman Estates; Bernhard P. Weisshaar, Palatine, both of Ill.

[73] Assignee: Motorola, Inc., Schaumburg, Ill.

[21] Appl. No.: 993,491

[22] Filed: Dec. 21, 1992

Related U.S. Application Data

[63] Continuation of Ser. No. 892,715, May 29, 1992, abandoned, which is a continuation of Ser. No. 402,199, Aug. 31, 1989, abandoned.

[51] Int. Cl.$^6$ ............................................. G06F 11/30
[52] U.S. Cl. ...................... 395/575; 395/200; 395/650; 364/DIG. 1; 364/264.5; 364/266.5; 364/268.9
[58] Field of Search .......................... 371/32, 33, 34; 395/200, 575, 650

[56] References Cited

U.S. PATENT DOCUMENTS

| | | | |
|---|---|---|---|
| 3,979,719 | 9/1976 | Tooley et al. | 371/32 |
| 4,032,899 | 6/1977 | Jenny et al. | 364/200 |
| 4,530,051 | 7/1985 | Johnson et al. | 364/200 |
| 4,630,196 | 12/1986 | Bednar, Jr. et al. | 364/200 |
| 4,654,654 | 3/1987 | Butler et al. | 370/94.1 |
| 4,694,396 | 9/1987 | Weisshaar et al. | 364/200 |
| 4,725,834 | 2/1988 | Chang et al. | 370/85.4 |
| 4,745,593 | 5/1988 | Stewart | 371/33 |
| 4,754,395 | 6/1988 | Weisshaar et al. | 364/200 |
| 4,803,685 | 2/1989 | Oget | 371/33 |
| 4,835,685 | 5/1989 | Kun | 364/200 |
| 4,866,707 | 9/1989 | Marshall et al. | 371/32 |
| 4,896,261 | 1/1990 | Nolan | 364/200 |
| 4,914,583 | 4/1990 | Weisshaar et al. | 364/200 |

Primary Examiner—Paul V. Kulik
Assistant Examiner—John C. Loomis
Attorney, Agent, or Firm—Michael D. Bingham

[57] ABSTRACT

A method for communicating between processes in a data processing system comprising a plurality of processor hosts each coupled to a network and a plurality of processes resident on different ones of said processor hosts, wherein messages are transmitted from one process to another in a logical ring. A message-holding queue is maintained at any host originating a message transmission, and it contains a copy of the message, an identifier of the initiating processor host, and an identifier of the target processor host. A forward notification message is returned to the originating host from a forwarding host when the forwarding host relays the message to another host, and an identical forward notification message is returned to the originating host by the target host when it receives the message. If the host on which the message currently resides becomes separated from the initiating host or terminates operation, or if any process becomes inactive after receiving the message and before relaying it to the next host or is unable to relay the message, flags may be set in the message, and, if necessary, the originating host retransmits the message into the logical ring.

7 Claims, 17 Drawing Sheets

FAULT-TOLERANT METHOD OF COMMUNICATING BETWEEN PROCESSES IN A MULTI PROCESSOR SYSTEM BY KEEPING TRACK OF THE CURRENT NODE LOCATION OF MESSAGES

This application is a continuation of prior application Ser. No. 07/892,715, filed on May 29, 1992, now abandoned, which is a continuation of prior application Ser. No. 07/402,199, filed Aug. 31, 1989, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED INVENTIONS

The present invention is related to the following inventions, all filed on May 6, 1985 and assigned to the assignee of the present invention:

1. U.S. Pat. No. 4,754,395, "Network Interface Module With Minimized Data Paths" Bernhard Weisshaar, Michael Barnea 2. U.S. Pat. No. 4,694,396, "Method of InterProcess Communication in a Distributed Data Processing System" Bernhard Weisshaar, Andrew Kun, Frank Kolnick, Bruce Mansfield 3. U.S. Pat. No. 5,047,925 "Logical Ring in a Virtual Single Machine", Andrew Kun, Frank Kolnick, Bruce Mansfield

TECHNICAL FIELD

This invention relates generally to digital data processing, and, in particular, to an improved method for communicating in a logical ring between processes in a message-based data processing system.

BACKGROUND OF THE INVENTION

The present invention is implemented in a distributed data processing system—that is, two or more data processing systems which are capable of functioning independently but which are so coupled as to send and receive messages to and from one another.

A Local Area Network (LAN) is an example of a distributed data processing system. A typical LAN comprises a number of autonomous data processing "nodes", each comprising at least a processor and memory.

Each node is capable of conducting data processing operations independently. In addition, each node is coupled by appropriate means to a network of other nodes.

As mentioned above, the present invention finds utility in such a distributed data processing system, since there is a need in such a system for processes which are executing or which are to be executed in the individual nodes to share data and to communicate data among themselves via messages.

A "process", as used within the present invention, is defined as a self-contained package of data and executable procedures which operate on that data, comparable to a "task" in other known systems.

Every process in the distributed data processing system of the present invention has a unique identifier (Connector) by which it can be referenced. The Connector is assigned by the system when the process is created, and it is used by the system to physically locate the process. A Connector comprises both a Process I.D. (PID) and a network node address, which together form a unique systemwide identifier.

Every process also has a non-unique, symbolic "name", which is a variable-length string of characters. In general, the name of a process is known system-wide.

A "message" is a buffer containing data which tells a process what to do and/or supplies it with information it needs to carry out its operation. Each message buffer can have a different length. By convention, the first field in the message buffer defines the type of message.

Within the present invention, messages are the only way for two processes to exchange data. Messages are also the only form of dynamic memory that the system handles. A request to allocate memory therefore returns a block of memory which can be used locally by the process but can also be transmitted to another process.

Messages provide the mechanism by which hardware transparency is achieved. A process located anywhere in the system may send a message to any other process anywhere else in the system (even on another processor) if it knows the process name. This means that processes can be dynamically distributed across the system at any time to gain optimal throughput without changing the processes which reference them. Resolution of destinations is done by searching the process name space.

In this system, a process may designate that a message be sent in Logical Ring Mode, meaning that the message will be sent around a logical ring of processes each with the same symbolic name until the message returns to the originating process. The logical ring is dynamic, as new processes with the designated name may be created and old processes with the name may be deleted. No one process need know how large the logical ring is at any time. When a message is sent in Logical Ring Mode, each process of the logical ring will receive the message before any process in the logical ring receives it a second time.

A system implemented in accordance with the foregoing concepts is described, for example, in Related Inventions Nos. 1–3.

However, in an implementation of the foregoing distributed message-based data processing system at least two significant problems may occur. The first is when a process originates a Logical Ring Message which is sent to a process on another node, and the node on which the Logical Ring Message resides becomes inaccessible from the node of the Initiating Process. The second is when the process holding the Logical Ring Message for some reason becomes terminally inactive (i.e. it faults or terminates) before retransmitting the Logical Ring Message to the next process in the logical ring. In a prior art system, the Initiating Process would have to wait indefinitely or until a time-out notification.

The present invention solves these problems by ensuring that in either case the Initiating Process receives the Logical Ring Message back with an indication that the logical ring has been broken.

BRIEF SUMMARY OF INVENTION

Accordingly, it is an object of the present invention to provide an improved method for communicating in a logical ring between processes in a message-based data processing system It is also an object of the present invention to provide an improved method for communicating in a logical ring between processes in a data processing system, wherein an originating node is kept informed of the progress of a transmitted message as it traverses the logical ring consisting of processes receiving the message.

It is another object of the present invention to provide an improved method for communicating in a logical ring between processes in a data processing system, wherein if a node or process fault prevents a message from traversing the logical ring of processes, the originating node is notified, and it retransmits the message into the logical ring.

These and other objects are achieved in accordance with a preferred embodiment of the invention by providing a method for communicating between processes in a data processing system comprising a plurality of processor nodes each coupled to a network and a plurality of processes resident on different ones of the processor nodes, the method comprising the steps of (a) transmitting a first message from a first process resident on a first of the processor nodes to a second process resident on a second of the processor nodes; and (b) providing at the first processor node a message-holding queue and storing in an entry thereof a copy of the first message, a first identifier identifying the first process, and a second identifier identifying the second processor node.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 16 shows a flowchart illustrating how a Forward Notification Message is handled according to the present invention.

OVERVIEW OF COMPUTER SYSTEM

Figure 1:
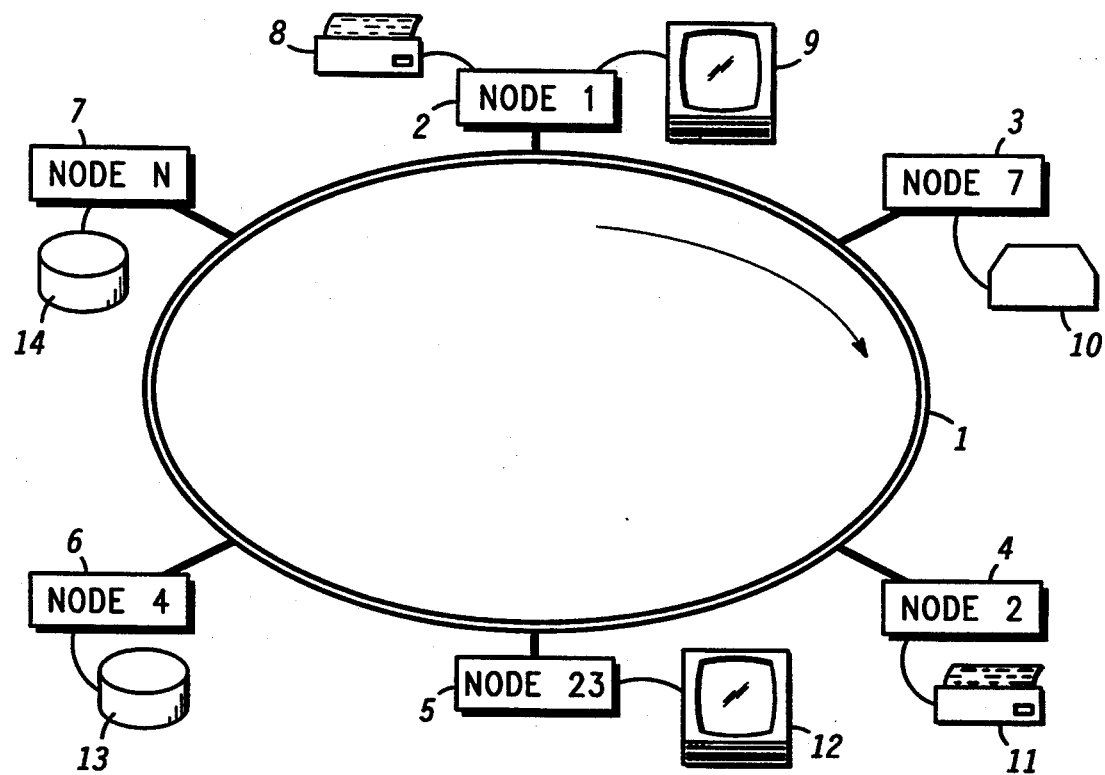
FIG. 1 shows a representational illustration of a single network, distributed message-based data processing system of the type incorporating the present invention.

With reference to FIG. 1, a distributed computer configuration is shown comprising multiple nodes or hosts 2–7 loosely coupled by a local area network (LAN) 1. The number of hosts which may be connected to the network is arbitrary and depends upon the user application. Each host comprises at least a processor and memory, as will be discussed in greater detail with reference to FIG. 2 below. In addition, each host may also include other units, such as a printer 8, operator display module (ODM) 9, mass memory module 13, and other I/O device 10.

Figure 2:
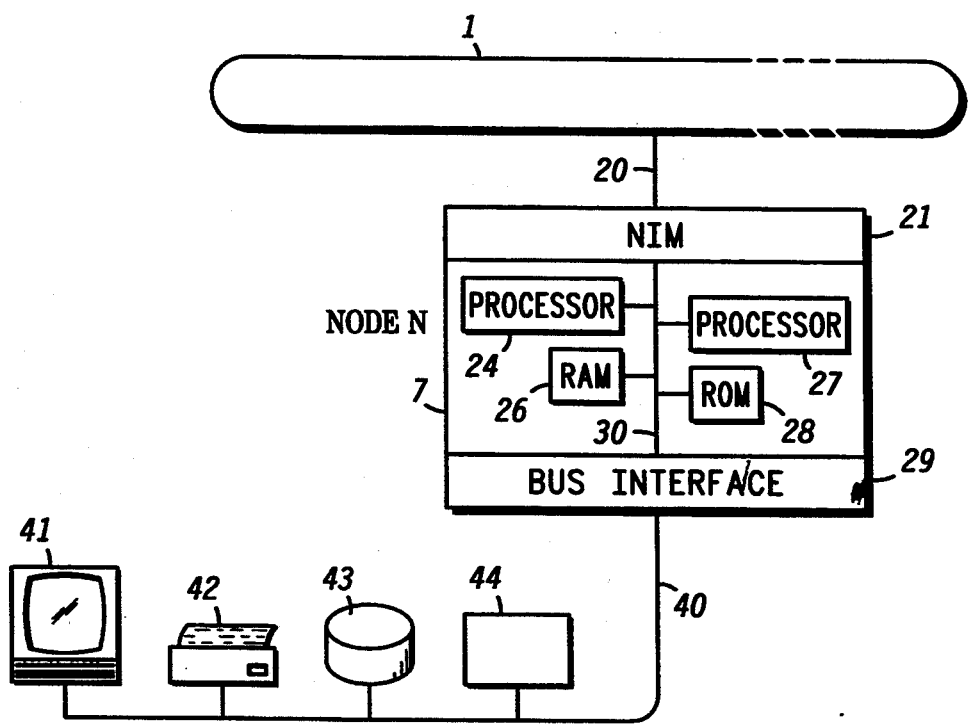
FIG. 2 shows a representational illustration of a node as used in the present invention.

With reference now to FIG. 2, a representational illustration of a host as used in the present invention is shown. A local area network (LAN) 1 comprises several hosts only one of which (Host N) is illustrated.

Representative host N (7, FIG. 2) comprises a processor 24 which, in a preferred embodiment, is a processor from the Motorola 68000 family of processors, such as the commercially available MC68030 32-bit microprocessor.

Each host further includes a read only memory (ROM) 28 and a random access memory (RAM) 26. In addition, each host includes a Network Interface Module (NIM) 21, which connects the host to the LAN, and a Bus Interface 29, which couples the host to additional devices within a host.

A host is capable of supporting several peripheral devices, such as an Operator Display Module (ODM) 41 and an I/O Module 44. Additional processors, such as processor 27, can be provided within a host. Other additional devices may comprise, for example, a printer 42, and a mass-storage module 43 which supports a hard disk and a back-up device (floppy disk or streaming tape drive).

The Operator Display Module 41 provides a keyboard and screen to enable an operator to input information and receive visual information.

The system is particularly designed to provide an integrated solution for factory automation, data acquisition, and other real-time applications. As such, it includes a full complement of services, such as a graphical output, windows, menus, icons, dynamic displays, electronic mail, event recording, and file management.

While a single host may comprise all of the above units, in the typical user application individual hosts will normally be dedicated to specialized functions. For example, one or more mass storage hosts may be set up to function as data base servers. There may also be several operator consoles and at least one host for generating hard-copy printed output. Either these same hosts, or separate dedicated hosts, may execute particular application programs.

As shown in FIG. 2, a host may comprise two or more processors, also referred to herein as "hosts". Each host is assigned a unique identification comprising a Host I.D. and a CPU I.D. The Host I.D. is identical for all hosts within the same host, while the CPU I.D. is unique for each host within the host.

DETAILED DESCRIPTION
ROBUST LOGICAL RING TRANSMISSION MODE

Robust Logical Ring (RLR) Transmission Mode is a special type of message transmission mode. It enables a process (Initiating Process) which has originated a Logical Ring Message to be notified if a process (Receiving Process) receiving such message dies before retransmitting it or if the host on which the Receiving Process resides becomes disconnected from the Initiating Host.

Each host maintains a Logical Ring Message-Holding Queue for storing a copy of each RLR Message initiated by processes resident on such host. An RLR Message is enqueued in this Logical Ring Message-Holding Queue when such message is successfully transmitted to the first off-host process in the Logical Ring.

Each entry in the RLR Message-Holding Queue includes an Initiating Process identifier portion which identifies Q the Initiating Process. This Initiating Process identifier portion is assigned to the RLR Message by the NIM process of the host containing the Initiating Process (i.e. the Initiating Host). The Initiating Process identifier is stored in the "channel field" of the Logical Ring connector in the message header. The Initiating Process identifier is preserved as the RLR Message is FORWARDed around the Logical Ring.

Each entry also includes a Current Host identifier portion which identifies the host on which the RLR Message currently resides.

MESSAGE STRUCTURES

To provide messaging within the present invention, the kernel defines and maintains several data structures which define to it the concept of a message.

Figure 3:
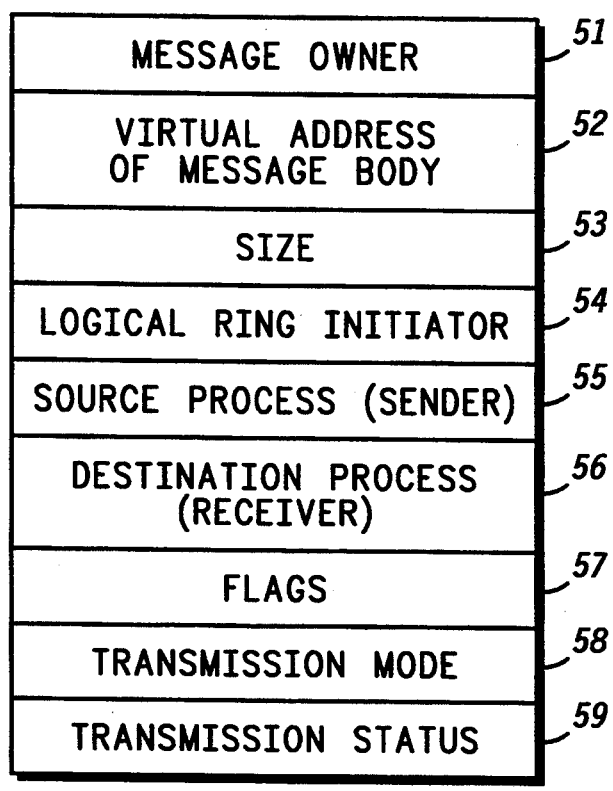
FIG. 3 shows a representation of the significant portions of a message header as used in the present invention.

FIG. 3 shows a representation of a message header as used in the present invention. The message header comprises a portion 51 for indicating which process, if any, currently owns the message; portion 52 which provides the virtual address of the message body; portion 53 providing the size of the message; portion 54 providing the connector of the process which initiated the logical ring transmission; portion 55 which provides the connector of the process sending the message; portion 56 which provides the connector of the process which is to receive the message; portion 57 providing one or more flags, (e.g. a ROBUST flag, indicating whether the message was sent using RLR Mode or not); portion 58 indicating what transmission mode the message is being sent in; and portion 59 indicating certain status conditions of the transmission of the message.

Figure 4:
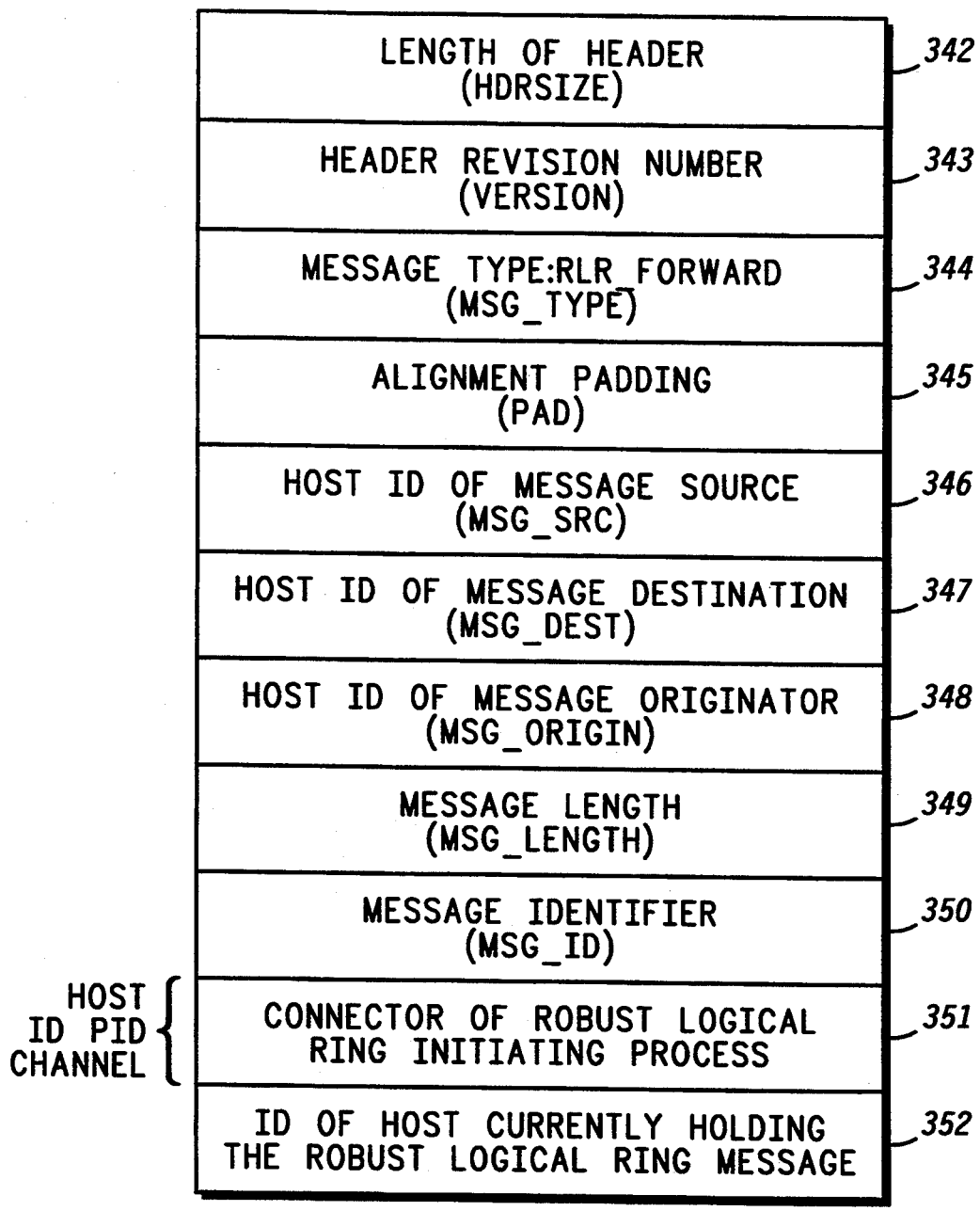
FIG. 4 shows a representation of the significant portions of a Forward Notification Message structure as used in the present invention.

FIG. 4 shows a more detailed representation of a portion of a Forward Notification Message structure, including the message header portion, as used in the present invention. As further explained below, the Forward Notification Message is sent to the Initiating Host by both the forwarding host and the receiving host.

The RLR Forward Notification Message comprises a portion 342 representing the header size; portion 343 representing the header version; and a portion 344 representing the message type. The message type portion 344 is significant regarding the present invention. It determines, for example, whether the message is a Forward Notification Message (FIG. 4) or a Flush RLR Message (FIG.

The message header shown in FIG. 4 also comprises portion 345 indicating alignment padding; portion 346 representing the host identifier of the message source; portion 347 representing the host identifier of the message destination; portion 348 representing the host identifier of the message originator; portion 349 representing the message length; and portion 350 representing a message identifier.

The Forward Notification Message shown in FIG. 4 also comprises portion 351 representing the connector of the RLR Initiating Process and portion 352 representing the connector of the host currently holding the RLR Message (i.e. the Current Host).

Figure 5:
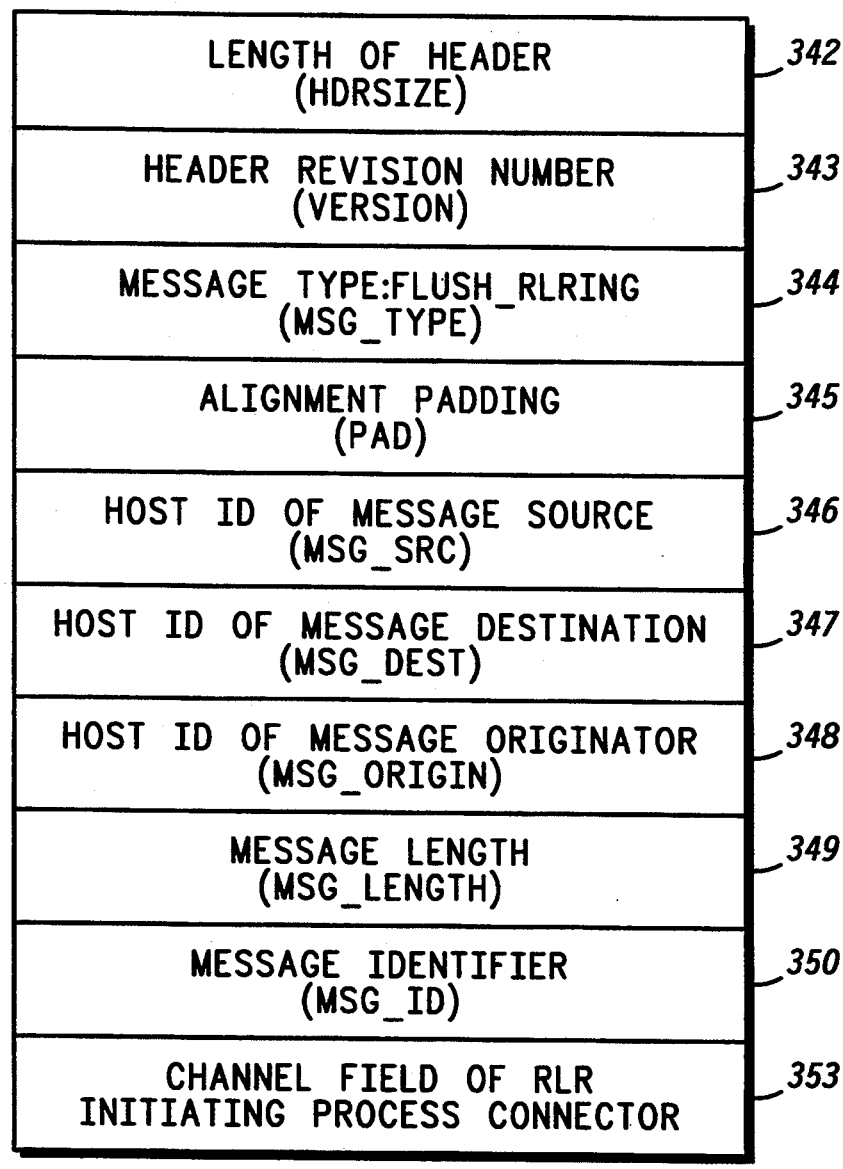
FIG. 5 shows a representation of the significant portion of a Flush Message structure as used in the present invention.

FIG. 5 shows a representation of the significant portion of a Flush Message structure, including the message header portion, as used in the present invention. As explained in greater detail below, the Flush Message is sent to the NIM process of the Initiating Host to terminate monitoring of the specified RLR Message as a result of its being freed or taken out of RLR Mode.

The Flush Message structure comprises a header portion essentially identical to that illustrated in FIG. 4 and described above regarding the Forward Notification Message, except in FIG. 5 the Message Type portion 344 indicates that the message is a Flush RLR Message.

The Flush Message structure shown in FIG. 5 also comprises portion 353 representing the channel field of the connector of the RLR Initiating Process.

LOGICAL RING MESSAGE-HOLDING QUEUE

Figure 6:
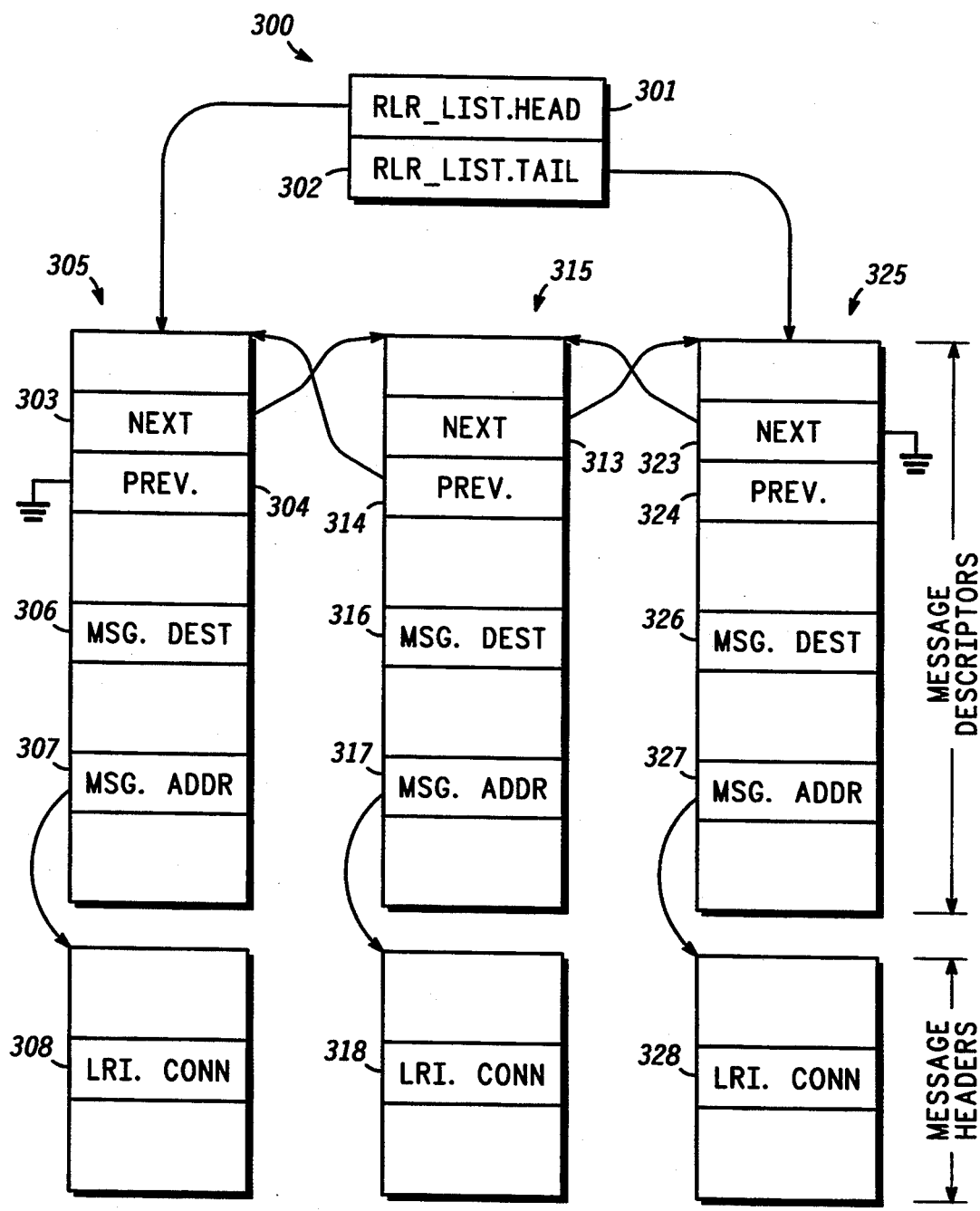
FIG. 6 shows a conceptual representation of a Logical Ring Message-Holding Queue associated with a node.

FIG. 6 shows a conceptual representation of a Robust Logical Ring (RLR) Message-Holding Queue 300 associated with a host. RLR Message-Holding Queue 300 may be implemented within the random access memory (e.g. RAM 26, FIG. 2) of the corresponding host.

The RLR Message-Holding Queue 300 comprises a number of entries (e.g. 305, 315, 325) each containing information about an RLR Message.

As shown in FIG. 6, the upper portion of each entry contains the Message Descriptor, whereas the lower portion contains the Message Header.

The Message Descriptor portion comprises an entry (303, 313, 323) pointing to the next RLR Message in the RLR Message-Holding Queue 300 and an entry (304, 314, 324) pointing to the previous RLR Message in the queue. The Message Descriptor portion also contain an entry (306, 316, 326) indicating the Message Destination and an entry (307, 317, and 327) providing the Message Address, which points to the corresponding Message Header portion.

The Message Header portion comprises an entry (308, 318, 328) containing the Logical Ring Initiator Connector (i.e. the connector of the Initiating Process). FIG. 3 shows additional detail concerning the Message Header structure.

The RLR Message-Holding Queue 300 also comprises a pointer 301 (RLR LIST.HEAD) to the RLR Message at the top of the list of RLR Messages and a pointer 302 (RLR LIST.TAIL) to the RLR Message at the end of the list of RLR Messages.

Figure 7:
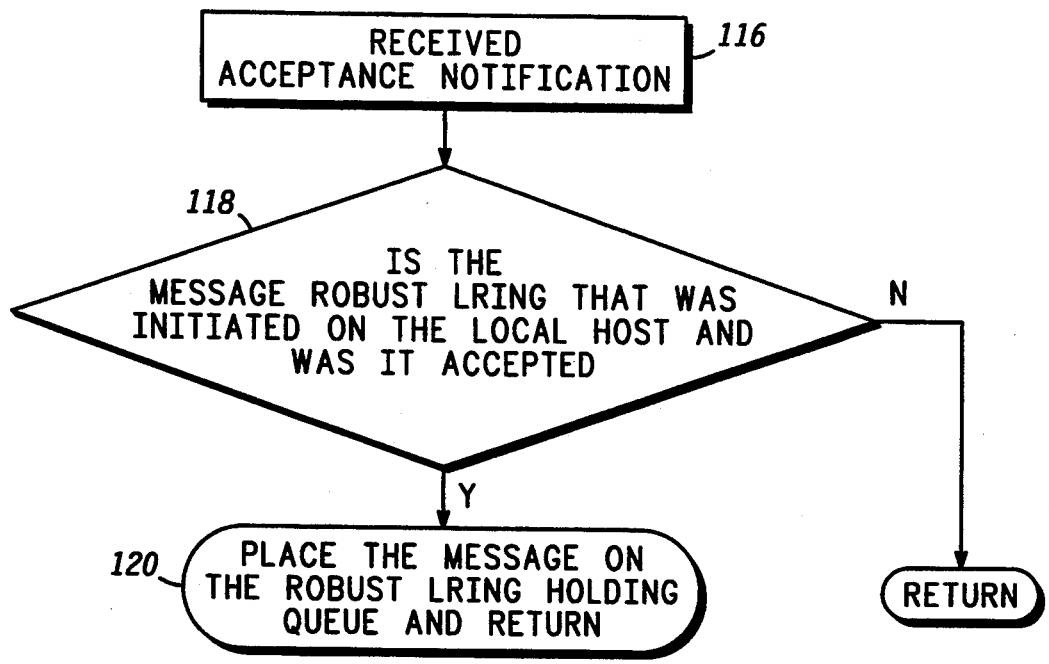
FIG. 7 shows a flowchart illustrating how an entry is made into the RLR Holding Queue according to the present invention.

FIG. 7 shows a flowchart illustrating how an entry is made into the RLR Holding Queue according to the present invention. (In flow diagrams illustrated in FIGS. 7-20 the numbers adjacent to the various blocks correspond to line numbers in the associated code listings.)

In block 116 an acceptance notification is received. Next, in decision block 118 a determination is made whether the message is an RLR Message that was initiated on the local host and whether it was accepted. If NO, the routine exits. If YES, in block 120 the message is placed on the RLR Holding Queue and the routine returns.

Figure 8:
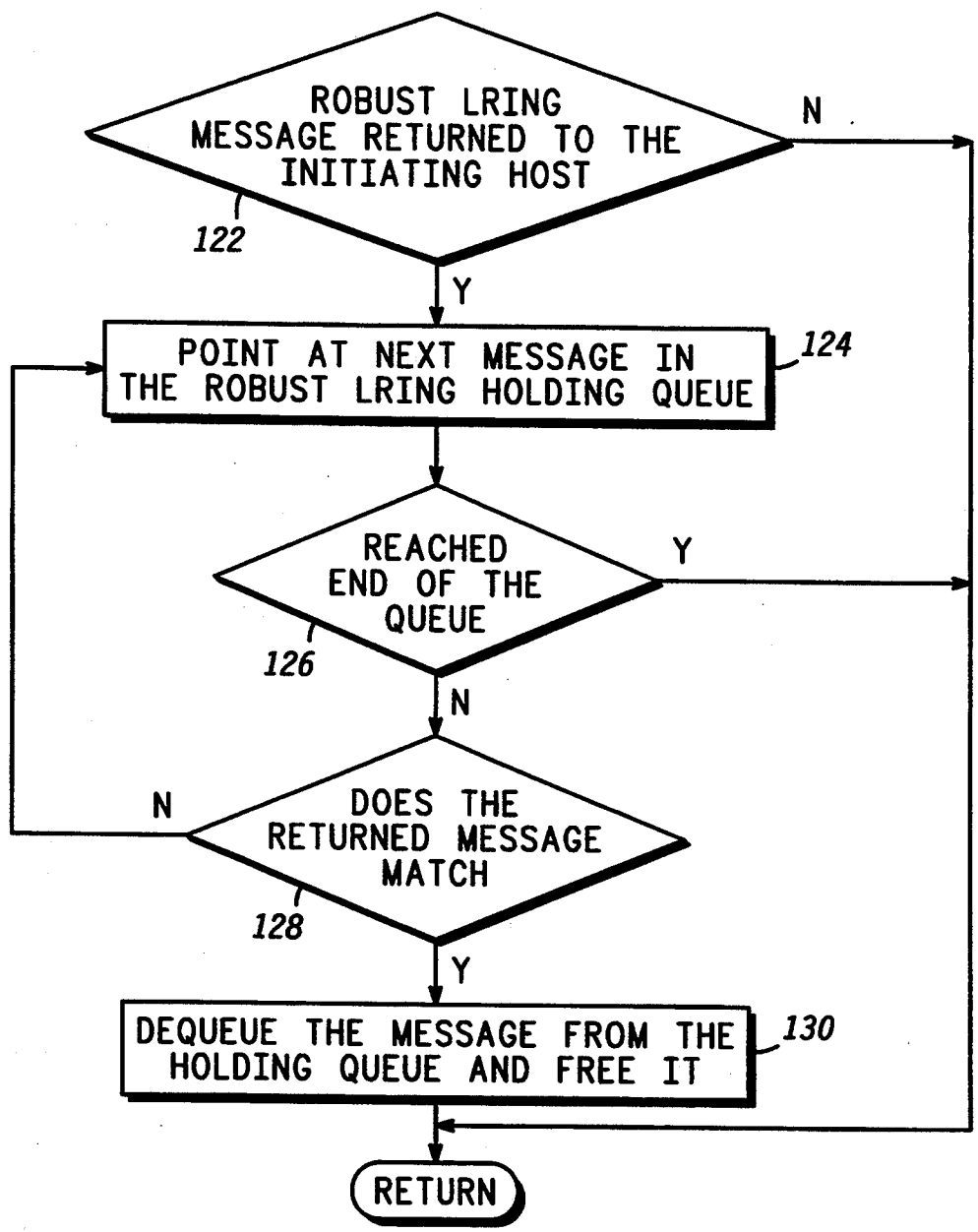
FIG. 8 shows a flowchart illustrating how an entry is deleted from the RLR Holding Queue upon normal completion of an RLR Mode transmission according to the present invention.

FIG. 8 shows a flowchart illustrating how an entry is deleted from the RLR Holding Queue upon normal completion of an RLR Mode transmission according to the present invention.

In decision block 122, if the RLR Message is not returned to the Initiating Process, the routine exits; but if it is returned to the Initiating Process, the routine proceeds to block 124 where a pointer is set at the next message in the RLR Holding Queue. From block 124 the routine proceeds to decision block 126, where if the end of the Holding Queue has been reached, the routine exits; if it has not been reached, the routine proceeds to decision block 128.

In decision block 128, if the returned message matches, the routine proceeds to block 130; if it does not match, the routine returns to block 124. In block 130, the message is dequeued from the RLR Holding Queue and is freed. From block 130, the routine exits.

MONITORING LOCATION OF ROBUST LOGICAL RING MESSAGE

Figure 9:
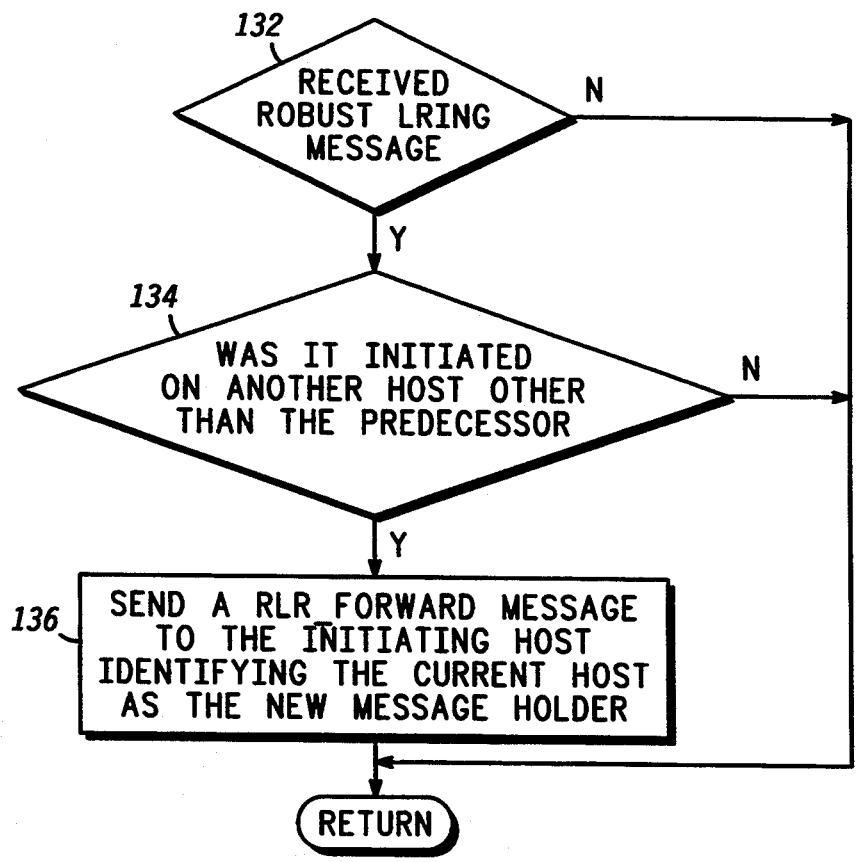
FIG. 9 shows a flowchart illustrating how the NIM process of the Initiating Host is informed of the current location of an RLR Message by means of a Forward Notification Message from the target process according to the present invention.

FIG. 9 shows a flowchart illustrating how the NIM process of the Initiating Host is informed of the current location of an RLR Message by means of a Forward Notification Message from the target process according to the present invention.

In decision block 132, if a received message is an RLR Message, the routine proceeds to decision block 134; if not the routine exits. In decision block 134, a determination is made whether the received message was initiated on another host besides the predecessor; if so, the routine proceeds to block 136, where an RLR FORWARD message is sent to the NIM process of the Initiating Host identifying the current host as the new message holder; if not, the routine exits.

Figure 10:
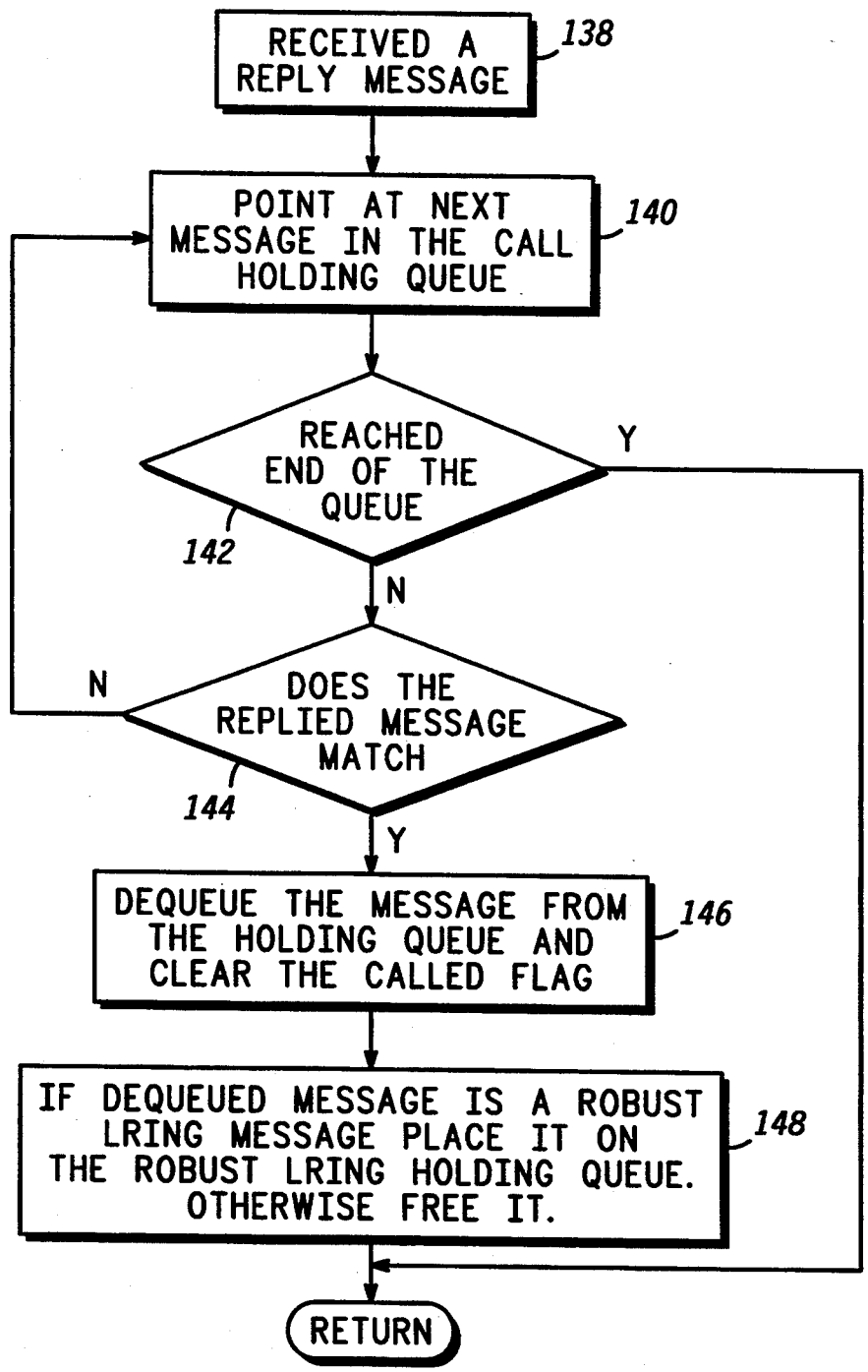
FIG. 10 shows a flowchart illustrating how a reply to a called RLR Message is handled according to the present invention.

FIG. 10 shows a flowchart illustrating how a reply to a called RLR Message is handled according to the present invention.

In block 138, a reply message is received, and the routine proceeds to block 140, where a pointer is set to the next message in the call Holding Queue. From block 140 the routine proceeds to decision block 142, where, if the end of the Holding Queue has been reached, the routine exits; if not, it proceeds to decision block 144.

In decision block 144, a determination is made whether the received reply message matches the message in the call Holding Queue; if so, the routine proceeds to block 146, where the message is dequeued from the Holding Queue, and the CALLED flag is cleared; if the messages did not match, the routine returns to block 140.

From block 146 the routine proceeds to block 148, where the dequeued message is placed on the RLR Holding Queue if it is an RLR Message; otherwise it is freed. From block 148, the routine exits.

Figure 11:
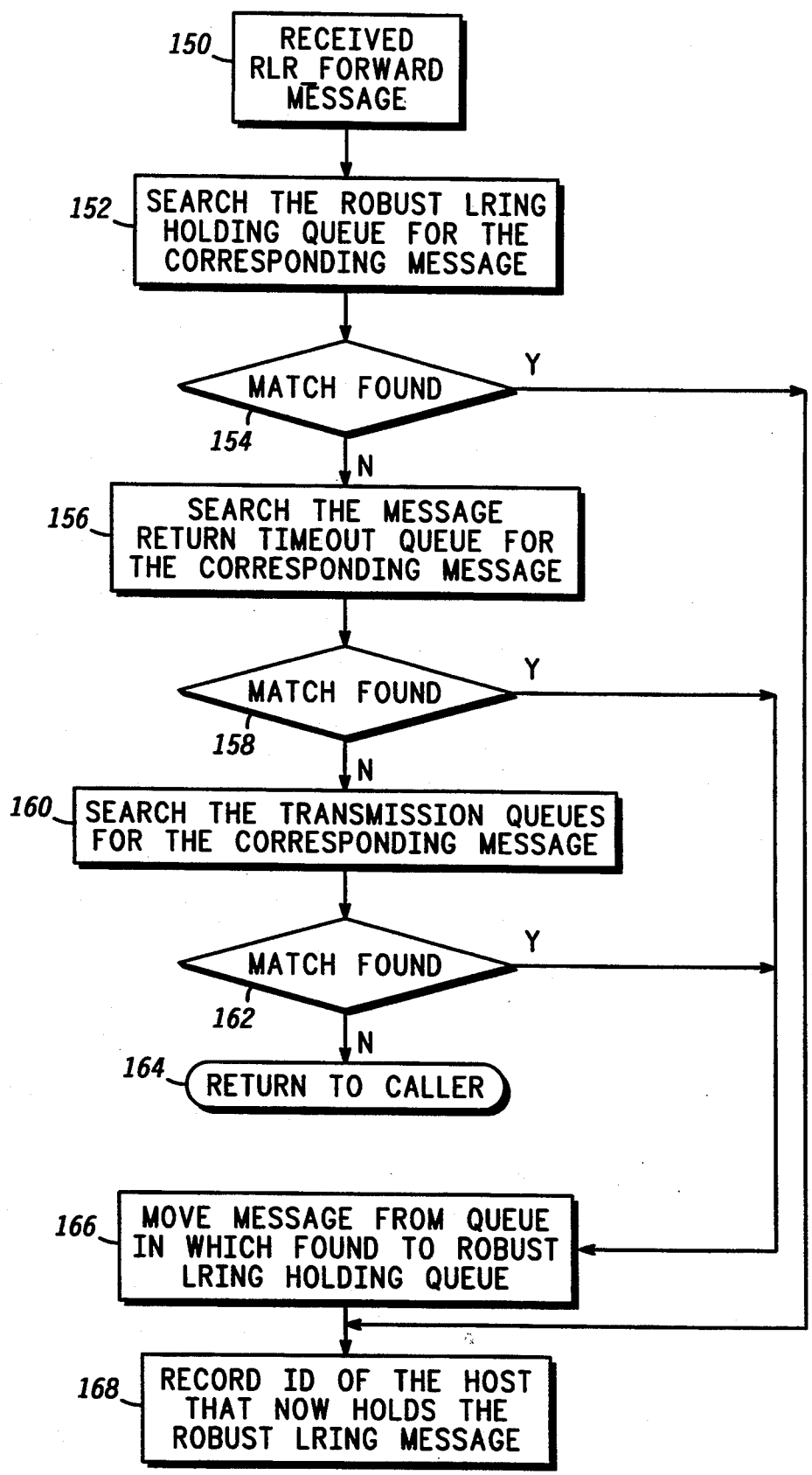
FIG. 11 shows a flowchart illustrating how a Forward Notification Message is handled according to the present invention.

FIG. 11 shows a flowchart illustrating how the receipt of a Forward Notification Message is handled according to the present invention.

In block 150, a received RLR FORWARD message is received, and the routine proceeds to block 152, where the RLR Holding Queue is searched for the corresponding message.

From block 152, the routine proceeds to decision block 154, where, if a match is found, the routine proceeds to block 168; if a match is not found, the routine proceeds to block 156, where the message return time-out queue is searched for the corresponding message.

From block 156, the routine proceeds to decision block 158, where, if a match is found, the routine proceeds to block 166; if a match is not found, the routine proceeds to block 160, where the transmission queues are searched for the corresponding message.

From block 160, the routine proceeds to decision block 162, where, if a match is found, it proceeds to block 166; if not found, it proceeds to block 164, where the routine is returned to the caller.

In block 166, the message is moved from the queue in which it is found to the RLR Holding Queue, and the routine proceeds to block 168, where the identification number of the host currently holding the RLR Message is recorded.

Figure 12:
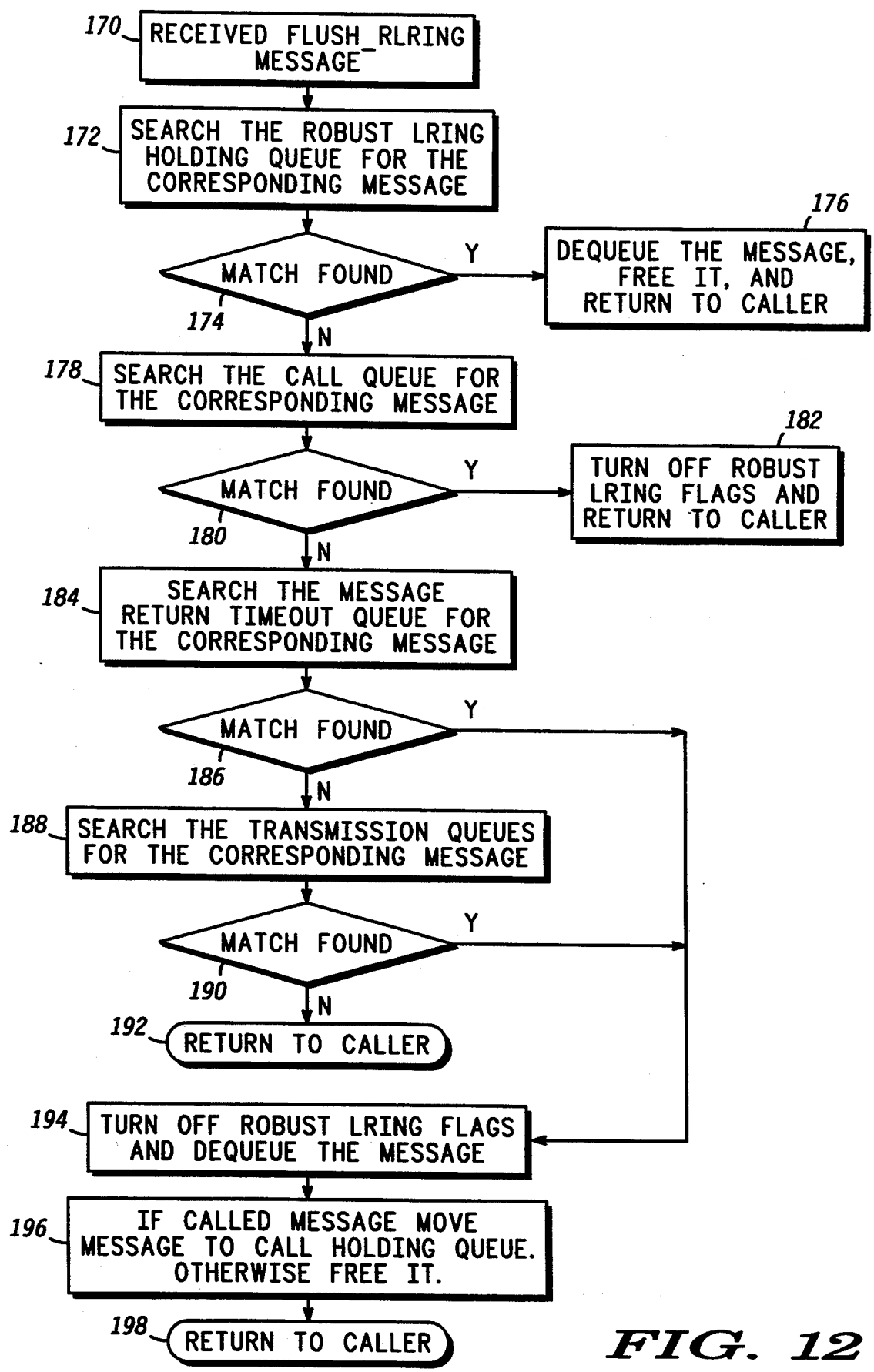
FIG. 12 shows a flowchart illustrating how a notification to flush an RLR Message is handled according to the present invention.

FIG. 12 shows a flowchart illustrating how a notification to flush an RLR Message is handled according to the present invention.

In block 170, a FLUSH_RLRING message is received, and the routine proceeds to block 172, where the RLR Holding Queue is searched for the corresponding message. From block 172 the routine proceeds to decision block 174, where, if a match is found, it proceeds to block 176, where the message is dequeued, freed, and returned to the caller; if no match is found, the routine proceeds to block 178, where the call queue is searched for the corresponding message.

From block 178, the routine proceeds to decision block 180, where, if a match is found, it proceeds to block 182, where the RLR flags are turned off, and a return is made to the caller; but if a match is not found in decision block 180, the routine proceeds to block 184, where the message return time-out queue is searched for the corresponding message.

From block 184, the routine proceeds to decision block 186, where, if a match is found, the routine proceeds to block 194; but if no match is found, the routine proceeds to block 188, where the transmission queues are searched for the corresponding message.

From block 188, the routine proceeds to decision block 190, where, if a match is found, the routine continues to block 194; but if not found it proceeds to block 192, where a return to the caller is made.

In block 194, RLR flags are turned off, the message is dequeued, and the routine proceeds to block 196. In block 196, the message is moved to the call holding queue if the message is a called message; otherwise it is freed. From block 196, the routine proceeds to block 198, where a return to the caller is made.

Figure 13:
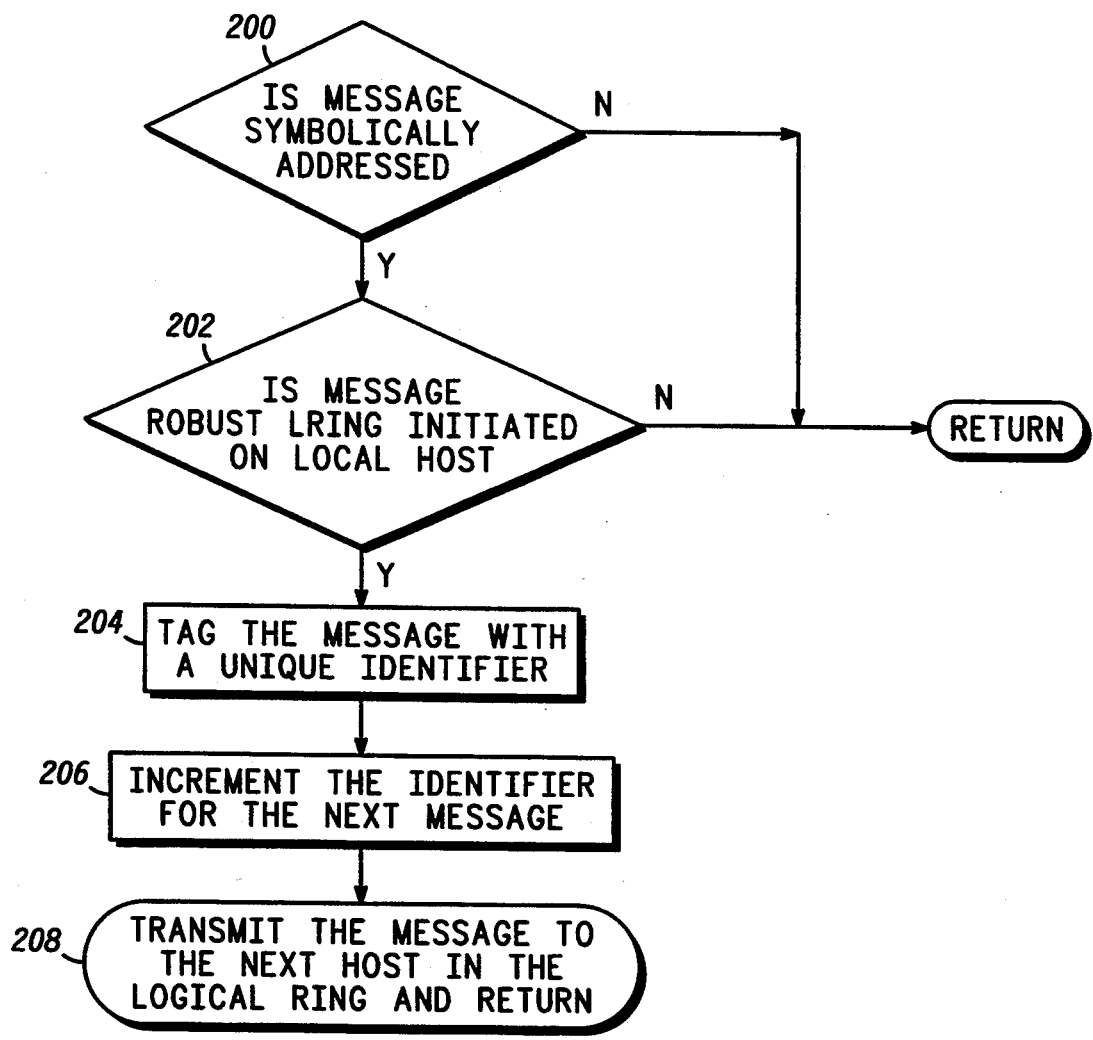
FIG. 13 shows a flowchart illustrating how an Initiating Process identifier is generated according to the present invention.

FIG. 13 shows a flowchart illustrating how an Initiating Process Identifier is generated according to the present invention.

If a message is symbolically addressed, the routine proceeds to decision block 202; if not, it exits. In decision block 202, if the message is an RLR Message initiated on a local host, the routine proceeds to block 204, where the message is tagged with a unique identifier; if not, the routine exits.

From block 204, the routine proceeds to block 206, where the identifier for the next message is incremented, and the routine then proceeds to block 208, where the message is transmitted to the next host in the Logical Ring, and the routine is returned to the caller.

Figure 14:
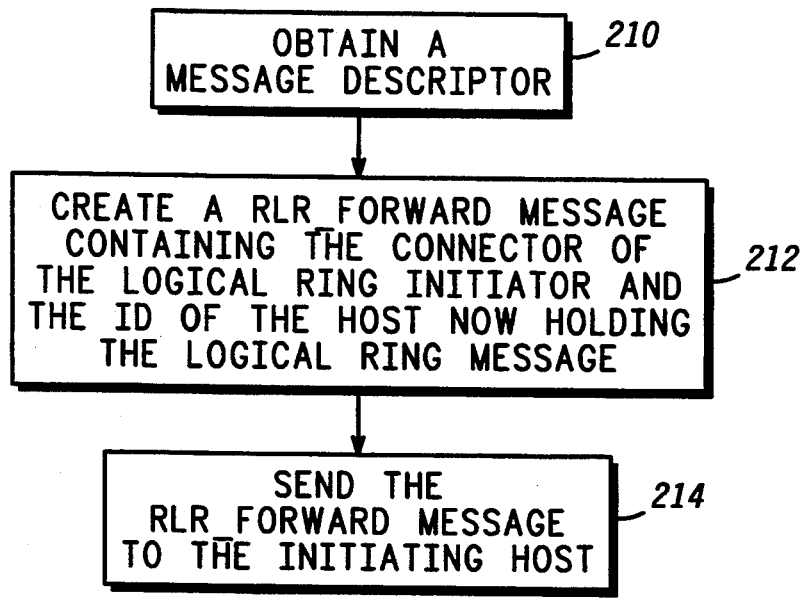
FIG. 14 shows a flowchart illustrating how an RLR Message Forward Notification Message is generated according to the present invention.

FIG. 14 shows a flowchart illustrating how an RLR Message Forward Notification Message is generated in the event of the death of the host currently holding the RLR Message, according to the present invention.

In block 210, a message descriptor is obtained, and the routine proceeds to block 212, where an RLR__FORWARD message is created containing the connector of the RLR Initiating Process and the identifier of the host currently holding the RLR Message. From block 212, the routine proceeds to block 214, where the RLR__FORWARD message is sent to the Initiating Host.

Figure 15:
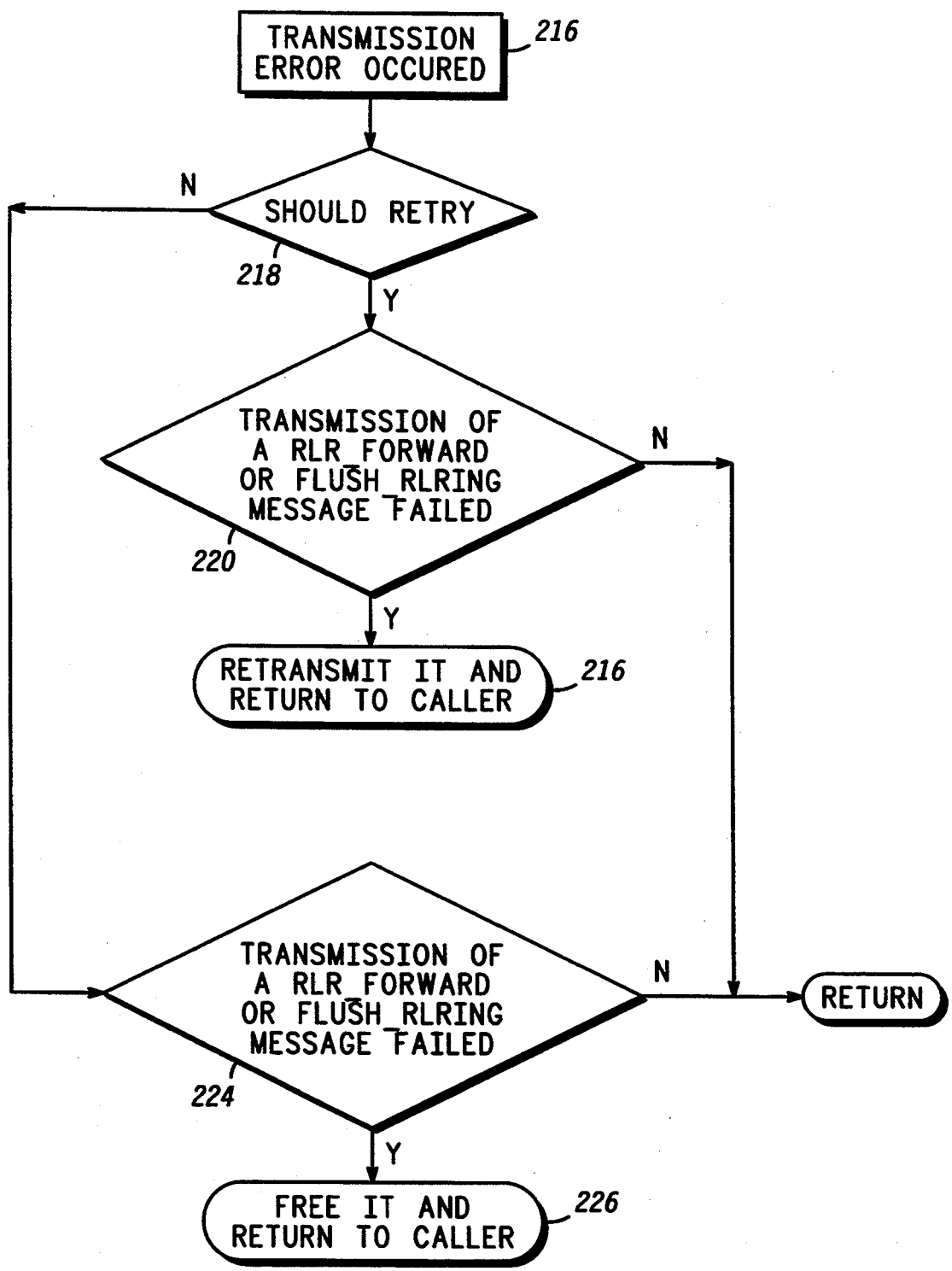
FIG. 15 shows a flowchart illustrating the retransmission of an RLR forward or flush message according to the present invention.

FIG. 15 shows a flowchart illustrating the retransmission of an RLR forward or flush message according to the present invention.

In block 216, a transmission error has occurred. In decision block 218 a determination is made whether to retry the transmission, and, if YES, the routine proceeds to decision block 220; if NO, the routine proceeds to decision block 224.

In decision block 220, if the failed transmission was the transmission of an RLR__FORWARD or FLUSH__RLRING message, the routine proceeds to block 222, where the message is retransmitted, and a return is made to the caller; if not, the routine exits.

In decision block 224, if the failed transmission was the transmission of an RLR__FORWARD or FLUSH__RLRING message, the routine proceeds to block 226, where the message is freed, and a return is made to the caller; if not, the routine exits.

FIG. 16 shows a flowchart illustrating how a Forward Notification Message is handled according to the present invention.

In block 228, the message transmission was successful. From block 228 the routine proceeds to decision block 230. In decision block 230, if the message was an RLR Message which was initiated on another host and not sent to the Initiating Host, the routine proceeds to block 232; if not, the routine proceeds to decision block 236.

In block 232, the Initiating Host is informed of the Current Host identifier, and the routine proceeds to block 234, where a return to the caller is made. In decision block 236, if the message was an RLR__FORWARD or FLUSH__RLRING message, the routine proceeds to block 238, where the message is freed, and a return to the caller is made; if not, the routine exits.

Figure 17:
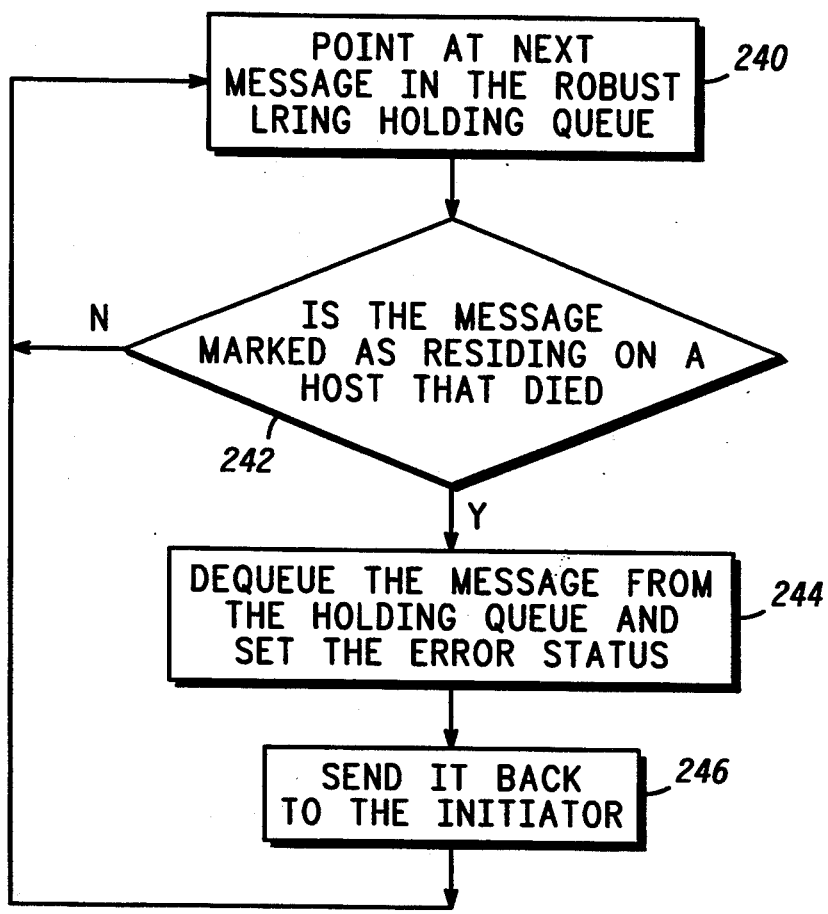
FIG. 17 shows a flowchart illustrating how an RLR Message is dequeued from the RLR Holding Queue according to the present invention, in the event of the death of the host currently holding the RLR Message.
Figure 18:
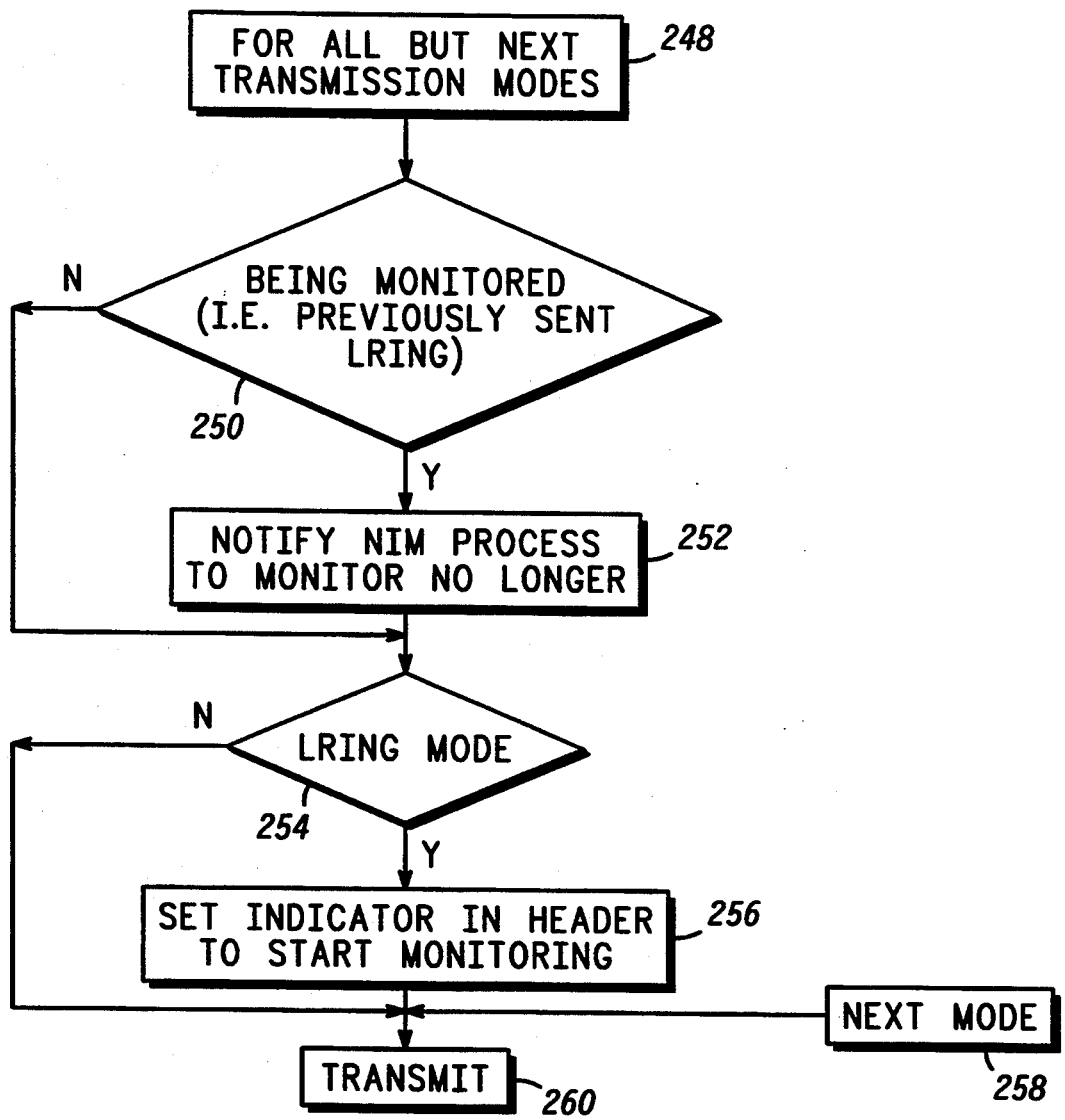

FIG. 17 shows a flowchart illustrating how an RLR Message is dequeued from the RLR Holding Queue according to the present invention, in the event of the death of the host currently holding the RLR Message.

In block 240, a pointer is set at the next message in the RLR Holding Queue, and the routine proceeds to decision block 242. In decision block 242, if a message is marked as residing on a host that died, the routine proceeds to block 244, where the message is dequeued from the Holding Queue, and the error status is set; if not, the routine returns to block 240. From block 244, the routine proceeds to block 246, where the message is sent back to the Initiating Process, and the routine returns to block 240.

OPERATING SYSTEM KERNAL

The operating system kernel is responsible for supporting Robust Logical Ring operations by (1) recording that a Logical Ring Message is being transmitted in LRING mode, so that the NIM process will begin monitoring it; (2) notifying the NIM process when an RLR Message it is monitoring is freed; (3) notifying the NIM process when an RLR Message it is monitoring is sent to a process which is not a member of the Logical Ring or is sent to a process identified by other than its symbolic name.

Figure 18:
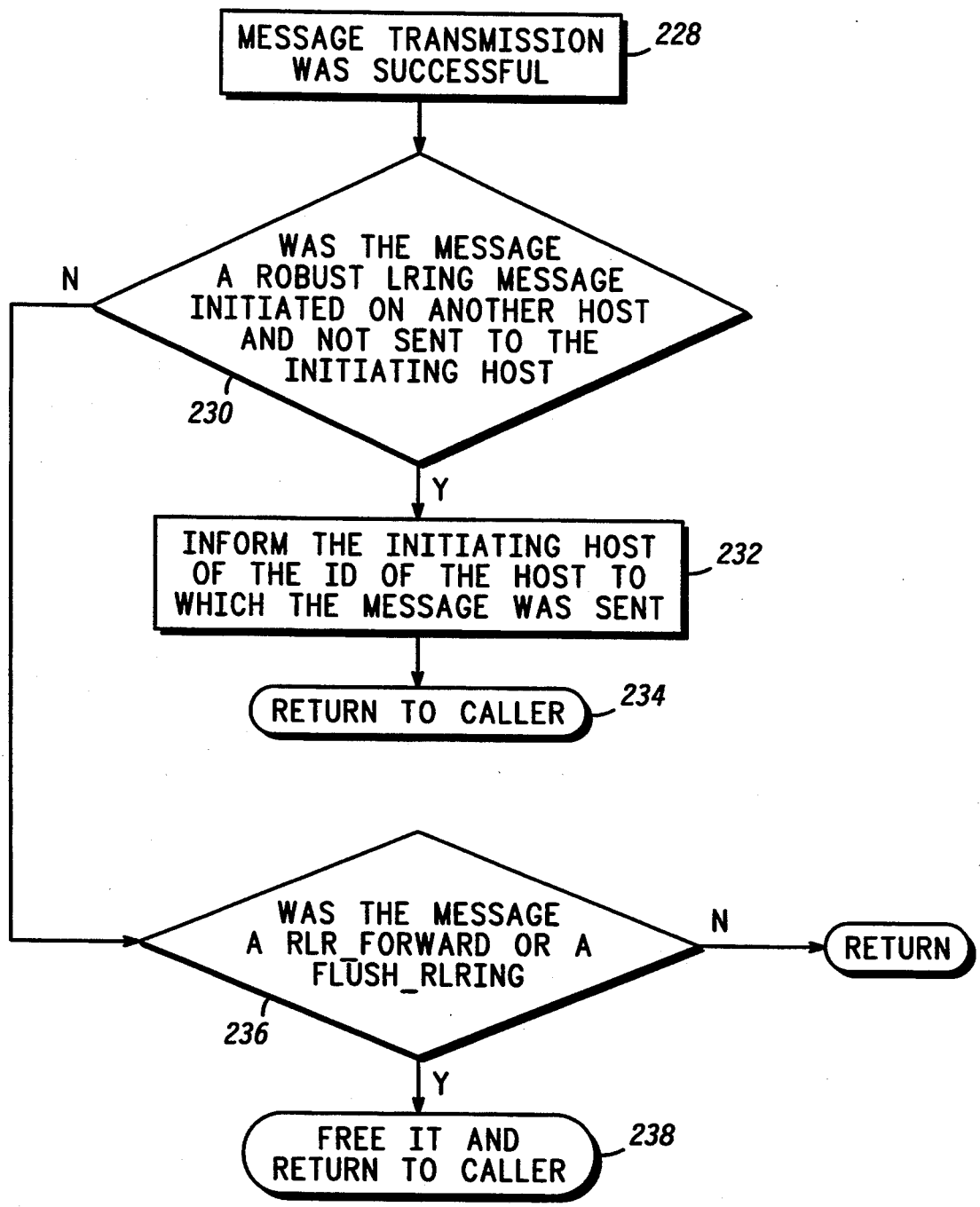
FIG. 18 shows a flowchart illustrating how the Network Interface Module (NIM) process is informed whether or not to monitor an RLR Message according to the present invention.

FIG. 18 shows a flowchart illustrating how the Network Interface Module (NIM) process is informed whether or not to monitor an RLR Message according to the present invention. In the present invention, once an RLR Message is traversing the Logical Ring of processes, it is sent to the next process in the Logical Ring using the NEXT transmission mode (for further discussion of NEXT transmission mode, see description under "Determination of Initiating Process" below).

In block 248, if the message was sent in any mode except NEXT Transmission Mode, the routine proceeds to decision block 250. However, if the message was sent in NEXT Transmission Mode, the routine proceeds from block 258 to block 260. In decision block 250, if the message was previously sent as a Logical Ring message, the routine proceeds to block 252, where the NIM process is notified; if not, the routine proceeds to decision block 254.

In decision block 254, if the message is being sent in Logical Ring mode, the routine proceeds to block 256, where an indicator is set in its header; if not, the routine proceeds to block 260, where the message is transmitted.

Figure 19:
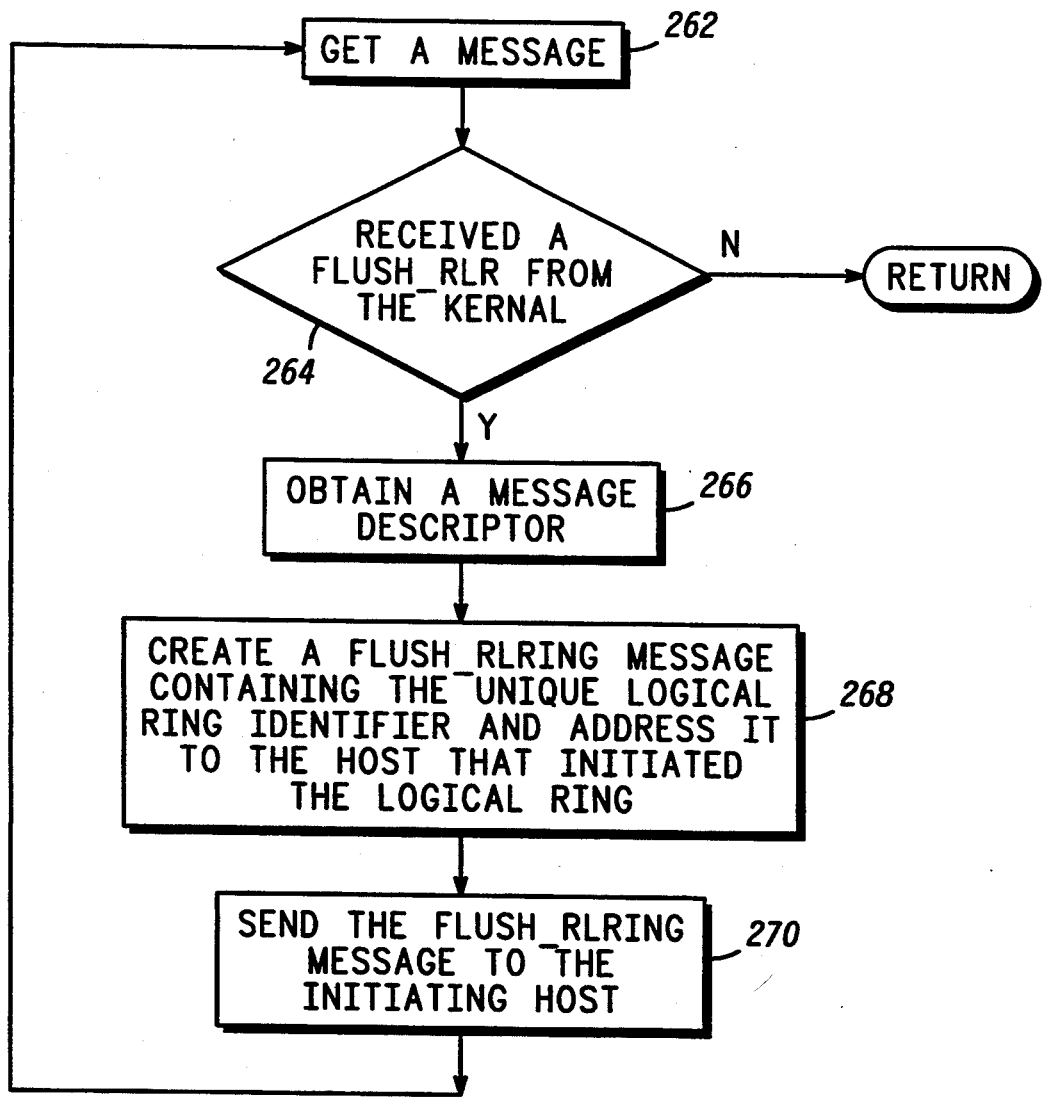
FIG. 19 shows a flowchart illustrating how a message to flush an RLR Message is generated and transmitted to the Initiating Process according to the present invention.

FIG. 19 shows a flowchart illustrating how a message to flush an RLR Message is generated and transmitted to the Initiating Host according to the present invention.

In block 262, a message is received. From block 262 the routine proceeds to decision block 264, where if a FLUSH__RLR message is received from the kernel, the routine proceeds to block 266, where a message descriptor is obtained; if not, the routine exits.

From block 266 the routine proceeds to block 268, where a FLUSH_RLRING message is created containing the unique Logical Ring Identifier, and such message is addressed to the Initiating Host. From block 268 the routine proceeds to block 270, where the FLUSH_RLRING message is sent to the Initiating Host. From block 270 the routine returns to block 262.

Figure 20:
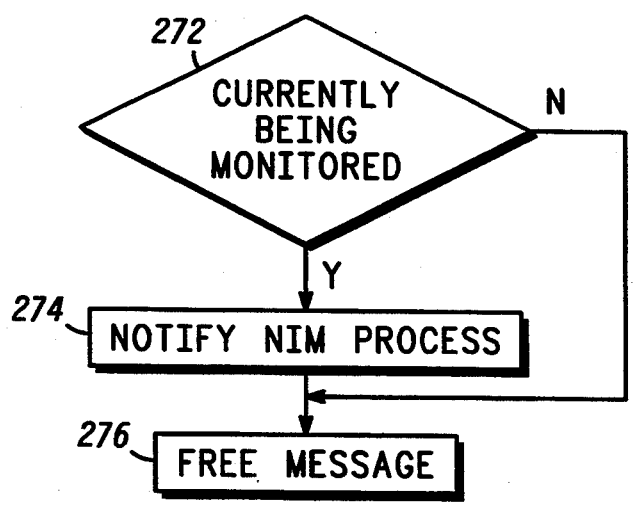
FIG. 20 shows a flowchart illustrating how the NIM process is informed of the freeing of an RLR Message according to the present invention.

FIG. 20 shows a flowchart illustrating how the NIM process is informed of the freeing of an RLR Message according to the present invention.

In decision block 272, if the message is currently being monitored, the routine proceeds to block 274, where the NIM process is notified that the RLR Message is to be freed, and the routine proceeds to block 276; if not, the routine proceeds directly to block 276. In block 276, the RLR Message is freed.

OPERATION OF PREFERRED EMBODIMENT

UPDATING LOGICAL RING MESSAGE HOLDING QUEUE

As explained in greater detail in Related Inventions #1 and #2, the system of the present invention utilizes a kernel primitive known as FORWARD, which may be used by a process to transmit a message which has been received from another process. In the FORWARD primitive, the source connector (i.e. from the originating process) is not modified by the FORWARDing process.

If an RLR Message is FORWARDed from the process where it most recently was received to a process on another host (Target Process), a Forward Notification Message is transmitted to the Initiating Host by the NIM process of the host containing the FORWARDing process.

The purpose of the Forward Notification Message is to inform the Initiating Host that the RLR Message has been FORWARDed to another host. The Forward Notification Message includes the connector of the Initiating Process and the I.D. of the host currently holding the RLR Message (i.e. the Current Host).

When the RLR Message is actually received by the Target Process, a Forward Notification Message is transmitted from the NIM process on the host where the Target Process resides to the NIM process of the Initiating Host to inform it of the current location of the RLR Message. The Forward Notification Messages sent by the NIM process of the host containing the FORWARDing process and by the NIM process of the host containing the Target Process are identical.

Upon receiving the Forward Notification Message, the NIM process on the Initiating Host locates the corresponding RLR Message in the RLR Message-Holding Queue, using the Initiating Process connector, and updates the Current Host I.D. to reflect the identity of the new Current Host.

If the RLR Message circulates successfully through the Logical Ring and returns to the Initiating Host, the copy of the RLR Message stored in the RLR Message-Holding Queue is dequeued and deleted.

Several cases will now be discussed in which the RLR Message fails to circulate successfully through the Logical Ring and return to the Initiating Process.

One such case may occur when the host of the Initiating Process and the host on which the RLR Message is currently residing become disconnected from one other. In this case, the Transmission Status field of the message header of the RLR Message is set to BROKEN_RING (refer to FIG. 3). In addition, the Flags field of the message header is set to indicate LRING_NODE_DEATH.

The NIM process on the Initiating Host reintroduces the copy of the RLR Message stored in the RLR Message-Holding Queue back into the Logical Ring. The RLR Message is thus retransmitted around the Logical Ring, until it returns to the Initiating Process.

Another such case may occur when one of the processes in the Logical Ring for some reason terminates after receiving the RLR Message but before retransmitting it to the next process. In general, an attempt is made to continue the transmission of the RLR Message if possible.

In the system of the present invention, messages which are delivered to a process are placed in its Input Queue. By performing the GET kernel primitive, the process dequeues a message from its Input Queue on a first-in-first-out basis, moving the message to its Owned Queue, where the message is handled, which includes possible modification of the contents.

Thus a message left on the Input Queue of a terminating process is in the same state as when it was received, but a message left in the Owned Queue may have been modified.

If the terminating process is holding the RLR Message in its Owned Queue, the RLR Message is FORWARDed to the next member of the Logical Ring. The Transmission Status field of the message header of the RLR Message is set to BROKEN_RING and the Flags field of the message header is set to indicate LRING_PROC_DEATH.

If the terminating process is holding the RLR Message in its Input Queue, the RLR Message is simply FORWARDed to the next member of the Logical Ring.

A process in the Logical Ring may REPLY ( ) the message at any time. REPLYING an RLR Message takes the message out of RLR Mode and sends it to the Message Initiator. Note that the Message Originator is not necessarily the same as the RLR Initiator. In either case, the NIM process on the Initiating Process' host is sent a Flush Message to stop monitoring the message.

Any process holding the RLR Message may remove it from the Logical Ring, by FREEing it, or by sending it to a process which is not a member of the Logical Ring, or by sending it to a process within the Logical Ring using a transmission mode other than NEXT.

If a process uses the DIRECT, EXPRESS, or SELF Transmission Modes to transmit the RLR Message, then the RLR Message is considered to have left the Logical Ring, even if the target host is a member of the Logical Ring. If the Logical Ring spans multiple hosts, the NIM process on the Initiating Host is notified, by means of a flush notification, that the RLR Message is no longer to be monitored.

If the Logical Ring spans multiple hosts, and the NIM process of the Current Host is unable to transmit the RLR Message to the next host on the LAN, the Transmission Status field of the message header of the RLR Message is set to BROKEN_RING, and the Flags field is set to indicate LRING_FAILED_DELIVERY. The RLR Message is returned to the Initiating Host, where the NIM process of the Initiating Host dequeues and frees the corresponding message from the RLR Message-Holding Queue and injects the received RLR Message back into the Logical Ring.

If the Initiating Process terminates before the RLR Message returns to it, and no other member of the Logical Ring recognizes and deals with the situation, then the Transmission Status field of the message header of the RLR Message is set to BROKEN_RING, and RING_COMPLETE is reported in the Flags field (in addition to any other status indications).

DETERMINATION OF INITIATING PROCESS

In the system of the present invention, the PUT kernel primitive is used by a process to send a message to a given destination. The sending process resumes execution immediately after sending the message. The CALL kernel primitive is used by a process to send a message and then wait for a reply.

In the present invention, if a process does a PUT, FORWARD, or CALL of a message, such process becomes the Initiating Process regarding the Logical Ring transmission. If the Logical Ring spans multiple hosts, and the RLR Message is given to the NIM process to transmit it to a Logical Ring member not on the host of the Initiating Process, the NIM will begin monitoring the RLR Message, as described in the section above entitled "Updating Logical Ring Message-Holding Queue".

In the system of the present invention, the NEXT transmission mode is a mode by which a process may send a message to the next process, if any, with the same symbolic name in the same context as the sending process; otherwise the process searches upwards through all parent contexts until it finds a process, if any, with the same name.

In the system of the present invention, there are two message transmission modes by which a process may send a message to a process identified by its symbolic name: NEXT and LRING transmission modes. If a process sends a message using the LRING transmission mode, such process becomes the Initiating Process regarding the Logical Ring message transmission, and the flags field of the message header is marked to indicate the message is being monitored.

If a process sends a message using the NEXT transmission mode and no Initiating Process has been set for this message, such process becomes the Initiating Process but the flags field of the message header is not marked.

That is, once an RLR Message is circulating in the Logical Ring, if it is transferred to the next process in the Logical Ring using NEXT Transmission Mode, the Initiating Process is preserved. But if Robust Logical Ring Transmission Mode is used, the executing process becomes the Initiating Process for the RLR Message. And the NIM process on the former Initiating Process' host is not notified of further progress of the RLR Message in the Logical Ring.

If the process holding the RLR Message transmits it using Robust Logical Ring Transmission Mode after the Initiating Process has been set, and the Logical Ring spans multiple hosts, the NIM on the host of the existing Initiating Process is notified that it is no longer to monitor the RLR Message. The NIM process on the host of the new Initiating Process will do so.

DESCRIPTION OF PROGRAM LISTINGS

Appendices A-I contain "C" language program listings implementing the concepts relating to the transmission of RLR Messages as described hereinabove.

Appendix A (mcinim.h) is a header file which includes various definitions, message identifiers, and global data structures. Appendix A contains the structure of the message to notify the Initiating Process that the RLR Message has been FORWARDed (lines 154–157). Appendix A also contains the structure for the message which notifies the NIM process of the Initiating Host that the RLR Message is no longer in Robust Logical Ring Mode and should be flushed from the RLR Message-Holding Queue (lines 159–161). Appendix A also contains a macro to determine if a specified message is an RLR Message (lines 189–191).

The program listing of Appendix B (rcvd_msg.c) serves to place the RLR Message on the RLR Message-Holding Queue (rlr_list) (lines 107–109). The code of Appendix B also removes an RLR Message from the RLR Message-Holding Queue upon its return to the Initiating Host (lines 168–177). In addition, upon receipt of a FORWARDed RLR Message, the NIM process of the Initiating Host is notified of the current residence of such RLR Message (lines 193–198).

Further in Appendix B, upon receipt of a reply to a called RLR Message, such message is moved to the RLR Message-Holding Queue (lines 211–212). Code is also provided for receiving a notification message regarding the FORWARDing of the RLR Message (lines 436–481). In addition, code is provided for a notification regarding the flushing of an RLR Message (lines 482–548).

Appendix C (snd_fcns.c) provides code for tagging an RLR Message with a unique Initiating Process identifier portion which identifies the Initiating Process (lines 88–89). It also provides code for sending notification regarding a Forward Notification Message which is transmitted from a FORWARDing process to the NIM process of the Initiating Host to inform it that the RLR Message has been received by another process in the Logical Ring (lines 641–667).

Appendix D (tx_status.c) handles the retransmission of Robust Logical Ring forward and flush notifications (lines 82–83). It also handles the unsuccessful transmission of Robust Logical Ring forward and flush notifications (lines 138–139). In addition, upon the successful FORWARDing of an RLR Message, it notifies the NIM process of the Initiating Host of the current residence of the RLR Message (lines 166–169, 179–182, and 205–206).

Appendix E (next_cell.c) dequeues RLR Messages upon the disconnection or death of a host currently holding the RLR Message. Appendix E also provides a function which is called upon the death of the host on which the RLR Message is resident and which determines which RLR Messages resided on such host (lines 165, 245–285). Such RLR Messages are sent to the NIM process of the Initiating Host with BROKEN_LRING status.

Appendix F (putfor.m4), Appendix G (nim.c), Appendix H (mcinim.c), and Appendix I (kentry.s) provide Robust Logical Ring support from the operating system kernel.

In Appendix F (putfor.m4) the function chk_robust (lines 776–801) is used to decide whether or not to notify the NIM process that an RLR Message is no longer to be monitored. Calls to chk_robust are provided in appropriate places (e.g. lines 201, 331, 372, 723, 751, and 767). Appendix F also provides the maintenance of the information by which the NIM process recognizes that an RLR Message is or should be monitored (lines 565–566 and 608).

In Appendix G (nim.c) the function xmit_rlr_flush (lines 204–220) is used to notify the NIM process that an RLR Message is no longer to be monitored.

Appendix H (mcinim.c) provides code which accepts the notification message from the local kernel that a specified message is no longer an RLR Message and so informs the NIM process of the Initiating Host (lines 292–311).

Appendix I (kentry.s) provides the code for determining, during the freeing of an RLR Message, whether or not the NIM process must be notified and to do so if necessary (lines 639–647).

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

APPENDIX A

```
1     /*******************************************************************
2
3            (C) Copyright 1989.  All Rights Reserved.  Computer X, Inc.
4
5            Reproduction of this software by recipient in whole or
6            in part is forbidden except as provided in writing by
7            Computer X, Inc.
8
9            Module              : a(#)mcinim.h  3.1  89/01/11
10           Date submitted      : 89/01/11  16:14:29
11           Origin              : Computer X
12           Description         : Definitions and structures common to b
13                                 cX LAN and MCI.
14
15    *******************************************************************
16
17
18    #include <nim/nimkern.h>
19
20
21    /* valid cpu and node id ranges */
22    #define MIN_CPU_ID       0
23    #define MAX_CPU_ID       14
24    #define MIN_NODE_ID      1
25    #define MAX_NODE_ID      254
26
27    /* non-local process name cache flags */
28    #define LDISC_IN_PROG    0x01
29    #define RDISC_IN_PROG    0x02
30    #define FOR_SELF         0x04
31    #define FOR_OTHERS       0x08
32
33    /* local process name cache flags */
34    #define UPD_MSG_SENT     0x01
35
36    /* number of cache records and message descriptors to keep in reserve */
37    #define CACHE_REC_RESERVE     10
38    #define MSG_DESC_RESERVE      20
39
40    /* keywords for standard format messages */
41    #define KW_TAG           Keypack('t','a','g',' ')
42    #define KW_STATUS        Keypack('s','t','a','t')
43    #define KW_REASON        Keypack('v','e','r','b')
44    #define KW_REVISION      Keypack('r','e','v',' ')
45    #define KW_ERROR         Keypack('e','r','r',' ')
46    #define KW_AWAKE         Keypack('a','l','a','r')
47    #define KW_CONFIG        Keypack('r','e','s','o')
48    #define KW_EVENT         Keypack('e','v','e','n')
49    #define KW_LOAD          Keypack('l','o','a','d')
50    #define KW_EXEC          Keypack('e','x','e','c')
51    #define KW_UPST          Keypack('u','p','s','t')
52    #define KW_DONE          Keypack('d','o','n','e')
53    #define KW_CREATED       Keypack('c','o','n','n')
54    #define KW_FAILED        Keypack('f','a','i','l')
55    #define KW_DIAGCOMP      Keypack('n','i','m',' ')
56    #define KW_RECV_37X      Keypack('r','e','c','v')
57
58    #define KW_NIMTAG        Keypack('N','I','M',' ')
59
```

```
60   /* other message identifiers */
61   #define TXFAILED        11
62
63   /* lengths of non-semantic and semantic portions of the MSG message head
64   #define NONSEMLEN       (unsigned long)&((MSG*)0)->hdrsize
65   #define SEMLEN          (sizeof(MSG) - NONSEMLEN)
66
67   /* status codes for Config_mgt notification of LAN state change */
68   #define cX_MASTER       3001
69   #define cX_RESTART      3002
70
71
72   /* host identifier */
73   typedef union hostid {
74       unsigned char cpuid[4];
75       struct {
76           unsigned long pad:8;
77           unsigned long nodeid:24;
78       } ni;
79   } HOSTID;
80
81
82   typedef struct bootload {
83       CONNECTOR    conn;            /* bootload process connector
84       uint32       hostid;          /* id of bootloadee
85       uint32       param;           /* bootloadee's param block addr
86       uint32       memtbl;          /* memory segment array addr
87       uint32       bootstr;         /* addr of optional boot string
88       uint8        flags;           /* bit flags (defined below)
89       uint8        retry;           /* decrementing retry counter
90   } BOOTLOAD;
91
92   #define BL_REQUEST      0x01
93   #define BL_IN_PROG      0x02
94
95
96   /* generic list member header */
97   typedef struct list_member {
98       uint32              pad;      /* padding for link/unlink fcns
99       struct list_member  *next;    /* addr of next record in list
100      struct list_member  *prev;    /* addr of previous record in li
101  } LIST_MEMBER;
102
103
104  /* list maintenance structure */
105  typedef struct {
106      LIST_MEMBER  *head;           /* addr of first record in list
107      LIST_MEMBER  *tail;           /* addr of last record in list
108      uint16       memb_cnt;        /* number of records in list
109  } LIST;
110
111
112  /* timer to execute specified function after given time interval */
113  typedef struct timer {
114      uint32          dummy;        /* padding for link/unlink fcns
115      struct timer    *next;        /* addr of next timeout record
116      struct timer    *prev;        /* addr of next timeout record
117      uint8           flags;        /* bit flags
118      uint32          counter;      /* decrementing timeout counter
119      uint32          init_value;   /* timeout_cnt initialization va
120      void            (*timer_fcn)();  /* addr of fcn to call on timeou
121  } TIMER;
122
123  /* timer bit flags */
124  #define IN_LIST         0x01      /* set when linked, cleared when unlinke
125  #define NEW_TIMER       0x02      /* set when timer linked into list
126  #define PERIODIC        0x04      /* periodic timer if set, one-shot other
127
128
129  /*
130   * The following are the structures of the various non-USER messages whi
131   * are overlayed onto the message field of the message descriptor.
132   */
133
134  struct discovery {                          /* DISCOVERY message
135      uint8       name[MAXNAM];               /* name of process being discove
136  };
137
138  struct disc_resp {                          /* DISCOVERY_RESP message
139      uint8       name[MAXNAM];               /* name of discovered process
```

```
140     };
141
142     struct proc_created {                          /* PROCESS_CREATED message
143         uint8               name[MAXNAM];          /* name of created process
144     };
145
146     struct proc_deleted {                          /* PROCESS_DELETED message
147         uint8               name[MAXNAM];          /* name of deleted process
148     };
149
150     struct new_successor {                         /* NEW_SUCCESSOR message
151         uint32              succ_addr;             /* address of the new successor
152     };
153
154     struct msg_forward {                           /* CALL_FORWARD or RLR_FORWARD m
155         CONNECTOR           conn;                  /* caller or rlring initiator
156         uint32              holder;                /* id of host now holding the me
157     };
158
159     struct flush_rlring {                          /* FLUSH_RLRING message
160         uint32              lri_channel;           /* channel of rlring initiator
161     };
162
163     struct acceptance {                            /* ACCEPTANCE message
164         uint8               status;                /* TRUE if message was delivered
165     };
166
167
168     /* hash table entry */
169     typedef struct {                   /* hashing table record             *
170         LIST                hash_list;  /* linked list control structure
171     } HASH_REC;
172
173
174     /* macro to initialize a list control structure */
175     #define Init_list(list) { \
176         (list)->head = 0; \
177         (list)->tail = 0; \
178         (list)->memb_cnt = 0; }
179
180     /* macro to initialize a timer record */
181     #define Init_timer(rec,len,fcn,per) { \
182         (rec)->init_value = (len); \
183         (rec)->timer_fcn = (fcn); \
184         (rec)->flags = ((per)) ? PERIODIC : 0; }
185
186     /* macro to determine if symbolic addressing transmission mode used */
187     #define Symbolic(mode)  ( (mode)!=(uint8)DIRECT && (mode)!=(uint8)EXPRES
188
189     /* macro to determine if message is a robust logical message */
190     #define Robust_LRing(hdr) ( \
191         ((hdr)->lrflags & (INLRING|ROBUST)) == (INLRING|ROBUST) )
192
193     /* macro to extract cpu id from host id */
194     #define CPUID(hid)      ( (hid) >> 24 )
195
196     /* macro to extract node id from host id */
197     #define NODEID(hid)     ( (hid) & 0xffffff )
198
199     /* macro to construct host id */
200     #define HOST(cid,nid)   ( (cid)<<24 | (nid) )
201
202     /* macro to obtain message body pointer */
203     #ifdef MMU
204     #define Body(hdr) ( (uint8*)(hdr)->body )
205     #else
206     #define Body(hdr) ( (uint8*)((hdr) + 1) )
207     #endif
208
209
210     #ifdef MMU
211     #define sprintf rt_sprintf
212     #endif
213
214     #ifdef UNIX
215     extern uint16                              splx();
216     #define set_sr(pri)                        splx(pri)
217     extern bool                                probe();
218     #define cx_probe(fcn,paddr,uaddr)          probe((fcn), (paddr), (uaddr))
```

```
219  #else
220  extern uint16    set_sr();              /* set processor status register
221  #endif
222
223
224
225  /* global data structures */
226  extern char      nim_id_str[];          /* NIM identification string
227  extern long      mci_enabled;           /* MCI enabled if TRUE
228  extern uint32    my_nodeid;             /* node id for this cpu
229  extern uint8     my_cpuid;              /* cpu id for this cpu
230  extern uint8     *nim_cpuid;            /* id of cpu controlling NIM8000
231  extern int       no_of_lans;            /* no of NIM boards installed
232  extern LIST      md_free_list;          /* list of free message descript
233  extern LIST      first_list;            /* holding queue for early messa
234  extern LIST      call_list;             /* call holding queue
235  extern LIST      rlr_list;              /* robust logical ring holding q
236  extern LIST      disc_hold_list;        /* discovery holding queue
237  extern short     hash_index;            /* index into the hash table
238  extern int       nl_cache_size;         /* no of recs in non-local name
239  extern int       max_nl_cache;          /* max no of recs in non-local c
240  extern LIST      cache_free_list;       /* list of free cache records
241  extern LIST      mci_sent_list;         /* list of outstanding mci messa
242  extern uint32    msgret_timeout;        /* overall timeout for entire qu
243  extern uint32    msgret_maxtime;        /* worst case message return tim
244  extern LIST      msgret_list;           /* message return timeout list
245  extern uint32    msgret_id;             /* returning message identifier
246  extern uint32    lri_id;                /* id for lri_conn channel field
247  extern BOOTLOAD  *bootload;             /* addr of bootload array
248  extern int       sd_phase;              /* node/cpu shutdown phase indic
249  extern bool      nim_tmr_on;            /* TRUE if periodic wakeup reque
250  extern uint32    wakeup_period;         /* period of wakeups from Clock
251  extern char      *nim_res_msg;          /* addr of resource msg
252  extern CONNECTOR conn37x;               /* connector to MVME37x driver
253  extern int       nimdb_lvl;             /* debug level controlling outpu
254  extern uint32    manufcode;             /* upper 24 bits of MAC address
255  extern CONNECTOR cm_conn;               /* connector to Config_mgt
256  extern int       cm_state;              /* state last reported to Config
257  extern uint32    cm_tag;                /* resource message tag
258  extern bool      cm_master;             /* Config_mgt informed we are ma
259
260  /* functions */
261  extern void      init_mci();            /* initialize MCI channels
262  extern void      init_globs();          /* initialize global data
263  extern void      link();                /* link a record into a list
264  extern void      unlink();              /* unlink a record from a list
265  extern void      unlink_msgret();       /* unlink rec from msg ret queue
266  extern void      unlink_mci();          /* unlink msg desc from mci sent
267  extern void      send_symb_msg();       /* send a user message by name
268  extern void      send_to_next();        /* send message to next cpu/node
269  extern void      send_any_msg();        /* send a message to a host id
270  extern void      send_upd_msg();        /* send update nlcache message
271  extern void      send_fwd();            /* send forward notification mes
272  extern void      send_all_upd();        /* send all update nlcache messa
273  extern void      send_via_nim();        /* send message to node on lan
274  extern int       snd_viamci();          /* send message to cpu on mci
275  extern void      rcv_via_mci();         /* receive message from local cp
276  extern void      resume_send();         /* resume transmission via mci
277  extern void      queue_to_nim();        /* queue message to be sent on L
278  extern void      fail_calls();          /* fail outstanding Call message
279  extern void      panic();
280  extern MSG_DESC  *get_msg_desc();       /* acquire a message descriptor
281  extern void      free_msg_desc();       /* free a message descriptor
282  extern MSG_DESC  *get_cache_desc();     /* get a cached msg descriptor
283  extern void      free_cache_desc();     /* cache a msg descriptor
284  extern void      mk_pglist();           /* create list of physical pages
285  extern void      rcvd_msg();            /* handle received messages
286  extern bool      NimForward();          /* indicates whether msg was que
287  extern bool      beyond();              /* determine closeness around ri
288  extern bool      atbeyond_host();       /* determine closeness around ri
289  extern CACHE     *get_cache_rec();      /* acquire a cache record
290  extern void      add_to_cache();        /* add a record to the cache
291  extern void      rem_fr_cache();        /* remove a record from a cache
292  extern CACHE     *srch_cache();         /* search process name cache
293  extern void      flush_cache();         /* clear non-local name cache
294  extern void      disc_complete();       /* process discovery completed
295  extern void      tx_status();           /* handle unsuccessful transmiss
296  extern void      tx_succ();             /* handle successful transmissio
297  extern void      tx_user_status();      /* report user msg tx status
298  extern short     hash();                /* hash a process name
```

```
299    extern void      bl_create();         /* create bootload process
300    extern void      bl_start();          /* initiate bootload
301    extern void      bl_exited();         /* bootload process exited
302    extern void      bl_failed();         /* process creation/deletion fai
303    extern char      *get_epbbuf();       /* acquire EPB and optional BUF
304    extern char      *get_ip();           /* get and process messages
305    extern void      nim_note();          /* NIM's own version of Sys_note
306    extern void      inform_cm();         /* notify Config_mgt of LAN_stat
307    extern void      nim_cproc();         /* proc created in generic conte
308    extern void      nim_dproc();         /* proc deleted in generic conte
```

APPENDIX B

```
1      /************************************************************
2
3              (C) Copyright 1989.  All Rights Reserved.  Computer X, Inc.
4
5              Reproduction of this software by recipient in whole or
6              in part is forbidden except as provided in writing by
7              Computer X, Inc.
8
9              Module           : @(#)rcvd_msg.c      3.6  89/04/28
10             Date submitted   : 89/04/28  17:15:23
11             Origin           : Computer X
12             Description      : Handles messages received off cXLAN or
13
14     ************************************************************
15
16     #ifndef lint
17     static char SrcId[] = "@(#) rcvd_msg.c:3.6";
18     #endif
19
20
21     #include <cX.h>
22     #ifdef UNIX
23     #include <os/rtpb.h>
24     #include <os/message.h>
25     #else
26     #include <os/kerntypes.h>
27     #endif
28     #include <nim/mcinim.h>
29     #include <nim/mci.h>
30     #include "wd2840.h"
31     #include "nim.h"
32
33     void rcvd_msg(md)
34     register MSG_DESC    *md;              /* descriptor for received messa
35     {
36         extern HASH_REC    l_hash[];       /* local name cache hash table
37         extern HASH_REC    nl_hash[];      /* non-local name cache hash tab
38         CACHE              *cache;         /* addr of process name cache re
39         register MSG_DESC  *md2;           /* pointer to a message descript
40         register MSG       *mh;            /* addr of MSG header of rcvd us
41         MSG                *mh2;           /* addr of another MSG header
42         LAN_INFO           *li;            /* info for corresponding lan
43         NODE_INFO          *ni;            /* addr of a node's info record
44         uint32             host;           /* host id of sender
45         bool               accepted;       /* rcvd msg queued to process if
46         bool               call_found;     /* call msg found in call_list i
47         uint8              flags;          /* bit flags from kernel message
48         uint8              mode;           /* message transmission mode
49         uint8              seq;            /* frame sequence number
50
51
52         /* Perform message routing if required. */
53         if ((*nim_cpuid == my_cpuid) && (md->header.msg_dest != MY_SELF))
54         {
55             md->flags |= BEING_ROUTED;
56             if (NODEID(md->header.msg_dest) == UNKNOWN_NODE)
57                  send_to_next(md);
58             else
59                  send_any_msg(md);
60             return;
61         }
62
63         /* Handle messages returning to the originator. */
64         if (md->header.msg_origin == MY_SELF || md->header.msg_type == ACCEP
65         {
66             /* Search return timeout queue for corresponding message. */
67             md2 = (MSG_DESC*)msgret_list.head;
68             while (md2 && md2->header.msg_id != md->header.msg_id)
```

```
69          md2 = md2->next;
70      if (md2 == 0)
71      {
72          if (lan_info[0].events[EVT_MSGRET] != 0xff)
73              lan_info[0].events[EVT_MSGRET]++;
74          if (NODEID(md->header.msg_src) != my_nodeid)
75          {
76              free_msg_desc(md);
77              return;
78          }
79      } else
80      {
81          unlink_msgret(md2);
82          if (md2->header.msg_type == USER)
83          {
84              /* User message so use original and discard received mes
85              md2->header.msg_dest = md->header.msg_origin;
86              if (((struct acceptance*)(md->msg_addr))->status)
87                  ((MSG*)(md2->msg_addr))->flags |= ACCEPTED;
88              free_msg_desc(md);
89              md = md2;
90          } else
91              /* Non-user message so discard original and use received
92              free_msg_desc(md2);
93      }
94  }
95
96  /* Handle messages returned to originator. */
97  if (md->header.msg_origin == MY_SELF)
98  {
99      switch (md->header.msg_type)
100     {
101     case USER:
102         mh = (MSG*)md->msg_addr;
103         if ((CONN_HOSTID(&mh->src_conn) == MY_SELF) &&
104             (mh->flags & (CALLED|ACCEPTED)) == (CALLED|ACCEPTED))
105             link(md, &call_list);
106         else
107             if ((mh->flags & ACCEPTED) && Robust_LRing(mh) &&
108                     CONN_NODEID(&mh->lri_conn) == MY_SELF)
109                 link(md, &rlr_list);
110             else
111                 if (mh->flags & ACCEPTED)
112                     tx_user_status(md, SUCCESS);
113                 else
114                     if (cache = srch_cache(nl_hash, md->header.destn
115                     {
116                         cache->local = UNKNOWN_CPU;
117                         cache->remote = UNKNOWN_HOST;
118                         send_symb_msg(md, cache);
119                     } else
120                         tx_user_status(md, SUCCESS);
121         md = 0;
122         break;
123     case PROCESS_CREATED:
124         if (cache = srch_cache(l_hash, md->msg_addr))
125             cache->outstanding--;
126         break;
127     case PROCESS_DELETED:
128         if (cache = srch_cache(l_hash, md->msg_addr))
129             if (cache->instances == 0 && --cache->outstanding == 0)
130                 rem_fr_cache(l_hash, cache);
131         break;
132     case DISCOVERY:
133     case LDISCOVERY:
134         disc_complete(md, FALSE);
135         break;
136     case DISCOVERY_RESP:
137         disc_complete(md, TRUE);
138         break;
139     case NEW_SUCCESSOR:
140     case LAN_STATE_CHG:
141         break;
142     default:
143         break;
144     }
145
146     /* Free the message if non-user. */
147     if (md != 0)
148         free_msg_desc(md);
```

```
149         return;
150     }
151
152     /* Handle returning Call and returning robust lring message. */
153     if (md->header.msg_type == USER)
154     {
155         mh = (MSG*)md->msg_addr;
156         if ((mh->flags & CALLED) && (CONN_HOSTID(&mh->src_conn) == MY_SE
157         {
158             call_found = FALSE;
159             for (md2 = (MSG_DESC*)call_list.head; md2; md2 = md2->next)
160                 if (SAME_PROCESS(&((MSG*)md2->msg_addr)->src_conn, &mh->
161                 {
162                     unlink(md2, &call_list);
163                     free_msg_desc(md2);
164                     call_found = TRUE;
165                     break;
166                 }
167         } else
168             if (Robust_LRing(mh) && CONN_NODEID(&mh->lri_conn) == MY_SEL
169             {
170                 for (md2 = (MSG_DESC*)rlr_list.head; md2; md2 = md2->nex
171                     if (CONN_EQ(&((MSG*)md2->msg_addr)->lri_conn, &mh->l
172                     {
173                         unlink(md2, &rlr_list);
174                         free_msg_desc(md2);
175                         break;
176                     }
177             }
178     }
179
180     /* Handle messages originated by others. */
181     switch (md->header.msg_type)
182     {
183     case USER:
184         /* If a Call message, notify Caller that we now have the message
185         if (mh->flags & CALLED)
186         {
187             if ((CONN_HOSTID(&mh->src_conn) != MY_SELF) &&
188                 (CONN_HOSTID(&mh->src_conn) != md->header.msg_src))
189                 send_fwd(CALL_FORWARD, &mh->src_conn, MY_SELF);
190             if ((CONN_HOSTID(&mh->src_conn) == MY_SELF) && !call_found)
191                 mh->flags &= ~CALLED;
192         } else
193             if (Robust_LRing(mh))
194             {
195                 host = CONN_HOSTID(&mh->lri_conn);
196                 if ((host != MY_SELF) && (host != md->header.msg_src))
197                     send_fwd(RLR_FORWARD, &mh->lri_conn, MY_SELF);
198             }
199
200         /* Handle messages sent via connector reference. */
201         if (!Symbolic(mh->mode))
202         {
203             /* If a Reply message, dequeue and free original Call messag
204             if (mh->flags & REPLIED)
205             {
206                 for (md2 = (MSG_DESC*)call_list.head; md2; md2 = md2->ne
207                     if (SAME_PROCESS(&((MSG*)md2->msg_addr)->src_conn, &
208                     {
209                         unlink(md2, &call_list);
210                         ((MSG*)md2->msg_addr)->flags &= ~CALLED;
211                         if (Robust_LRing((MSG*)md2->msg_addr))
212                             link(md2, &rlr_list);
213                         else
214                             free_msg_desc(md2);
215                         break;
216                     }
217                 if (md2 == 0)
218                     mh->flags &= ~REPLIED;
219             }
220
221             /* Don't accept message if we are shutting down. */
222             if (sd_phase && !(mh->flags & REPLIED))
223             {
224                 mh->flags |= ERROR;
225                 if (CONN_HOSTID(&mh->src_conn) == MY_SELF)
226                     free_msg_desc(md);
227                 else
228                 {
```

```
229              if (md->dup_msg_addr != 0)
230              {
231                  Free(Body((MSG*)md->dup_msg_addr));
232                  md->dup_msg_addr = 0;
233              }
234              md->header.msg_dest = CONN_HOSTID(&mh->src_conn);
235              send_any_msg(md);
236          }
237          return;
238      }
239
240      /* Pass message to addressed process. */
241      mh->flags |= FROMNIM;
242      if (mh->flags & ERROR)
243          Forward(mh->mode, &mh->src_conn, Body(mh));
244      else
245          Forward(mh->mode, &mh->dst_conn, Body(mh));
246      md->msg_addr = 0;
247      free_msg_desc(md);
248      return;
249  }
250
251  /* Handle messages sent by name. */
252  flags = mh->flags;
253  mode = mh->mode;
254  if (sd_phase)
255  {
256      /* Don't accept message if we are shutting down. */
257      if (md->dup_msg_addr != 0)
258      {
259          Free(Body((MSG*)md->dup_msg_addr));
260          md->dup_msg_addr = 0;
261      }
262      accepted = FALSE;
263  } else
264  {
265      if (md->dup_msg_addr != 0)
266      {
267  #ifdef MMU
268  #ifdef UNIX
269          bcopy(md->msg_addr+NONSEMLEN,
270              md->dup_msg_addr+NONSEMLEN,
271              SEMLEN);
272          bcopy(mh->body,
273              ((MSG*)md->dup_msg_addr)->body,
274              mh->size);
275  #else
276          memcpy(md->dup_msg_addr+NONSEMLEN,
277              md->msg_addr+NONSEMLEN,
278              SEMLEN);
279          memcpy(((MSG*)md->dup_msg_addr)->body,
280              mh->body,
281              mh->size);
282  #endif
283  #else
284          memcpy(md->dup_msg_addr+NONSEMLEN,
285              md->msg_addr+NONSEMLEN,
286              mh->size+SEMLEN);
287  #endif
288          mh2 = (MSG*)md->dup_msg_addr;
289          md->dup_msg_addr = 0;
290      } else
291      {
292          mh2 = (MSG*)md->msg_addr;
293          md->msg_addr = 0;
294      }
295      mh2->flags |= FROMNIM;
296      if (mode == (uint8)INHERIT)
297          accepted = NimForward(NEXT, md->header.destname, Body(mh
298      else
299          accepted = NimForward(mode, md->header.destname, Body(mh
300  }
301  if (mode == (uint8)NEXT || mode == (uint8)INHERIT)
302  {
303      md2 = get_msg_desc();
304      md2->header.msg_type = ACCEPTANCE;
305      md2->header.msg_dest = md->header.msg_origin;
306      md2->header.msg_id = md->header.msg_id;
307      md2->header.msg_length = sizeof(struct acceptance);
```

```
308            md2->msg_addr = md2->message;
309            ((struct acceptance*)(md2->msg_addr))->status = accepted;
310            free_msg_desc(md);
311            send_any_msg(md2);
312         } else
313            send_symb_msg(md, NULL);
314         break;
315      case PROCESS_CREATED:
316         if (cache = srch_cache(nl_hash, md->msg_addr))
317            if (NODEID(md->header.msg_origin) == my_nodeid)
318            {
319               if (cache->flags & LDISC_IN_PROG)
320               {
321                  if ((cache->local == UNKNOWN_CPU) ||
322                      beyond(cache->local, CPUID(md->header.msg_origin
323                         my_cpuid))
324                     cache->local = CPUID(md->header.msg_origin);
325               } else
326                  if (cache->local == NOWHERE_CPU)
327                     cache->local = CPUID(md->header.msg_origin);
328                  else
329                     if ((cache->local != UNKNOWN_CPU) &&
330                         !beyond(CPUID(md->header.msg_origin),
331                            cache->local, my_cpuid))
332                        cache->local = CPUID(md->header.msg_origin);
333            } else
334            {
335               if (cache->flags & RDISC_IN_PROG)
336               {
337                  if ((cache->remote == UNKNOWN_HOST) ||
338                      beyond(NODEID(cache->remote),
339                         NODEID(md->header.msg_origin), my_nodeid)
340                     cache->remote = md->header.msg_origin;
341               } else
342                  if (cache->remote == NOWHERE_HOST)
343                     cache->remote = md->header.msg_origin;
344                  else
345                     /* NOTE: the following assumes cpu 0 controls th
346                     if (cache->remote != UNKNOWN_HOST)
347                        if (NODEID(md->header.msg_origin) ==
348                            NODEID(cache->remote))
349                        {
350                           if (CPUID(md->header.msg_origin) <
351                               CPUID(cache->remote))
352                              cache->remote = md->header.msg_origi
353                        } else
354                           if (!beyond(NODEID(md->header.msg_origin
355                               NODEID(cache->remote), my_no
356                              cache->remote = md->header.msg_origi
357            }
358         send_to_next(md);
359         break;
360      case PROCESS_DELETED:
361         if (cache = srch_cache(nl_hash, md->msg_addr))
362            if (NODEID(md->header.msg_origin) == my_nodeid)
363            {
364               if (!(cache->flags & LDISC_IN_PROG))
365                  if (cache->local!=NOWHERE_CPU && cache->local!=UNKNO
366                     if (cache->local == CPUID(md->header.msg_origin)
367                        cache->local = UNKNOWN_CPU;
368            } else
369            {
370               if (!(cache->flags & RDISC_IN_PROG))
371                  if (cache->remote!=NOWHERE_HOST && cache->remote!=UN
372                     if (cache->remote == md->header.msg_origin)
373                        cache->remote = UNKNOWN_HOST;
374            }
375         send_to_next(md);
376         break;
377      case DISCOVERY:
378      case LDISCOVERY:
379         cache = srch_cache(l_hash, md->msg_addr);
380         if ((cache != 0) && (cache->instances != 0))
381         {
382            cache->flags |= UPD_MSG_SENT;
383            md->header.msg_type = DISCOVERY_RESP;
384            md->header.msg_dest = md->header.msg_origin;
385            send_any_msg(md);
386         } else
```

```
            send_to_next(md);
        break;
    case CALL_FORWARD:
        for (md2 = (MSG_DESC*)call_list.head; md2; md2 = md2->next)
            if (CONN_EQ(&((MSG*)md2->msg_addr)->src_conn,
                &((struct msg_forward *)md->msg_addr)->conn))
            {
                break;
            }
        if (md2 == 0)
            for (md2 = (MSG_DESC*)msgret_list.head; md2; md2 = md2->next
                if ((md2->header.msg_type == USER) &&
                    (((MSG*)md2->msg_addr)->flags & CALLED) &&
                    CONN_EQ(&((MSG*)md2->msg_addr)->src_conn,
                    &((struct msg_forward *)md->msg_addr)->conn))
                {
                    unlink_msgret(md2);
                    link(md2, &call_list);
                    break;
                }
        if (md2 == 0)
            for (ni = (NODE_INFO*)frmack_list.head; !md2 && ni; ni = ni-
            {
                li = &lan_info[ni->lan];
                if (ni->in_sync && Outst_seq_nos(ni->ack_seq_no, ni->tx_
                    for (seq = ni->ack_seq_no; seq != ni->tx_seq_no;
                        seq = Next_seq_no(seq, li->window_size))
                        if (md2)
                        {   if (md2 == ni->tx_frm_tab[seq].msg_desc)
                                ni->tx_frm_tab[seq].msg_desc = 0;
                        } else
                        {   md2 = ni->tx_frm_tab[seq].msg_desc;
                            if ((md2 != 0) &&
                                (md2->header.msg_type == USER) &&
                                (((MSG*)md2->msg_addr)->flags & CALLED)
                                CONN_EQ(&((MSG*)md2->msg_addr)->src_conn
                                &((struct msg_forward *)md->msg_addr)->c
                            {
                                unlink(md2, select_list(md2, ni));
                                link(md2, &call_list);
                                ni->tx_frm_tab[seq].msg_desc = 0;
                            } else
                                md2 = 0;
                        }
            }
        if (md2)
            md2->header.msg_dest = ((struct msg_forward *)md->msg_addr)-
        free_msg_desc(md);
        break;
    case RLR_FORWARD:
        for (md2 = (MSG_DESC*)rlr_list.head; md2; md2 = md2->next)
            if (CONN_EQ(&((MSG*)md2->msg_addr)->lri_conn,
                &((struct msg_forward *)md->msg_addr)->conn))
            {
                break;
            }
        if (md2 == 0)
            for (md2 = (MSG_DESC*)msgret_list.head; md2; md2 = md2->next
                if ((md2->header.msg_type == USER) &&
                    Robust_LRing((MSG*)md2->msg_addr) &&
                    CONN_EQ(&((MSG*)md2->msg_addr)->lri_conn,
                    &((struct msg_forward *)md->msg_addr)->conn))
                {
                    unlink_msgret(md2);
                    link(md2, &rlr_list);
                    break;
                }
        if (md2 == 0)
            for (ni = (NODE_INFO*)frmack_list.head; !md2 && ni; ni = ni-
            {
                li = &lan_info[ni->lan];
                if (ni->in_sync && Outst_seq_nos(ni->ack_seq_no, ni->tx_
                    for (seq = ni->ack_seq_no; seq != ni->tx_seq_no;
                        seq = Next_seq_no(seq, li->window_size))
                        if (md2)
                        {   if (md2 == ni->tx_frm_tab[seq].msg_desc)
                                ni->tx_frm_tab[seq].msg_desc = 0;
                        } else
```

```
465             {   md2 = ni->tx_frm_tab[seq].msg_desc;
466                 if ((md2 != 0) && (md2->header.msg_type == U
467                     Robust_LRing((MSG*)md2->msg_addr) &&
468                     CONN_EQ(&((MSG*)md2->msg_addr)->lri_conn
469                     &((struct msg_forward *)md->msg_addr)->c
470                 {
471                     unlink(md2, select_list(md2, ni));
472                     link(md2, &rlr_list);
473                     ni->tx_frm_tab[seq].msg_desc = 0;
474                 } else
475                     md2 = 0;
476             }
477         }
478         if (md2)
479             md2->header.msg_dest = ((struct msg_forward *)md->msg_addr)-
480         free_msg_desc(md);
481         break;
482     case FLUSH_RLRING:
483         for (md2 = (MSG_DESC*)rlr_list.head; md2; md2 = md2->next)
484             if (CONN_CHAN(&((MSG*)md2->msg_addr)->lri_conn) ==
485                 ((struct flush_rlring *)md->message)->lri_channel)
486             {
487                 unlink(md2, &rlr_list);
488                 free_msg_desc(md2);
489                 break;
490             }
491         if (md2 == 0)
492             for (md2 = (MSG_DESC*)call_list.head; md2; md2 = md2->next)
493                 if (Robust_LRing((MSG*)md2->msg_addr) &&
494                     CONN_CHAN(&((MSG*)md2->msg_addr)->lri_conn) ==
495                     ((struct flush_rlring *)md->message)->lri_channe
496                 {
497                     ((MSG*)md2->msg_addr)->lrflags &= ~(INLRING|ROBUST);
498                     break;
499                 }
500         if (md2 == 0)
501             for (md2 = (MSG_DESC*)msgret_list.head; md2; md2 = md2->next
502                 if ((md2->header.msg_type == USER) &&
503                     Robust_LRing((MSG*)md2->msg_addr) &&
504                     CONN_CHAN(&((MSG*)md2->msg_addr)->lri_conn) ==
505                     ((struct flush_rlring *)md->message)->lri_chann
506                 {
507                     ((MSG*)md2->msg_addr)->lrflags &= ~(INLRING|ROBUST);
508                     unlink_msgret(md2);
509                     if (((MSG*)md2->msg_addr)->flags & CALLED)
510                         link(md2, &call_list);
511                     else
512                         free_msg_desc(md2);
513                     break;
514                 }
515         if (md2 == 0)
516             for (ni = (NODE_INFO*)frmack_list.head; !md2 && ni; ni = ni-
517             {
518                 li = &lan_info[ni->lan];
519                 if (ni->in_sync && Outst_seq_nos(ni->ack_seq_no, ni->tx_
520                     for (seq = ni->ack_seq_no; seq != ni->tx_seq_no;
521                          seq = Next_seq_no(seq, li->window_size))
522                         if (md2)
523                         {   if (md2 == ni->tx_frm_tab[seq].msg_desc)
524                                 ni->tx_frm_tab[seq].msg_desc = 0;
525                         } else
526                         {   md2 = ni->tx_frm_tab[seq].msg_desc;
527                             if ((md2 != 0) && (md2->header.msg_type == U
528                                 Robust_LRing((MSG*)md2->msg_addr) &&
529                                 CONN_CHAN(&((MSG*)md2->msg_addr)->lri_co
530                                 ((struct flush_rlring *)md->message)->lr
531                             {
532                                 ((MSG*)md2->msg_addr)->lrflags &= ~(INLR
533                                 unlink(md2, select_list(md2, ni));
534                                 if (((MSG*)md2->msg_addr)->flags & CALLE
535                                     link(md2, &call_list);
536                                 else
537                                     free_msg_desc(md2);
538                                 ni->tx_frm_tab[seq].msg_desc = 0;
539                             } else
540                                 md2 = 0;
541                         }
542             }
543         if (md2 == 0)
```

```
544         {   if (lan_info[0].events[EVT_RLR] != 0xff)
545                 lan_info[0].events[EVT_RLR]++;
546         }
547         free_msg_desc(md);
548         break;
549     case NEW_SUCCESSOR:
550         fail_calls(md->header.msg_origin,
551                 ((struct new_successor *)md->msg_addr)->succ_addr);
552         send_to_next(md);
553         break;
554     case LAN_STATE_CHG:
555         if (*(bool*)md->message)
556         {
557             /* Inring so force re-discovery of all remote processes. */
558             send_all_upd();
559             flush_cache(0, 0, NOWHERE_HOST, UNKNOWN_HOST);
560         } else
561             /* Not inring so no remote processes. */
562             fail_calls(MY_SELF, HOST(my_cpuid, NOWHERE_NODE));
563         send_to_next(md);
564         break;
565     default:
566         break;
567     }
568 }
```

APPENDIX C

```
 1  /****************************************************************
 2
 3          (C) Copyright 1989. All Rights Reserved. Computer X, Inc.
 4
 5          Reproduction of this software by recipient in whole or
 6          in part is forbidden except as provided in writing by
 7          Computer X, Inc.
 8
 9          Module          : @(#)snd_fcns.c      3.4  89/04/28
10          Date submitted  : 89/04/28  17:16:49
11          Origin          : Computer X
12          Description     : Contains the following transmission fu
13
14                            send_user_msg() : Send user message.
15                            send_symb_msg() : Send msg to named pr
16                            discover()      : Discover closest pro
17                            disc_complete() : Discovery succeeded/
18                            bkn_lring()     : Handle broken logica
19                            send_to_next()  : Send msg to next hos
20                            send_any_msg()  : Send msg to addresse
21                            send_upd_msg()  : Send one update cach
22                            send_all_upd()  : Send all update cach
23                            resend()        : Retransmit I frames.
24
25  ****************************************************************
26
27  #ifndef lint
28  static char SrcId[] = "@(#) snd_fcns.c:3.4";
29  #endif
30
31
32  #include <cX.h>
33  #ifdef UNIX
34  #include <os/rtpb.h>
35  #include <os/message.h>
36  #else
37  #include <os/kerntypes.h>
38  #endif
39  #include <os/event.h>
40  #include <nim/mcinim.h>
41  #include <nim/mci.h>
42  #include "wd2840.h"
43  #include "nim.h"
44
45  static void discover();       /* fcn to issue a discovery message
46  static bool bkn_lring();      /* fcn to declare broken logical ring
47
48  /*
49   *      Initiate transmission of user message.
50   */
51  void send_user_msg(md)
52  register MSG_DESC    *md;           /* descriptor of message to be s
53  {
54      register MSG     *mh;           /* addr of a message header
```

```
55
56
57      /* Complete initialization of the message descriptor. */
58      mh = (MSG*)md->msg_addr;
59      md->mci_msg_addr = md->dup_msg_addr = 0;
60      md->mci_md              = 0;
61      md->header.hdrsize      = sizeof(MSG_HEADER);
62      md->header.version      = MH_VERSION;
63      md->header.msg_length   = mh->size + mh->hdrsize;
64      md->header.msg_type     = USER;
65      md->header.msg_origin   = md->header.msg_src = MY_SELF;
66      md->holder = md->owner  = my_cpuid;
67      md->flags               = FROM_KERNEL;
68      md->nonsemlen           = NONSEMLEN;
69      md->pglist              = 0;
70
71      if (!mci_enabled && (no_of_lans == 0))
72      {
73          tx_user_status(md, FAILURE);
74          return;
75      }
76
77      if (Symbolic(mh->mode))
78      {
79          /*
80          Message is addressed to a symbolic process name. Destination hos
81          will be obtained from the non-local process name cache.
82          */
83          if ((Robust_LRing(mh) && CONN_HOSTID(&mh->lri_conn) == MY_SELF)
84              ((mh->flags & CALLED) && CONN_HOSTID(&mh->src_conn) == MY_SE
85          {
86              if (mh->flags & CALLED)
87                  CONN_CHAN(&mh->src_conn) = lri_id;
88              if (Robust_LRing(mh))
89                  CONN_CHAN(&mh->lri_conn) = lri_id;
90              lri_id++;
91          }
92          md->header.msg_origin = MY_SELF;
93          send_symb_msg(md, NULL);
94      } else
95      {
96          /*
97          Message is addressed via connector. The destination host id can
98          extracted from the connector.
99          */
100         if (mh->flags & ERROR)
101             md->header.msg_dest = CONN_HOSTID(&mh->src_conn);
102         else
103         {   md->header.msg_dest = CONN_HOSTID(&mh->dst_conn);
104             if ((mh->flags & CALLED) && CONN_HOSTID(&mh->src_conn) == MY
105                 CONN_CHAN(&mh->src_conn) = lri_id++;
106         }
107         send_any_msg(md);
108     }
109 }
110
111 /*
112  *      Send symbolically addressed user message.
113  */
114 void send_symb_msg(md, cache)
115 register MSG_DESC    *md;          /* descriptor for msg to send
116 register CACHE       *cache;       /* addr of non-local cache recor
117 {
118     extern HASH_REC   nl_hash[];   /* non-local name cache hash tab
119     uint32            hostid;      /* id of sending host
120     register bool     local;       /* local/remote delivery if TRUE
121     MSG               *mh;         /* addr of the message's header
122
123
124     /* Unless specified, search non-local cache for addressed process na
125     if (cache == NULL)
126         if ((cache = srch_cache(nl_hash, md->header.destname)) == NULL)
127         {
128             cache = get_cache_rec();
129             strcpy(cache->name, md->header.destname);
130             cache->local = (mci_enabled) ? UNKNOWN_CPU : NOWHERE_CPU;
131             cache->remote = (*nim_cpuid == NOWHERE_CPU) ? NOWHERE_HOST
132                                                        : UNKNOWN_HOST;
133             cache->flags = 0;
134             add_to_cache(nl_hash, cache);
```

```
135        }
136        cache->flags |= (md->header.msg_origin == MY_SELF) ? FOR_SELF : FOR_
137
138        /* Wait for local discovery completion if currently in progress. */
139        if (cache->flags & LDISC_IN_PROG)
140        {
141            link(md, &disc_hold_list);
142            return;
143        }
144
145        /* Initiate local discovery if required. */
146        if (cache->local == UNKNOWN_CPU)
147        {
148            discover(md, cache, LDISC_IN_PROG);
149            return;
150        }
151
152        /* Get reference host id. */
153        if (((MSG*)md->msg_addr)->lrflags & INLRING)
154            hostid = CONN_HOSTID(&((MSG*)md->msg_addr)->lri_conn);
155        else
156            hostid = md->header.msg_origin;
157
158        /* Determine if should deliver message locally or remotely. */
159        if (cache->local == NOWHERE_CPU)
160            local = FALSE;
161        else
162            if (NODEID(hostid) == my_nodeid)
163                if (CPUID(hostid) == my_cpuid)
164                    local = TRUE;
165                else
166                    local = beyond(CPUID(hostid), cache->local, my_cpuid);
167            else
168                if (*nim_cpuid == my_cpuid)
169                    local = TRUE;
170                else
171                    local = beyond(*nim_cpuid, cache->local, my_cpuid);
172
173        if (local)
174        {
175            /* Deliver message to closest local process. */
176            md->header.msg_dest = HOST(cache->local, my_nodeid);
177            send_any_msg(md);
178        } else
179        {
180            /* Wait for remote discovery completion if currently in progress
181            if (cache->flags & RDISC_IN_PROG)
182            {
183                link(md, &disc_hold_list);
184                return;
185            }
186
187            /* Deliver message to closest remote process. */
188            switch (NODEID(cache->remote))
189            {
190            case UNKNOWN_NODE:
191                discover(md, cache, RDISC_IN_PROG);
192                break;
193            case NOWHERE_NODE:
194                if (hostid == MY_SELF)
195                    tx_user_status(md, FAILURE);
196                else
197                    if (((MSG*)md->msg_addr)->lrflags & INLRING)
198                        if (cache->local == NOWHERE_CPU)
199                            if (bkn_lring(md))
200                                tx_user_status(md, FAILURE);
201                            else
202                                send_any_msg(md);
203                        else
204                        {
205                            md->header.msg_dest = HOST(cache->local, my_node
206                            if (beyond(cache->local, CPUID(hostid), my_cpuid
207                                bkn_lring(md);
208                            send_any_msg(md);
209                        }
210                    else
211                        free_msg_desc(md);
212                break;
213            default:
214                md->header.msg_dest = cache->remote;
```

```
215             if (md->header.msg_origin != MY_SELF)
216             {
217                 /* Ensure multi-destination messages don't return to ori
218                 if (atbeyond_host(cache->remote, md->header.msg_origin))
219                 {
220                     free_msg_desc(md);
221                     return;
222                 }
223             } else
224                 if (((MSG*)md->msg_addr)->lrflags & INLRING &&
225                     hostid != MY_SELF)
226                 {
227                     if (NODEID(cache->remote) == NODEID(hostid))
228                         md->header.msg_dest = hostid;
229                     else
230                         if (beyond(md->header.msg_dest, hostid, my_nodei
231                             bkn_lring(md);
232                 }
233             send_any_msg(md);
234             break;
235         }
236     }
237 }
238
239 /*
240  *      Discover closest local or remote instance of a named process.
241  */
242 static void discover(md, cache, remloc)
243 register MSG_DESC       *md;      /* symbolically addressed user message
244 register CACHE          *cache;   /* non-local cache record for destinatio
245 register bool           remloc;   /* remote:RDISC_IN_PROG, local:LDISC_IN_
246 {
247     /* Convert local discovery into remote discovery if no other local c
248     if ((remloc == LDISC_IN_PROG) && (!mci_enabled || ProcCount<2))
249     {
250         cache->local = NOWHERE_CPU;
251         if (!(cache->flags & RDISC_IN_PROG) && (cache->remote != UNKNOWN
252         {
253             send_symb_msg(md, cache);
254             return;
255         } else
256             remloc = RDISC_IN_PROG;
257     }
258     link(md, &disc_hold_list);
259
260     /* Initiate discovery if not already in progress. */
261     if (!(cache->flags & remloc))
262     {
263         md = get_msg_desc();
264         if (remloc == RDISC_IN_PROG)
265         {
266             md->header.msg_type = DISCOVERY;
267             md->header.msg_dest = UNKNOWN_HOST;
268         } else
269         {
270             md->header.msg_type = LDISCOVERY;
271             md->header.msg_dest = MY_SELF;
272         }
273         md->header.msg_src = MY_SELF;
274         md->header.msg_length = strlen(cache->name) + 1;
275         if (mci_enabled)
276         {
277 #ifdef UNIX
278             bcopy(cache->name, md->message, md->header.msg_length);
279 #else
280             memcpy(md->message, cache->name, md->header.msg_length);
281 #endif
282             md->msg_addr = md->message;
283         } else
284             md->msg_addr = cache->name;
285         cache->flags |= remloc;
286         send_to_next(md);
287     }
288 }
289
290 /*
291  *      Discovery completed.
292  */
293 void disc_complete(md, found)
```

```
294     register MSG_DESC       *md;    /* descriptor of DISCOVERY or DISCOVERY_
295     bool                    found;  /* TRUE if process was discovered
296     {
297         register CACHE      *cache; /* non-local cache record for destinatio
298         register MSG_DESC   *md2;   /* a msg awaiting discovery completion
299         MSG_DESC            *md3;   /* next msg awaiting discovery completio
300         MSG_DESC            *md4;   /* last msg awaiting discovery completio
301         bool                local;  /* set to TRUE if local discovery comple
302
303
304         /* Update the cache record. */
305         if (cache = srch_cache(nl_hash, md->msg_addr))
306         {
307             if (found)
308                 local = (NODEID(md->header.msg_src) == my_nodeid);
309             else
310                 local = (md->header.msg_type == LDISCOVERY);
311
312             if (local)
313             {   cache->flags &= ~LDISC_IN_PROG;
314                 if (found)
315                 {
316                     if ((cache->local == UNKNOWN_CPU) ||
317                         beyond(cache->local, CPUID(md->header.msg_src), my_c
318                         cache->local = CPUID(md->header.msg_src);
319                 } else
320                 {
321                     if (cache->local == UNKNOWN_CPU)
322                         cache->local = NOWHERE_CPU;
323                 }
324             } else
325             {   cache->flags &= ~RDISC_IN_PROG;
326                 if (found)
327                 {
328                     if ((cache->remote == UNKNOWN_HOST) ||
329                         beyond(NODEID(cache->remote),
330                                NODEID(md->header.msg_src), my_nodeid))
331                         cache->remote = md->header.msg_src;
332                 } else
333                 {
334                     if (cache->remote == UNKNOWN_HOST)
335                         cache->remote = NOWHERE_HOST;
336                 }
337             }
338         }
339
340         /* Dequeue messages awaiting discovery completion. */
341         if (disc_hold_list.memb_cnt != 0)
342         {
343             md3 = (MSG_DESC*)disc_hold_list.head;
344             md4 = (MSG_DESC*)disc_hold_list.tail;
345             do
346             {
347                 md2 = md3;
348                 md3 = md3->next;
349                 if (!strcmp(md2->header.destname, md->msg_addr))
350                 {
351                     unlink(md2, &disc_hold_list);
352                     send_symb_msg(md2, cache);
353                 }
354             } while (md2 != md4);
355         }
356     }
357
358
359
360
361     /*
362      *      Determine if logical ring is broken.
363      */
364     static bool bkn_lring(md)
365     MSG_DESC                    *md;
366     {
367         register MSG            *mh;
368
369         mh = (MSG*)md->msg_addr;
370         if ((mh->xmit_stat == NO_ERROR) && !(mh->lrflags & LRDEAD))
371         {
372             mh->xmit_stat = BROKEN_LRING;
```

```
373              mh->lrflags |= LRDEAD;
374              return(TRUE);
375         } else
376         {
377              mh->dst_conn = mh->lri_conn;
378              mh->xmit_stat = BROKEN_LRING;
379              mh->flags |= ERROR;
380              mh->mode = (uint8)DIRECT;
381              md->header.msg_dest = CONN_HOSTID(&mh->src_conn);
382              return(FALSE);
383         }
384    }
385
386    /*
387     *    Send message to the next local cpu or the next node.
388     */
389    void send_to_next(md)
390    register MSG_DESC       *md;        /* descriptor of message to be sent
391    {
392         register LAN_INFO    *li;       /* addr of a lan info record
393         register int         lan;       /* lan or board number
394         register MCI_CHANNEL *channel;  /* addr of MCI data structure for ne
395         register uint8       nextcpu;   /* addr of closest local cpu
396         uint32               nexthost;  /* addr of closest node
397         int                  error = 0; /* error code for tx_status()
398         uint16               sr_save;   /* processor status register content
399         bool                 free_it;   /* free msg desc if sent to local cp
400
401
402         /* Determine if next node explicitly requested. */
403         if (md->header.msg_type == DISCOVERY &&
404             NODEID(md->header.msg_origin) == my_nodeid)
405             md->header.msg_dest = UNKNOWN_HOST;
406         else
407         {
408             /* Get id of closest active local cpu. */
409             if ((!mci_enabled) || (ProcCount < 2))
410                 nextcpu = NOWHERE_CPU;
411             else
412             {
413                 if ((nextcpu = my_cpuid+1) >= ProcCount)
414                     nextcpu = 0;
415                 channel = Get_channel(nextcpu,my_cpuid);
416                 while (channel->status != MCI_ACTIVE)
417                 {
418                     if (++nextcpu >= ProcCount)
419                     {   nextcpu = 0;
420                         channel -= (ProcCount-1)*NOCPU;
421                     } else
422                         channel += NOCPU;
423                     if (nextcpu == my_cpuid)
424                     {   nextcpu = NOWHERE_CPU;
425                         break;
426                     }
427                 }
428             }
429
430             if (NODEID(md->header.msg_origin) == my_nodeid)
431                 /* Handle locally originated messages. */
432                 if (CPUID(md->header.msg_origin) == my_cpuid)
433                 {
434                     if (nextcpu == NOWHERE_CPU)
435                         if (md->header.msg_type == LDISCOVERY ||
436                             md->header.msg_type == LAN_STATE_CHG)
437                             error = TXS_NO_NEXT;
438                         else
439                             md->header.msg_dest = UNKNOWN_HOST;
440                 } else
441                 {
442                     if ((nextcpu == NOWHERE_CPU) ||
443                         beyond(nextcpu, CPUID(md->header.msg_origin), my
444                         error = TXS_CPU_DEAD;
445                     else
446                         if (nextcpu == CPUID(md->header.msg_origin) &&
447                             md->header.msg_type != LDISCOVERY &&
448                             md->header.msg_type != LAN_STATE_CHG)
449                             md->header.msg_dest = UNKNOWN_HOST;
450                 }
451             else
```

```
452         /* Handle remotely originated messages. */
453         if (nextcpu == NOWHERE_CPU)
454             md->header.msg_dest = UNKNOWN_HOST;
455         else
456         {
457             if (beyond(nextcpu, *nim_cpuid, my_cpuid))
458                 error = TXS_NIMCPU_DEAD;
459             else
460                 if (nextcpu == *nim_cpuid)
461                     md->header.msg_dest = UNKNOWN_HOST;
462         }
463     }
464
465
466     if (!error)
467     {
468         /* Send message to next local cpu if one was found. */
469         if (NODEID(md->header.msg_dest) != UNKNOWN_NODE)
470             md->header.msg_dest = HOST(nextcpu, my_nodeid);
471         else
472         {
473             /* Otherwise try to send it to the closest node. */
474             if (*nim_cpuid == NOWHERE_CPU)
475                 if (NODEID(md->header.msg_origin) == my_nodeid)
476                 {
477                     if (nextcpu == NOWHERE_CPU)
478                         error = TXS_NO_NEXT;
479                     else
480                         md->header.msg_dest = md->header.msg_origin;
481                 }
482                 else
483                     error = TXS_NIMCPU_DEAD;
484             else
485             {
486                 /* Route message to NIM cpu if we aren't controlling the
487                 if (*nim_cpuid != my_cpuid)
488                 {
489                     free_it = (md->mci_md != 0);
490 #ifdef MMU
491                     if (md->header.msg_type == USER &&
492                         md->header.msg_origin == MY_SELF &&
493                         md->pglist == 0)
494                         mk_pglist(md);
495 #endif
496                     sr_save = set_sr (IPM7);
497                     error = snd_viamci (*nim_cpuid, md, TRUE);
498                     (void)set_sr (sr_save);
499                     if (error != TXS_NO_BPE)
500                         if (error)
501                             tx_status(md, error, FALSE);
502                         else
503                             if (free_it)
504                                 free_msg_desc(md);
505                     return;
506                 }
507
508                 /* We are controlling the NIM so find the closest node.
509                 nexthost = UNKNOWN_HOST;
510                 for (lan = 0, li = lan_info; lan < no_of_lans; lan++, li
511                     if (li->lan_state == INRING && li->next_host != UNKN
512                         if (nexthost == UNKNOWN_HOST)
513                             nexthost = li->next_host;
514                         else
515                             if (!beyond(NODEID(li->next_host),
516                                         NODEID(nexthost), my_nodeid))
517                                 nexthost = li->next_host;
518
519                 if (nexthost == UNKNOWN_HOST)
520                 {
521                     if (succ_timer.flags & IN_LIST)
522                     {   md->header.msg_dest = MY_SELF;
523                         link(md, &succ_hold_list);
524                         return;
525                     }
526
527                     if (md->header.msg_origin == MY_SELF)
528                     {   if (md->header.msg_src != MY_SELF)
529                         {   md->header.msg_dest = MY_SELF;
530                             rcvd_msg(md);
531                             return;
```

```
532                         }
533                             error = TXS_NO_NEXT;
534                     } else
535                         if (NODEID(md->header.msg_origin) != my_nodeid)
536                             error = TXS_NO_NEXT;
537                         else
538                             md->header.msg_dest = md->header.msg_origin;
539                 } else
540                     if ((NODEID(md->header.msg_origin) != my_nodeid) &&
541                         (beyond(NODEID(nexthost),
542                                 NODEID(md->header.msg_origin), my_nodeid
543                         error = TXS_ORG_DEAD;
544                     else
545                         /* Send message to the next node. */
546                         if (NODEID(md->header.msg_origin) == NODEID(next
547                             md->header.msg_dest = md->header.msg_origin;
548                         else
549                             md->header.msg_dest = nexthost;
550             }
551         }
552     }
553
554     if (error)
555         tx_status(md, error, FALSE);
556     else
557         send_any_msg(md);
558 }
559
560 /*
561  *      Send message to addressed host.
562  */
563 void send_any_msg(md)
564 register MSG_DESC    *md;                /* descriptor of message to be s
565 {
566     register uint32     destnode;        /* id of addressed node
567     register uint8      destcpu;         /* id of addressed cpu
568     MSG                 *mh;             /* addr of the message's header
569     int                 error;           /* error code for tx_status()
570     uint16              sr_save;         /* processor status register con
571     bool                free_it;         /* free msg desc if sent to loca
572
573
574     /* Handle transmission to a process on this cpu. */
575     if (md->header.msg_dest == MY_SELF)
576     {
577         mh = (MSG*)md->msg_addr;
578         mh->flags |= FROMNIM;
579         if (Symbolic(mh->mode))
580             if (mh->mode == (uint8)INHERIT)
581                 Forward(NEXT, md->header.destname, Body(mh));
582             else
583                 Forward(mh->mode, md->header.destname, Body(mh));
584         else
585             if (mh->flags & ERROR)
586                 Forward(mh->mode, &mh->src_conn, Body(mh));
587             else
588                 Forward(mh->mode, &mh->dst_conn, Body(mh));
589         md->msg_addr = 0;
590         free_msg_desc(md);
591         return;
592     }
593
594     /* Determine whether a local or remote cpu is addressed. */
595     destnode = NODEID(md->header.msg_dest);
596     if (destnode == my_nodeid)
597         destcpu = CPUID(md->header.msg_dest);
598     else
599     {
600         /* Ensure that the node id is valid and that there is a NIM boar
601         if (destnode == UNKNOWN_NODE || destnode == NOWHERE_NODE)
602         {
603             tx_status(md, TXS_INV_DEST, FALSE);
604             return;
605         }
606         if (*nim_cpuid == NOWHERE_CPU)
607         {
608             tx_status(md, TXS_NO_NIM, FALSE);
609             return;
610         }
```

```
611
612         /* Queue message to LAN if we are controlling the NIM, otherwise
613            route the message to the CPU controlling the NIM. */
614         if (*nim_cpuid == my_cpuid)
615         {
616             queue_to_nim(md);
617             return;
618         } else
619             destcpu = *nim_cpuid;
620     }
621
622     /* Send message to local cpu. */
623     free_it = (md->mci_md != 0);
624 #ifdef MMU
625     if (md->header.msg_type == USER &&
626         md->header.msg_origin == MY_SELF &&
627         md->pglist == 0)
628         mk_pglist(md);
629 #endif
630     sr_save = set_sr (IPM7);
631     error = snd_viamci (destcpu, md, TRUE);
632     (void)set_sr (sr_save);
633     if (error != TXS_NO_BPE)
634         if (error != NULL)
635             tx_status(md, error, FALSE);
636         else
637             if (free_it)
638                 free_msg_desc(md);
639 }
640
641 /*
642  *      Inform the host that issued the Call or initiated the robust LRI
643  *      that the message has been forwarded to the specified host.
644  */
645 void send_fwd(msgtype, conn, holder)
646 uint8               msgtype;        /* CALL_FORWARD of RLR_FORWARD
647 register CONNECTOR  *conn;          /* connector to original sender
648 uint32              holder;         /* node currently holding the ms
649 {
650     register MSG_DESC   *md;        /* forward message's descriptor
651
652
653     /*
654     A message, containing the connector to the Call'ing process or the r
655     logical ring initiator and the address of the node currently holding
656     message, is sent to the node that originated the message.
657     */
658     md = get_msg_desc();
659     md->header.msg_type   = msgtype;
660     md->header.msg_origin = MY_SELF;
661     md->header.msg_dest   = CONN_HOSTID(conn);
662     md->header.msg_length = sizeof(struct msg_forward);
663     md->msg_addr          = md->message;
664     ((struct msg_forward *)md->msg_addr)->conn = *conn;
665     ((struct msg_forward *)md->msg_addr)->holder = holder;
666     send_any_msg(md);
667 }
668
669 /*
670  *      Send an update cache message containing the name of the
671  *      created/deleted process.
672  */
673 void send_upd_msg(cache)
674 register CACHE      *cache;     /* addr of process name cache record
675 {
676     register MSG_DESC   *md;    /* addr of update message's descriptor
677
678
679     /* Compose either a process created or process deleted message. */
680     md = get_msg_desc();
681     md->header.msg_type = (cache->instances) ? PROCESS_CREATED
682                                              : PROCESS_DELETED;
683     md->header.msg_length = strlen(cache->name) + 1;
684     if (mci_enabled)
685     {
686 #ifdef UNIX
687         bcopy(cache->name, md->message, md->header.msg_length);
688 #else
689         memcpy(md->message, cache->name, md->header.msg_length);
690 #endif
```

```
691             md->msg_addr = md->message;
692         } else
693             md->msg_addr = cache->name;
694         md->header.msg_dest = my_nodeid;
695         cache->flags |= UPD_MSG_SENT;
696         cache->outstanding++;
697
698         /* Send message on its way to all cpus and nodes. */
699         send_to_next(md);
700     }
701
702
703     /*
704      *      Send an update cache message for each local process.
705      */
706     void send_all_upd()
707     {
708         extern HASH_REC    l_hash[];      /* local process name cache hash
709         register CACHE     *cache;        /* addr of a local name cache re
710         register int       index;         /* index into name cache hash ta
711
712
713         for (index = 0; index < PHTSIZE; index++)
714         {
715             cache = (CACHE*)(l_hash[index].hash_list.head);
716             for ( ; cache != 0; cache = cache->next)
717                 if (!(cache->flags & UPD_MSG_SENT) && !cache->outstanding)
718                     send_upd_msg(cache);
719         }
720     }
721
722     void resend(ni, li)
723     register NODE_INFO *ni;       /* info of node to retransmit to
724     register LAN_INFO  *li;       /* info of corresponding lan
725     {
726         register MSG_DESC *md;       /* addr of a message descriptor
727         register MSG_DESC *md2;      /* addr of a message descriptor
728         register TX_FRM_TAB *frm_info;/* addr of unacked frame info record
729         register uint8 seqno;        /* frame sequence number
730         LIST *txlist;                /* address of a transmission queue
731         register int i;              /* loop counter
732
733
734         /*
735         If synchronizing and the max number of retries have been attempted,
736         dequeue all messages in the transmission list. A transmission failur
737         reported for each of these messages. If the retry count has not expi
738         another SABM will be sent.
739         */
740         if (ni->sync_in_progress)
741         {
742             ni->sync_in_progress = FALSE;
743             if (--ni->retry_cnt < 0)
744             {
745                 ni->retry_cnt = 0;
746                 for (i = 0, txlist = ni->tx_list; i < TX_LISTS; i++, txlist+
747                 {
748                     md = (MSG_DESC*)txlist->head;
749                     Init_list(txlist);
750                     for ( ; md != 0; md = md2)
751                     {
752                         md2 = md->next;
753                         tx_status(md, TXS_NO_RESP, retry(TXS_NO_RESP, ni));
754                     }
755                 }
756             } else
757                 if (li->board_addr != 0)
758                     send_via_nim(ni, li);
759                 else
760                     send_via37x(ni, li);
761         /*
762         If already synchronized with I frames outstanding, the message point
763         are backed up and the byte counts incremented by the number of bytes
764         be retransmitted. The transmit sequence number is reset to the oldes
765         outstanding frame's number. If the maximum number of retries have be
766         attempted, the cell is desynchronized and one SABM will be transmitt
767         before abandoning the effort. Otherwise the frames are retransmitted
768         */
769         } else
```

```
770     {
771         seqno = ni->ack_seq_no;
772         for ( ; seqno != ni->tx_seq_no; seqno = Next_seq_no(seqno, li->w
773         {
774             frm_info = &ni->tx_frm_tab[seqno];
775             if (!(md = frm_info->msg_desc))
776                 continue;
777             if ((md->header.msg_type == USER) &&
778                 (frm_info->frm_ptr == md->msg_addr + NONSEMLEN))
779             {
780                 md->msg_len = md->header.msg_length;
781                 md->msg_ptr = frm_info->frm_ptr;
782                 md->flags &= ~MD_TRANSMITTED;
783             } else
784                 if (frm_info->frm_ptr < md->msg_ptr)
785                 {
786                     md->msg_len += md->msg_ptr - frm_info->frm_ptr;
787                     md->msg_ptr = frm_info->frm_ptr;
788                     md->flags &= ~MD_TRANSMITTED;
789                 }
790         }
791         ni->tx_seq_no = ni->ack_seq_no;
792         if (--ni->retry_cnt < 0)
793         {
794             ni->retry_cnt = 0;
795             ni->in_sync = FALSE;
796         }
797         if (li->board_addr != 0)
798             send_via_nim(ni, li);
799         else
800             send_via37x(ni, li);
801     }
802 }
```

APPENDIX D

```
1   /********************************************************************
2
3       (C) Copyright 1989.  All Rights Reserved.  Computer X, Inc.
4
5       Reproduction of this software by recipient in whole or
6       in part is forbidden except as provided in writing by
7       Computer X, Inc.
8
9       Module           : @(#)tx_status.c      3.2  89/01/30
10      Date submitted   : 89/01/30  15:55:59
11      Origin           : Computer X
12      Description      : Message transmission status functions.
13
14                         tx_status      : Msg transmission fail
15                         tx_succ        : Msg transmission succ
16                         tx_user_status : Completed transmissio
17                                          own USER message.
18                         retry          : Determine if should r
19
20  ********************************************************************
21
22  #ifndef lint
23  static char SrcId[] = "@(#) tx_status.c:3.2";
24  #endif
25
26
27  #include <osi/selsizes.h>
28  #ifdef UNIX
29  #include <sys/ci_driver.h>
30  #include <sys/ci_const.h>
31  #undef TRUE
32  #undef FALSE
33  #undef SUCCESS
34  #undef FAILURE
35  #include <sys/ci_struct.h>
36  #undef msg
37  #include <sys/ci_global.h>
38  #include <cX.h>
39  #else
40  #include <map/types.h>
41  #undef LOCAL
42  #include <cX.h>
43  #include <map/ce_37xdrv.h>
44  #include <map/ce_37xcnst.h>
45  #include <map/ce_37xtype.h>
46  #undef msg
```

```
#endif
#include <nim/cXlan.h>
undef NEW_SUCCESSOR ifdef UNIX
include <os/rtpb.h>
#include <os/message.h>
#else
#include <os/kerntypes.h>
endif include <nim/mcinim.h>
include "wd2840.h"
#include "nim.h"

void tx_status(md, error, should_retry)
register MSG_DESC *md;               /* descriptor for transmitted messa
int error;                           /* transmission status (TXS_ consta
bool should_retry;                   /* attempt a retry if TRUE
{
    extern HASH_REC l_hash[];        /* local process name cache hash ta
    register CACHE *cache;           /* addr of a process name cache rec if (should_retry)
    {
        if (md->header.msg_type == USER)
            if (Symbolic(((MSG*)md->msg_addr)->mode) &&
                (md->header.msg_dest != md->header.msg_origin))
                send_symb_msg(md, NULL);
            else
                send_any_msg(md);
        else
            if (md->header.msg_type == CALL_FORWARD ||
                md->header.msg_type == RLR_FORWARD ||
                md->header.msg_type == FLUSH_RLRING ||
                md->header.msg_type == ACCEPTANCE ||
                md->header.msg_type == DISCOVERY_RESP)
                send_any_msg(md);
            else
                send_to_next(md);
        return;
    } if (md->header.msg_origin != MY_SELF &&
        NODEID(md->header.msg_origin) == my_nodeid &&
        md->header.msg_dest != md->header.msg_origin)
    {
        md->ipcmsgtype = TXFAILED;
        md->header.msg_dest = md->header.msg_origin;
        *(int*)md->message = error;
        send_any_msg(md);
        return;
    } switch (md->header.msg_type)
    {
    case USER:
        if (md->header.msg_origin == MY_SELF)
        {
            if (error == TXS_NO_MEMORY)
            {
                ((MSG*)md->msg_addr)->xmit_stat = FAILED_DELIVERY;
                CONN_HOSTID(&((MSG*)md->msg_addr)->dst_conn) = md->heade
            }
            tx_user_status(md, FAILURE);
        } else
            free_msg_desc(md);
        break;
    case PROCESS_CREATED:
    case PROCESS_DELETED:
        if (md->header.msg_origin == MY_SELF)
        {
            cache = srch_cache(l_hash, md->msg_addr);
            if (--cache->outstanding == 0)
            {
                cache->flags &= ~UPD_MSG_SENT;
                if (cache->instances == 0)
                    rem_fr_cache(l_hash, cache);
```

```
127              }
128           }
129           free_msg_desc(md);
130           break;
131       case DISCOVERY:
132       case LDISCOVERY:
133           if (md->header.msg_origin == MY_SELF)
134               disc_complete(md, FALSE);
135           free_msg_desc(md);
136           break;
137       case DISCOVERY_RESP:
138       case RLR_FORWARD:
139       case FLUSH_RLRING:
140       case ACCEPTANCE:
141       case LAN_STATE_CHG:
142       case MCIACK:
143           free_msg_desc(md);
144           break;
145       }
146   }
147
148   void tx_succ(md)
149   register MSG_DESC *md;                    /* descriptor for transmitted messa
150   {
151       register MSG *hdr;                    /* addr of kernel's message header
152
153       switch (md->header.msg_type)
154       {
155       case USER:
156           hdr = (MSG*)md->msg_addr;
157           if (md->header.msg_origin != MY_SELF)
158           {
159               if ((hdr->flags & CALLED) &&
160                   (CONN_HOSTID(&hdr->src_conn) != MY_SELF) &&
161                   (CONN_HOSTID(&hdr->src_conn) != md->header.msg_dest) &&
162                   !((hdr->mode == (uint8)NEXT || hdr->mode == (uint8)INHER
163                   (hdr->flags & ACCEPTED)))
164                   send_fwd(CALL_FORWARD, &hdr->src_conn, md->header.de
165               else
166                   if (Robust_LRing(hdr) &&
167                       (CONN_HOSTID(&hdr->lri_conn) != MY_SELF) &&
168                       (CONN_HOSTID(&hdr->lri_conn) != md->header.msg_dest)
169                       send_fwd(RLR_FORWARD, &hdr->lri_conn, md->header.msg
170               free_msg_desc(md);
171           } else
172               if (Symbolic(hdr->mode))
173               {
174                   if ((hdr->flags & CALLED) &&
175                       (CONN_HOSTID(&hdr->src_conn) != MY_SELF) &&
176                       (CONN_HOSTID(&hdr->src_conn) != md->header.msg_dest)
177                       send_fwd(CALL_FORWARD, &hdr->src_conn, md->header.ms
178                   else
179                       if (Robust_LRing(hdr) &&
180                           (CONN_HOSTID(&hdr->lri_conn) != MY_SELF) &&
181                           (CONN_HOSTID(&hdr->lri_conn) != md->header.msg_d
182                           send_fwd(RLR_FORWARD, &hdr->lri_conn, md->header
183                   if (hdr->mode == (uint8)ALL || hdr->mode == (uint8)LOCAL
184                       free_msg_desc(md);
185                   else
186                       link_msgret(md);
187               } else
188                   if (hdr->flags & CALLED)
189                       link(md, &call_list);
190                   else
191                       tx_user_status(md, SUCCESS);
192           break;
193       case PROCESS_CREATED:
194       case PROCESS_DELETED:
195       case DISCOVERY:
196       case LDISCOVERY:
197       case NEW_SUCCESSOR:
198           if (md->header.msg_origin == MY_SELF)
199               link_msgret(md);
200           else
201               free_msg_desc(md);
202           break;
203       case DISCOVERY_RESP:
204       case CALL_FORWARD:
205       case RLR_FORWARD:
```

```
206         case FLUSH_RLRING:
207         case ACCEPTANCE:
208         case MCIACK:
209             free_msg_desc(md);
210             break;
211         }
212     }
213
214
215     void tx_user_status(md, status)
216     register MSG_DESC *md;       /* descriptor for transmitted message
217     bool status;                  /* transmission status (SUCCESS,FAILURE)
218     {
219         register MSG *hdr;       /* addr of message's kernel header
220
221
222         hdr = (MSG*)md->msg_addr;
223         if (status == FAILURE)
224         {
225             if (hdr->lrflags & INLRING)
226             {
227                 if (hdr->xmit_stat == NODE_DEATH)
228                 {
229                     if (!(hdr->flags & ERROR))
230                     {
231                         hdr->flags |= ERROR | FROMNIM;
232                         Forward(DIRECT, &hdr->src_conn, Body(hdr));
233                         md->msg_addr = 0;
234                     }
235                 } else if (hdr->xmit_stat == FAILED_DELIVERY)
236                 {
237                     md->header.msg_dest = CONN_HOSTID(&hdr->lri_conn);
238                     send_any_msg(md);
239                     return;
240                 } else
241                 {
242                     hdr->flags |= FROMNIM;
243                     Forward(NEXT, md->header.destname, Body(hdr));
244                     md->msg_addr = 0;
245                 }
246             } else
247             if ((!(hdr->flags & ACCEPTED) &&
248                  (hdr->mode != (unsigned char)ALL) &&
249                  (hdr->mode != (unsigned char)LOCAL)) ||
250                  (hdr->flags & CALLED))
251             {
252                 if (!(hdr->flags & ERROR))
253                 {
254                     hdr->flags |= ERROR | FROMNIM;
255                     if (hdr->xmit_stat == NO_ERROR)
256                         hdr->xmit_stat = NO_DESTINATION;
257                     Forward(DIRECT, &hdr->src_conn, Body(hdr));
258                     md->msg_addr = 0;
259                 }
260             }
261         }
262         free_msg_desc(md);
263     }
264
265     bool retry(error, ni)
266     int error;                        /* transmission status (TXS_ constants)
267     register NODE_INFO *ni;           /* destination node's info record
268     {
269         extern HASH_REC nl_hash[];    /* non-local name cache hash table
270         register CACHE *cache;         /* addr of a process name cache record
271         register int lan;              /* LAN or NIM board number
272         register int i;                /* loop counter
273         char *lanstate;                /* addr of a lan_state fields in ni
274         LAN_INFO *li;                  /* info record corresponding to LAN
275         bool should_retry;             /* set to TRUE if error warrants retry
276         struct cX_epb *epb;
277         char *m;
278
279         switch (error)
280         {
281         case TXS_NO_RESP:
282             lanstate = &ni->lan_state[lan = ni->lan];
283             if (*lanstate == LAN_BAD)
284                 should_retry = FALSE;
285             else
```

```
286         {
287             *lanstate = LAN_BAD;
288             li = &lan_info[lan];
289             if (ni->nodeid == NODEID(li->next_host))
290             {
291                 if (li->board_addr == 0)
292                     if (m = get_epbbuf(&epb, NULL, 0, li))
293                     {
294                         epb->hdr.type = cX_PATCH_NS;
295 #ifdef UNIX
296                         send_epb(epb, ni->nodeid, li);
297 #else
298                         send_epb(m, epb, ni->nodeid, li);
299 #endif
300                     }
301                 next_cell(UNKNOWN_HOST, li);
302             }
303             ni->lan = NO_LAN;
304             lanstate = &ni->lan_state[0];
305             for (lan = 0; lan < no_of_lans; lan++, lanstate++)
306                 if (*lanstate != LAN_BAD)
307                     break;
308             if (lan == no_of_lans)
309                 for (i = 0; i < PHTSIZE; i++)
310                 {
311                     cache = (CACHE*)nl_hash[i].hash_list.head;
312                     for ( ; cache != 0; cache = cache->next)
313                         if (NODEID(cache->remote) == ni->nodeid)
314                             cache->remote = UNKNOWN_HOST;
315                 }
316             should_retry = TRUE;
317         }
318         break;
319     default:
320         should_retry = FALSE;
321         break;
322     }
323
324     return(should_retry);
325 }
```

APPENDIX E

```
1   /***********************************************************************
2
3       (C) Copyright 1989.  All Rights Reserved.  Computer X, Inc.
4
5       Reproduction of this software by recipient in whole or
6       in part is forbidden except as provided in writing by
7       Computer X, Inc.
8
9       Module              : @(#)next_cell.c      3.1  89/01/11
10      Date submitted      : 89/01/11  13:21:37
11      Origin              : Computer X
12      Description         : Contains the following functions:
13                              next_cell()     : Successor node change
14                              closest_node()  : Determine closest nod
15                              fail_calls()    : Node/CPU death recove
16                              deq_deadmsgs()  : Dequeue Call and RLri
17                              send_newsucc()  : Inform of node/CPU de
18
19   ***********************************************************************
20
21   #ifndef lint
22   static char SrcId[] = "@(#) next_cell.c:3.1";
23   #endif
24
25
26   #include <cX.h>
27   #include <gen_codes.h>
28   #ifdef UNIX
29   #include <os/rtpb.h>
30   #include <os/message.h>
31   #else
32   #include <os/kerntypes.h>
33   #endif
34   #include <nim/mcinim.h>
35   #include "wd2840.h"
36   #include "nim.h"
```

```
uint32 closest_node(), next_node(), prev_node();
void deq_deadmsgs(), send_newsucc();

#define REPOLL_TIME    1500    /* msecs to re-poll previous successor

/*
 *      Successor node has changed.
 */
void next_cell(newnext, li)
uint32 newnext;                 /* host id of new successor
register LAN_INFO *li;          /* info for corresponding lan
{
    uint32 gap;                 /* lan addr gap between self & successor
    uint32 closest;             /* id of closest node on all lans if (newnext == li->next_host)
        return;

/* Set rate at which we poll for new successors. */
    if (li->board_addr != 0)
    {
        if (newnext == UNKNOWN_HOST)
            /* Unknown gap size so set poll rate to maximum. */
            li->poll_timer.init_value = ticks_per_wakeup;
        else
        {
            /* Poll rate inversely proportional to the poll gap size. */
            gap = NODEID(newnext) - my_nodeid +
                    ((NODEID(newnext) > my_nodeid) ? 0 : MAX_NODE_ID - 1
            li->poll_timer.init_value = (1000*include_time) / (gap*tick_
            if ((li->poll_timer.init_value /= ticks_per_wakeup) == 0)
                li->poll_timer.init_value = ticks_per_wakeup;
            else
                li->poll_timer.init_value *= ticks_per_wakeup;
        }
        if (li->poll_timer.flags & IN_LIST)
        {
            unlink_timer(&li->poll_timer, &li->timer_list);
            link_timer(&li->poll_timer, &li->timer_list);
        }
    }

/* Check for hung calls and inform other nodes of new successor. */
    if (li->next_host == UNKNOWN_HOST)          /* UNKNOWN --> !UNKNOWN
    {
        li->next_host = newnext;
        li->poll_addr = next_node(my_nodeid, li);
        closest = closest_node(NULL);
        fail_calls(my_nodeid, closest);
        send_newsucc(closest, li);
        stop_succ_tmr();
        if (li->board_addr != 0)
            li->board_addr->green_led = LED_ON;
        nim_up(li);
    } else if (newnext == UNKNOWN_HOST)         /* !UNKNOWN --> UNKNOWN
    {
        li->repoll_addr = li->next_host;
        li->next_host = UNKNOWN_HOST;
        if (li->board_addr != 0)
        {
            li->board_addr->green_led = LED_OFF;
            li->repoll_cnt = REPOLL_TIME/wakeup_period;
            link_timer(&li->repoll_timer, &li->timer_list);
            repoll(li);
        }
        start_succ_tmr(li);
    } else                                       /* !UNKNOWN --> !UNKNOWN
    {
        li->next_host = newnext;
        newnext = NODEID(newnext);
        closest = closest_node(li);
        if ((closest == UNKNOWN_NODE) || !beyond(newnext, closest, my_no
        {   fail_calls(my_nodeid, newnext);
            send_newsucc(newnext, li);
        }
        stop_succ_tmr();
```

```
116      }
117  }
118
119
120
121
122  /*
123   *      Get id of closest node on any LAN (other than the one specified)
124   */
125  uint32 closest_node(li)
126  register LAN_INFO     *li;
127  {
128      register LAN_INFO    *li2;
129      register int         lan;
130      register uint32      closest = UNKNOWN_NODE;
131
132      for (lan=0, li2=lan_info; lan < no_of_lans; lan++, li2++)
133          if (li2 != li)
134              if ((closest == UNKNOWN_NODE) ||
135                      !beyond(NODEID(li2->next_host), closest, my_nodeid))
136                  closest = NODEID(li2->next_host);
137      return(closest);
138  }
139
140  /*
141   *      Recover from the death of one or more nodes or cpus.
142   */
143  void fail_calls(org, host)
144  uint32 org;                      /* host id of death reporter
145  uint32 host;                     /* host id of new CPU or new node succ
146  {
147      extern HASH_REC nl_hash[];   /* non-local proc name cache hash table
148      register MSG_DESC    *md;    /* message descriptor
149      register MSG_DESC    *md2;   /* message descriptor
150      register int         i;      /* loop counter
151      NODE_INFO            *ni;    /* info record for a node
152      LIST                 *txlist;/* transmit queue
153      CACHE                *cache; /* non-local process name cache record
154      bool                 node_died; /* TRUE if node died, FALSE if CPU d
155
156      /* Determine whether a node or cpu died. */
157      node_died = (NODEID(org) != NODEID(host));
158      if (node_died)
159      {   org = NODEID(org);
160          host = NODEID(host);
161      }
162
163      /* Dequeue Call and Robust lring messages lost when node(s) died. */
164      deq_deadmsgs(node_died, org, host, &call_list);
165      deq_deadmsgs(node_died, org, host, &rlr_list);
166
167      /* Update non-local cache. */
168      for (i = 0; i < PHTSIZE; i++)
169      {
170          cache = (CACHE*)nl_hash[i].hash_list.head;
171          for ( ; cache != 0; cache = cache->next)
172              if (node_died)
173              {
174                  if (host == NOWHERE_NODE)
175                      cache->remote = NOWHERE_HOST;
176                  else
177                      if (org == my_nodeid || cache->remote == NOWHERE_HOS
178                          cache->remote = UNKNOWN_HOST;
179                      else
180                          if (cache->remote != UNKNOWN_HOST &&
181                              cache->remote != org)
182                              if (!beyond(NODEID(cache->remote), host, org
183                                  beyond(NODEID(cache->remote), host, my_n
184                                  cache->remote = UNKNOWN_HOST;
185              } else
186                  if (NODEID(org) == my_nodeid)           /* Local cpu die
187                  {
188                      if (host == org)
189                          cache->local = NOWHERE_CPU;
190                      else
191                          if (cache->local != NOWHERE_CPU &&
192                              cache->local != UNKNOWN_CPU &&
193                              beyond(CPUID(host), cache->local, CPUID(org)
194                              cache->local = UNKNOWN_CPU;
```

```
195             } else
196             {
197                 if (NODEID(cache->remote) == NODEID(org))
198                     if (org == host)
199                     {   if (cache->remote != org)
200                             cache->remote = UNKNOWN_HOST;
201                     } else
202                         if (beyond(CPUID(host), CPUID(cache->remote)
203                                     CPUID(org)))
204                             cache->remote = UNKNOWN_HOST;
205             }
206     }
207
208     /* If a local cpu died, recover messages queued to it. */
209     if (!node_died && (NODEID(org) == my_nodeid))
210         for (md = (MSG_DESC*)mci_sent_list.head; md; md = md2)
211         {
212             md2 = md->next_sent;
213             if (CPUID(host) == CPUID(org) ||
214                 beyond(CPUID(host), md->holder, CPUID(org)))
215             {
216                 unlink_mci(md, &mci_sent_list);
217                 md->holder = my_cpuid;
218                 tx_status(md, TXS_CPU_DEAD, FALSE);
219             }
220         }
221
222     /* If node died, clean up. */
223     if (node_died)
224         for (ni = (NODE_INFO*)frmack_list.head; ni != 0; ni = ni->next_a
225         {
226             if ((host == NOWHERE_NODE) || beyond(host, ni->nodeid, org))
227             {
228                 /* ADD LAN BOOT CHECK HERE!! */
229                 ni->in_sync = ni->sync_in_progress = FALSE;
230                 free_md_list(&ni->rx_list);
231                 for (i = 0, txlist = ni->tx_list; i < TX_LISTS; i++, txl
232                 {
233                     md = (MSG_DESC*)txlist->head;
234                     Init_list(txlist);
235                     for ( ; md != 0; md = md2)
236                     {
237                         md2 = md->next;
238                         tx_status(md, TXS_NO_LAN, FALSE);
239                     }
240                 }
241             }
242         }
243 }
244
245 /*
246  *      Dequeue Call or Robust LRing messages that were lost
247  *      due to cpu or node death.
248  */
249 void deq_deadmsgs(node_died, org, host, list)
250 bool            node_died;      /* node death (T) or cpu death (F)
251 register uint32 org;            /* host id of death reporter host
252 register uint32 host;           /* host id of new successor
253 register LIST   *list;          /* list to dequeue messages from
254 {
255     register MSG_DESC *md;
256     register MSG_DESC *md2;
257
258     for (md = (MSG_DESC*)list->head; md; md = md2)
259     {
260         md2 = md->next;
261         if (node_died)
262         {   if (host == NOWHERE_NODE)
263             {   if (NODEID(md->header.msg_dest) == my_nodeid)
264                     continue;
265             } else
266                 if (!beyond(host, NODEID(md->header.msg_dest), org))
267                     continue;
268         } else
269         {   if (NODEID(md->header.msg_dest) != NODEID(org))
270                 continue;
271             if (host != org &&
272                 !beyond(CPUID(host), CPUID(md->header.msg_dest), CPUID(o
273                 continue;
274         }
```

```
275            unlink(md, list);
276            if (Robust_LRing((MSG*)md->msg_addr))
277            {
278                ((MSG*)md->msg_addr)->xmit_stat = BROKEN_LRING;
279                ((MSG*)md->msg_addr)->lrflags |= LRNODE;
280            } else
281                ((MSG*)md->msg_addr)->xmit_stat = NODE_DEATH;
282            CONN_HOSTID(&((MSG*)md->msg_addr)->dst_conn) = md->header.msg_de
283            tx_user_status(md, FAILURE);
284        }
285    }
286
287    /*
288     *     Inform other cpus/nodes of our new successor node.
289     */
290    void send_newsucc(nodeid, li)
291    uint32              nodeid;            /* node id of closest successor
292    register LAN_INFO   *li;
293    {
294        register MSG_DESC   *md;
295        char                *m;
296
297        md = get_msg_desc();
298        md->header.msg_type   = NEW_SUCCESSOR;
299        md->header.msg_origin = MY_SELF;
300        md->header.msg_dest   = UNKNOWN_HOST;
301        md->header.msg_length = sizeof(struct new_successor);
302        md->msg_addr          = md->message;
303        ((struct new_successor *)md->msg_addr)->succ_addr = nodeid;
304        send_to_next(md);
305
306    #ifndef UNIX
307        /* Inform Config_mgt of node death. */
308        m = Makemsg(128, "status", "code=#I; orig=#s; frst=#I; last=#I",
309                    cX_UNAVAILABLE, "$&@*#nimtm",
310                    next_node(my_nodeid, li), prev_node(nodeid, li));
311        inform_cm(m, cX_UNAVAILABLE);
312    #endif
313    }
314
315
316
317    /*
318     *     Increment node id.
319     */
320    uint32 next_node(nodeid, li)
321    uint32          nodeid;
322    LAN_INFO        *li;
323    {
324        if (li->board_addr)
325            return((nodeid == MAX_NODE_ID) ? 1 : nodeid+1);
326        else
327            return((nodeid == 0x00fffffe) ? 1 : nodeid+1);
328    }
329
330
331
332    /*
333     *     Decrement node id.
334     */
335    uint32 prev_node(nodeid, li)
336    uint32          nodeid;
337    LAN_INFO        *li;
338    {
339        if (li->board_addr)
340            return((nodeid == 1) ? MAX_NODE_ID : nodeid-1);
341        else
342            return((nodeid == 1) ? 0x00fffffe : nodeid-1);
343    }
```

APPENDIX F

```
1   #*********************************************************************
2   #
3   #       (C) Copyright 1987, 1988, 1989.  MOTOROLA Computer X, Inc.
4   #       All Rights Reserved.
5   #
6   #       The copyright notice above does not evidence any actual or
```

```
7    #         intended publication of this source code.  Reproduction by
8    #         recipient in whole or in part is forbidden except as provided
9    #         in writing by MOTOROLA Computer X, Inc.
10   #
11   #     Description       :
12   #               This routine implements the semantics of the
13   #               message transmission modes.
14   #
15   #************************************************************************
16
17           ident    "@(#)putfor.m4   3.5 - 89/03/30"
18
19   include(INCL'/os/rtpb.hs')dnl
20   include(INCL'/os/message.hs')dnl
21   include(INCL'/os/eim.hs')dnl
22
23
24           set      MAXMODE,10
25
26           set      NIMRTPB,(NIMLEVEL * 4)
27
28           set      SUSPENDME_B,     5            # from rtpb->sched field
29
30           set      KPROC_B,         6            # from rtpb->flags field
31           set      ABORTED_B,       5
32           set      NOTHERE_B,       4
33
34           set      P_LOCKMEM_B,     2            # from rtpb->pflag field
35
36           set      FROMNIM_B,       7            # from msg->flags field
37           set      ACCEPTED_B,      6
38           set      CALLED_B,        5
39           set      ERROR_B,         3
40
41           set      REPORTED_B,      1            # from msg->mflags field
42           set      MAPPED_B,        0
43
44           set      INLRING_B,       7            # from msg->lrflags field
45           set      LRCOMP_B,        6
46           set      LRDEAD_B,        5
47           set      ONODE_B,         4
48           set      ROBUST_B,        0
49
50
51           set      msg_sconn_host%,msg_src_conn% + connector_cnh%
52           set      msg_sconn_pid%, msg_src_conn% + connector_cn_procid%
53           set      msg_sconn_chan%,msg_src_conn% + connector_cn_channel%
54
55           set      msg_dconn_host%,msg_dst_conn% + connector_cnh%
56           set      msg_dconn_pid%, msg_dst_conn% + connector_cn_procid%
57           set      msg_dconn_chan%,msg_dst_conn% + connector_cn_channel%
58
59           set      msg_lconn_host%,msg_lri_conn% + connector_cnh%
60           set      msg_lconn_pid%, msg_lri_conn% + connector_cn_procid%
61           set      msg_lconn_chan%,msg_lri_conn% + connector_cn_channel%
62
63
64           text
65           global   putfor, a_putfor
66
67                                             # long   firstarg;
68           set      HASHID%,4                # short  hastid;
69           set      NAMSIZ%,6                # short  namsiz;
70           set      MFLAGS%,8                # uchar  mflags;
71           set      DELIVERED%,9             # uchar  delivered;
72           set      FOUNDSELF%,10            # uchar  foundself;
73           set      DESTNAME%,12             # char   destname[16];
74
75           set      LOCALSIZE,28
76
77   #######################################################################
78   #
79   # bool putfor(dstrtpb, mode, dest, msg)
80   #      RTPB *dstrtpb;
81   #      int  mode;
82   #      DESTINATION dest;
83   #      MSG *msg;
84   #
85   # this routine is the C-interface for the code
86   # that does the real work (a_putfor)
```

```
 87
 88  putfor:
 89          mov.l    %a2,-(%sp)              # save a2
 90          mov.l    8(%sp),%a2              # fetch destination rtpb
 91          movm.l   12(%sp),&0x0302         # %a0 = dest   %a1 = msg    %d1 =
 92          bsr.w    a_putfor
 93          mov.l    (%sp)+,%a2              # restore a2
 94          rts
 95
 96
 97  ##################################################################
 98  #
 99  # bool a_putfor(mode, dest, msg)
100  #      int mode;
101  #      DESTINATION dest;
102  #      MSG *msg;
103  #
104  # this routine can only be called from assembly language
105  # and expects the following registers to be set up as indicated
106  #      %a0 = destination
107  #      %a1 = message
108  #      %d1 = mode
109  # it determines which mode the message is to be delivered in
110  # and dispatches to the appropriate routine
111
112  a_putfor:
113          mov.l    %a5,-(%sp)
114          mov.l    %a1,%a5                  # save pointer to message
115          mov.b    %d1,msg_mode%(%a1)       # set up transmission mode in ms
116          beq.w    L%RETSNDR                # special case of return-to-send
117          cmp.l    %d1,&DIRECT%
118          beq.w    L%DIRECT                 # most common mode (save a few c
119          cmp.l    %d1,&EXPRESS%
120          beq.w    L%DIRECT                 # treat EXPRESS mode like DIRECT
121          cmp.l    %d1,&MAXMODE
122          bhi.w    L%badmode                # go report error and suspend ru
123
124          movm.l   &0x0c18,-(%sp)           # save d4,d5 + a3,a4
125          sub.l    &LOCALSIZE,%sp           # save space for locals
126          mov.l    %d1,%d5                  # save transmission mode tempora
127          mov.l    %a0,%d4
128          beq.b    NULL_dest                # test for NULL destination poin
129
130          lea.l    DESTNAME%(%sp),%a1
131          clr.b    15(%a1)                  # destname[15] = '\0';
132          mov.l    %a1,%d4                  # save address of destname (kvad
133          mov.l    &15,(%sp)                # use reserved stack slot for co
134          mov.l    %a1,-(%sp)               # kernel virtual address
135          mov.l    %a0,-(%sp)               # user virtual address
136          jsr      r_cur_user      # r_cur_user(running, dest, destname, 15
137          add.l    &8,%sp
138          tst.l    %d0
139          bmi.w    L%Ret_false
140  NULL_dest:
141          mov.b    msg_flags%(%a5),MFLAGS%(%sp)   #   save msg->flags
142          and.b    &0x3f,msg_flags%(%a5)    # msg->flags &= -(FROMNIM|ACCEPT
143          clr.l    msg_dconn_host%(%a5)
144          clr.l    msg_dconn_pid%(%a5)
145          clr.l    msg_dconn_chan%(%a5)
146          clr.b    DELIVERED%(%sp)
147          add.l    %d5,%d5                  # temporary use
148          mov.w    10(%pc,%d5.l),%d1
149          jmp      6(%pc,%d1.w)             # dispatch to the appropriate ro
150
151          swbeg    &MAXMODE+1
152  L%149:
153          short    L%RETSNDR-L%149
154          short    L%LOCAL-L%149
155          short    L%ALL-L%149
156          short    L%NEXT-L%149
157          short    L%badmd1-L%149
158          short    L%DIRECT-L%149
159          short    L%SELF-L%149
160          short    L%CONTEXT-L%149
161          short    L%INHERIT-L%149
162          short    L%DIRECT-L%149
163          short    L%LRING-L%149
164
165
166  ##################################################################
```

```
167
168   L%badmode:
169           movm.l    &0x0c18,?(%sp)           # save d4,d5 + a3,a4
170           sub.l     &LOCALSIZE,%sp           # save space for locals
171   L%badmd1:
172           mov.l     &1,(%sp)                 # suspend ourselves
173           mov.l     &X_XMITMODE,-(%sp)
174           jsr       reperr                   # reperr(error_type, 1);
175           add.l     &4,%sp
176           br.w      L%Ret_false              # return (FAILURE)
177
178   ##################################################################
179   #
180   # this routine handles transmission in DIRECT mode
181   # it expects the following registers to be set up
182   #       %a2 = running
183   #       %a5 = pointer to message to be delivered
184   #       %a0 = pointer to destination CONNECTOR
185   # NOTE: the stack is not set up completely to gain us some much needed s
186   #   i.e not all of the registers are saved, no local space is allocated.
187   # if the message can't be delivered directly, the stack setup must be
188   # completed via 'finish_entry'
189
190
191   L%RETSNDR:
192           bsr.w     chk_robust
193           mov.b     &DIRECT%,msg_mode%(%a5)   # set up real transmissi
194           btst      &ERROR_B,msg_flags%(%a5)
195           beq.b     L%common
196           mov.l     msg_sconn_pid%(%a5),-(%sp)
197           mov.l     msg_sconn_host%(%a5),%d0
198           br.w      L%callerr
199
200   L%DIRECT:
201           bsr.w     chk_robust
202           btst      &ERROR_B,msg_flags%(%a5)
203           bne.w     DIR_msgerr
204
205           mov.l     &sizeof_connector%,-(%sp)  # xfer count
206           pea.l     msg_dst_conn%(%a5)         # kernel virtual address
207           mov.l     %a0,-(%sp)                 # user virtual address
208           jsr       r_cur_user                 # r_cur_user(dest, &msg->dst_con
209           add.l     &12,%sp                    #          sizeof(CONN));
210           tst.l     %d0
211           bmi.w     L%bad_connector
212   L%common:
213           mov.l     msg_dconn_pid%(%a5),-(%sp) # findpid(msg->dst_conn.
214           mov.l     msg_dconn_host%(%a5),%d0
215           cmp.l     %d0,this_cell
216           bne.b     DIR_wrongcell
217           jsr       findpid                    # returns rtpb in both d0 and a0
218
219           mov.l     %a0,(%sp)        # put rtpb on stack for call to queue_ms
220           beq.w     DIR_badpid       # if (rtpb == NULL), can't deliver di
221           bftst     rtpb_flags%(%a0){&2:&2} # if process issued STEALTH or i
222           bne.w     DIR_badpid              # ABORTed, then can't deliver me
223
224           and.b     &0x3f,msg_flags%(%a5)   # msg->flags &= ~(FROMNIM|ACCEPT
225           mov.l     %a5,-(%sp)
226           jsr       queue_msg        # queue_msg(msg, rtpb)
227           tst.l     %d0
228           beq.w     L%qdfailed
229           add.l     &8,%sp           # get rid of push from earlier call to f
230           mov.l     (%sp)+,%a5       # restore a5
231           rts                        # return success from queue_msg
232
233   L%bad_connector:
234           mov.l     (%sp)+,%a5       # restore a5
235           clr.l     %d0
236           rts                        # return FAILURE
237
238   DIR_wrongcell:                     # come here if the specified pid
239           bsr.w     finish_entry     # indicates a remote cell
240           br.w      L%chknim         # go see if we're connected to a nim
241
242   DIR_msgerr:                        # come here if the message had the ERROR
243           jsr       fcu_pid          # fcu_pid(&conn)
244                                      # %d0 contains HOSTID, %d1 contains PROC
245           mov.l     %d1,-(%sp)       # save procid for use by findpid()
246   L%callerr:
```

```
247            cmp.l    %d0,this_cell
248            bne.b    DIR_wrongcell
249            jsr      findpid           # findpid(conn.cn_procid)
250            bsr.w    finish_entry      # bit set
251            bsr.w    DIR_ERROR
252            br.w     L%Ret_true
253
254                                       # we're on the right cell, but the pid
255   DIR_badpid:                         # does not correspond to a legal rtpb
256            bsr.w    finish_entry
257            br.w     cant_deliver
258
259                                       # come here if Call deadlock was
260   L%qdfailed:                         # detected by queue_msg for DIRECT mode
261            add.l    &4,%sp            # get rid of push to queue_msg
262            mov.l    (%sp),%d0         # get rtpb of process we tried to queue
263            bsr.w    finish_entry      # preserves d0
264            mov.l    %d0,%a3
265                                       # come here if queue_msg detects a CALL
266   L%qfailed:                          # deadlock for all other transmission mo
267            bsr.w    L%breakcall
268            mov.b    &DEADLOCK,msg_xmit_stat%(%a5)
269            bsr.w    msg_DIR_err       # msg_DIR_err(dst_rtpb, msg);
270            btst     &FROMNIM_B,MFLAGS%(%sp)
271            bne.w    L%Ret_true        # indicate to nim that we accepted this
272            br.w     L%Ret_false       # in case of possible Call, indicate fai
273
274
275   DIR_ERROR:
276            mov.l    %a0,%d0           # if (rtpb == NULL)
277            beq.b    L%rooterror       # then deliver message to generic 'Error
278            mov.l    %d0,%a3
279            btst     &CALLED_B,msg_flags%(%a5)
280            beq.w    msg_DIR_err       # if (msg->flags & CALLED)
281            bsr.w    L%breakcall       # break transmitter out of Call
282            br.w     msg_DIR_err       # msg_err(rtpb, msg);
283   L%rooterror:
284            mov.l    &root,%a3         # look for 'Error' in the root context
285            br.w     msg_DIR_err       # msg_err(&root, msg);
286
287
288   # this routine is used to break a process out of the Call'd state
289   # it expects the following inputs:
290   #     %a3 - rtpb of process to work on
291   #     %a5 - msg causing Call to complete
292   #
293   L%breakcall:
294            cmp.l    %a3,%a2           # if we are calling ourselves directly
295            beq.b    L%bcdone          # don't need to break process out of cal
296            bftst    rtpb_flags%(%a3){&2:&2} # if process NOTHERE or ABORTed,
297            bne.w    L%bcdone          # then can't receive NULL respon
298
299            clr.l    rtpb_arg0%(%a3)
300            clr.b    rtpb_k_code%(%a3)
301            bclr     &SUSPENDME_B,rtpb_sched%(%a3)
302            mov.l    %a3,%a1
303            jsr      _a_rt_setrun      # rt_setrun(rtpb)
304   L%bcdone:
305            rts
306
307
308   # this routine is used to finish setting up the stack
309   # %a0 must be preserved
310   #
311   finish_entry:
312            mov.l    (%sp)+,%a1        # strip return address off stack
313            add.l    &4,%sp            # get rid of push from call to f
314            movm.l   &0x0c18,-(%sp)    # save d4,d5 + a3-a4
315            sub.l    &LOCALSIZE,%sp    # save space for locals
316            mov.b    msg_flags%(%a5),MFLAGS%(%sp)   # save msg->flags
317            and.b    &0x3f,msg_flags%(%a5)   # msg->flags &= ~(FROMNIM|ACCEPT
318            clr.b    DELIVERED%(%sp)
319            jmp      (%a1)             # return to caller
320
321
322   ################################################################################
323   #
324   # this routine handles transmission in LOCAL mode
325   # it expects the following registers to be set up
326   #        %a5 = message to be delivered
```

```
327    #       %a2 = running
328    #       %d4 = pointer to destination name (kernel space)
329
330    L%LOCAL:
331            bsr.w   chk_robust
332            cmp.b   rtpb_k_code%(%a2),&CALL # if (rtpb->k_code == CALL)
333            beq.w   L%badmd1                # bad transmission mode for CALL
334            mov.l   %d4,(%sp)               # if (dest == NULL)
335            beq.w   cant_deliver            # then we can't deliver the msg
336            jsr     hash                    # returns hashid in d0 and size
337            mov.w   %d1,NAMSIZ%(%sp)        # save size of name
338            clr.l   %d5                     # clear found indicator
339
340            mov.l   %a2,%a4                 # get pointer to running
341            tst.l   rtpb_pht%(%a4)          # if sender not a context
342            bne.b   LOCAL_context
343            mov.l   rtpb_parent%(%a4),%a4   # then search in parent's contex
344    LOCAL_context:
345            lsl.w   &2,%d0                  # d0 still has valid hashid
346            mov.l   rtpb_pht%(%a4),%a1      # if hash table entry for dest i
347            mov.l   0(%a1,%d0.w),%d0        # null, then dest doesn't exist
348            beq.b   LOCAL_notfound          # at this level, and we can't de
349            bsr.w   search_level            # else go try to deliver the msg
350            tst.l   %d5                     # see if we found any recipients
351            beq.b   LOCAL_notfound
352            tst.b   FOUNDSELF%(%sp)         # make sure that we are not the
353            beq.w   search_succeeded        # potential recipient
354            sub.l   &1,%d5
355            bne.w   search_succeeded
356
357    LOCAL_notfound:                         # else, we didn't find anyone
358            cmp.l   %a4,&root               # to deliver the message to
359            beq.w   search_failed           # if we're at the root context
360            br.w    cant_deliver            # go try to give to an Error pro
361
362
363    ################################################################
364    #
365    # this routine handles transmission in ALL mode
366    # it expects the following registers to be set up
367    #       %a5 = message to be delivered
368    #       %a2 = running
369    #       %d4 = pointer to destination name (kernel space)
370
371    L%ALL:
372            bsr.w   chk_robust
373            cmp.b   rtpb_k_code%(%a2),&CALL # if (rtpb->k_code == CALL)
374            beq.w   L%badmd1                # bad transmission mode for CALL
375            mov.l   %d4,(%sp)               # if (dest == NULL)
376            beq.w   cant_deliver            # then we can't deliver the msg
377            jsr     hash                    # returns hashid in d0 and size
378            lsl.w   &2,%d0                  # scale hashid for index of long
379            mov.w   %d0,HASHID%(%sp)        # save hashid
380            mov.w   %d1,NAMSIZ%(%sp)        # save size of dest name
381            clr.l   %d5                     # clear found indicator
382
383            mov.l   %a2,%a4                 # get pointer to running
384            tst.l   rtpb_pht%(%a4)          # if sender not a context
385            beq.b   ALL_parent              # go up a level to sender's pare
386    ALL_context:
387            mov.w   HASHID%(%sp),%d0
388            mov.l   rtpb_pht%(%a4),%a1
389            mov.l   0(%a1,%d0.w),%d0        # if hash table entry a null
390            beq.b   ALL_parent              # then nothing to check at this
391            bsr.w   search_level            # otherwise, go search this leve
392            tst.l   %d5                     # see if we found any recipients
393            beq.b   ALL_parent
394            tst.b   FOUNDSELF%(%sp)         # make sure that we are not the
395            beq.b   search_succeeded        # potential recipient
396            sub.l   &1,%d5
397            bne.b   search_succeeded
398            cmp.l   %a4,&root               # found only self in search cont
399            beq.b   L%chknim                # if in generic context, try to
400            br.w    cant_deliver            # to nim; else fail delivery
401
402    ALL_parent:                             # here when current level exhaus
403            mov.l   rtpb_parent%(%a4),%a4   # go up another level
404            mov.l   %a4,%d0                 # if we're not yet at the root c
405            bne.b   ALL_context             # go search the new context
406                                            # else go see if we need to give
```

```
407                                            # message back to the nim
408                                            # by falling into 'search_failed
409
410    search_failed:                          # come here if couldn't locate d
411            btst     &FROMNIM_B,MFLAGS%(%sp) # if the message wasn't original
412            bne.b    free_original          # from the nim, see if nim prese
413
414    L%chknim:                               # come here if message can't be
415            tst.l    eip_tab+NIMRTPB        # delivered on this cell
416            bne.w    deliver_nim            # if we're connected to a nim
417                                            # give the message to it to play
418            br.w     cant_deliver           # else try to give to an Error p
419
420    free_original:
421            tst.l    msg_owner%(%a5)
422            beq.b    L%free_orig
423            mov.l    %a5,%a0
424            jsr      a_munlink
425    L%free_orig:
426            mov.l    %a5,(%sp)
427            mov.l    %a2,-(%sp)
428            jsr      free_msg               # free_msg(running, msg);
429            add.l    &4,%sp
430            br.w     L%Ret_false            # return (FAILURE)
431
432
433    search_succeeded:                       # come here if we found 'dest'
434            clr.l    %d0
435            mov.b    MFLAGS%(%sp),%d0
436            and.b    &FROMNIM,%d0
437            mov.l    %d0,-(%sp)             # get ready for calls to
438            mov.l    %d5,-(%sp)             # msg_populate, a_munlink,
439            mov.l    %d4,-(%sp)             # unmap_msg, xmit_mdest
440            mov.l    %a4,-(%sp)
441            mov.l    %a5,-(%sp)
442            tst.l    msg_owner%(%a5)
443            beq.w    L%xmit_mdest
444            mov.l    %a5,%a0
445            jsr      a_munlink
446
447            btst     &P_LOCKMEM_B,rtpb_pflag%(%a2)
448            bne.b    L%mdest_chkmap
449            jsr      msg_populate           # msg_populate(msg)
450    L%mdest_chkmap:
451            btst     &KPROC_B,rtpb_flags%(%a2)    # if transmitter is a ke
452            beq.b    L%mdest_unmap                # process, dont unmap ms
453            bset     &MAPPED_B,msg_mflags%+3(%a5)
454            br.b     L%xmit_mdest
455    L%mdest_unmap:
456            jsr      unmap_msg              # unmap_msg(msg)
457    L%xmit_mdest:
458            jsr      xmit_mdest             # xmit_mdest(msg, context, dest,
459            add.l    &20,%sp                # get rid of args previously pus
460            tst.l    %d0
461            bne.w    L%Ret_true
462            mov.b    &FAILED_DELIVERY,msg_xmit_stat%(%a5)
463            br.w     cant_deliver
464            rts
465
466    deliver_nim:                            # nim always gets the original m
467            bsr.w    nim_xmit
468            tst.l    %d0                    # if successful delivery to nim
469            bne.w    L%Ret_true             # then go return (SUCCESS)
470            tst.b    DELIVERED%(%sp)        # if we didn't deliver at least
471            bne.w    L%Ret_true
472            mov.b    &FAILED_DELIVERY,msg_xmit_stat%(%a5)
473            br.w     cant_deliver
474
475
476    deliver_original:                       # come here to deliver original
477            mov.l    this_cell,msg_dconn_host%(%a5)
478            mov.l    rtpb_pid%(%a3),msg_dconn_pid%(%a5)
479            clr.l    msg_dconn_chan%(%a5)
480            mov.l    %a3,(%sp)              # of msg to the specified dest
481            mov.l    %a5,-(%sp)
482            jsr      queue_msg              # queue_msg(msg, foundrtpb);
483            add.l    &4,%sp
484            tst.l    %d0
485            bne.w    L%Ret_true             # return success from queue_msg
486            br.w     L%qfailed
```

```
487
488
489     # this routine used to give a message to the nim
490     # it expects the following inputs:
491     #     %a2 - rtpb of xmitting process
492     #     %a5 - msg to give to nim
493     #     %d4 - pointer to destination
494     #
495     nim_xmit:
496             mov.l       %d4,-(%sp)                  # set up for calls to msg_popula
497             mov.l       %a5,-(%sp)                  # unmap_msg and tonim_xmit
498             tst.l       msg_owner%(%a5)
499             beq.w       L%nim_xmit
500             mov.l       %a5,%a0
501             jsr         a_munlink
502                                                     # call(msg, dest)
503             btst        &P_LOCKMEM_B,rtpb_pflag%(%a2)
504             bne.b       L%nim_chkmap
505             jsr         msg_populate                # msg_populate(msg)
506     L%nim_chkmap:
507             btst        &KPROC_B,rtpb_flags%(%a2)   # if transmitter is a ke
508             beq.b       L%nim_unmap                 # process, dont unmap ms
509             bset        &MAPPED_B,msg_mflags%+3(%a5)
510             br.b        L%nim_xmit
511     L%nim_unmap:
512             jsr         unmap_msg                   # unmap_msg(msg)
513     L%nim_xmit:
514             jsr         tonim_xmit                  # tonim_xmit(mesg, dest)
515             add.l       &8,%sp                      # get rid of args previously pus
516             rts
517
518
519     # this routine searches a context level for processes with
520     # the indicated destination name
521     # it saves the initial rtpb it finds in %d5 and
522     # delivers duplicate messages to any subsequent matches
523     # we'll later try to queue the original message to the initial find
524     # this routine expects the following registers to be set up:
525     #     %a5 = messsage to deliver
526     #     %a2 = rtpb of sending process (running)
527     #     %d0 = initial rtpb to check
528     #     %d4 = pointer to destination name
529
530     search_level:
531             clr.b       FOUNDSELF%+4(%sp)
532     L%search_cont:
533             mov.l       %d0,%a3                     # get rtpb to check
534             bftst       rtpb_flags%(%a3){&2:&2}     # if process issued STEALTH or i
535             bne.w       search_next                 # ABORTed, then can't deliver me
536             mov.w       NAMSIZ%+4(%sp),%d0          # get length of destination name
537             mov.l       %d4,%a0                     # get pointer to destination nam
538             lea         rtpb_p_name%(%a3),%a1       # get pointer to name of rtpb
539     search_cmp:
540             cmp.b       (%a0)+,(%a1)+
541             dbne        %d0,search_cmp
542             bne.b       search_next
543             add.l       &1,%d5
544             cmp.l       %a3,%a2                     # if we found ourselves, record
545             bne.b       search_next
546             mov.b       &1,FOUNDSELF%+4(%sp)
547     search_next:
548             mov.l       rtpb_next_hash%(%a3),%d0    # if (rtpb->next_hash != NULL)
549             bne.b       L%search_cont               # then keep searching this level
550             rts                                     # else no one else on this level
551
552
553
554     ################################################################################
555     #
556     # this routine handles transmission in LRING mode
557     # it expects the following registers to be set up
558     #     %a5 = message to be delivered
559     #     %a2 = running
560     #     %d4 = destination name
561     #
562     L%LRING:
563             tst.l       %d4
564             bne.w       L%badmd1                    # must have NULL destination
565             bsr.w       chk_robust
566             mov.b       &ROBUST,msg_lrflags%(%a5)
```

```
567            clr.b     msg_xmit_stat%(%a5)           # in case msg indicated BROKEN L
568            mov.b     &NEXT%,msg_mode%(%a5)         # treat just like NEXT from here
569
570
571    ################################################################
572    #
573    # this routine handles transmission in NEXT mode
574    # it expects the following registers to be set up
575    #        %a5 = message to be delivered
576    #        %a2 = running
577    #        %d4 = destination name
578    #
579    L%NEXT:
580            mov.l     %a2,%a4                       # get current rtpb (running)
581            tst.l     %d4                           # test for NULL destination poin
582            bne.b     NEXT_hash
583            lea.l     rtpb_p_name%(%a4),%a0         # get name of sending rtpb
584            mov.l     %a0,%d4                       # use as the destination name
585    NEXT_hash:
586            mov.l     %d4,(%sp)
587            jsr       hash                          # hash(dest)
588            lsl.w     &2,%d0                        # scale hashid for index of long
589            mov.w     %d0,HASHID%(%sp)              # save hashid
590            mov.w     %d1,NAMSIZ%(%sp)              # save size of name we're lookin
591
592            mov.l     %a2,%a4                       # get current rtpb (running)
593            mov.l     %d4,%a0                       # get pointer to dest
594            bftst     rtpb_flags%(%a4){&2:&2}       # if process issued STEALTH or i
595            bne.w     NEXT_agent                    # ABORTed, then can't deliver me
596            lea       rtpb_p_name%(%a4),%a1         # get name of sending rtpb
597            cmp.l     %a1,%a0                       # if NULL destination specified
598            beq.b     LRING_init                    # then it must be a logical ring
599    L%LRING_cmp1:                                   # d1 contains size of dest name
600            cmp.b     (%a0)+,(%a1)+                 # see if name we're sending to
601            dbne      %d1,L%LRING_cmp1              # matches name of sender
602            bne.w     NEXT_begin                    # if it doesn't, then normal NEX
603    LRING_init:
604            btst      &INLRING_B,msg_lrflags%(%a5)  # if INLRING already set
605            bne.b     LRING_exit                    # cant be initiator of lring
606            mov.l     this_cell,msg_lconn_host%(%a5)
607            mov.l     rtpb_pid%(%a2),msg_lconn_pid%(%a5)
608            or.b      &INLRING+ONODE,msg_lrflags%(%a5)  # initiator of logical
609    LRING_exit:
610            mov.l     %a4,%a3                       # start the search with the next
611            br.b      LRING_next                    # process in the context
612    LRING_start:
613            mov.w     HASHID%(%sp),%d0              # get hash id for this name
614            mov.l     rtpb_parent%(%a4),%a1         # now go search from beginning
615            mov.l     rtpb_pht%(%a1),%a1            # NOTE, the search must succeed
616            mov.l     0(%a1,%d0.w),%a3              # this time because we're sure t
617    LRING_loop:                                     # find ourselves
618            bftst     rtpb_flags%(%a3){&2:&2}       # if process issued STEALTH or i
619            bne.b     LRING_next                    # ABORTed, then can't deliver me
620            mov.w     NAMSIZ%(%sp),%d0              # get length of dest name
621            mov.l     %d4,%a0                       # get pointer to dest name
622            lea       rtpb_p_name%(%a3),%a1         # get pointer to rtpb's name
623    L%LRING_cmp2:
624            cmp.b     (%a0)+,(%a1)+
625            dbne      %d0,L%LRING_cmp2              # see if we found the dest
626            beq.w     LRING_deliver                 # if we did, go deliver the msg
627    LRING_next:
628            mov.l     rtpb_next_hash%(%a3),%a3      # chain down to next rtp
629            mov.l     %a3,%d0
630            bne.b     LRING_loop                    # if non-null, go check it
631            mov.l     msg_lconn_host%(%a5),%d0
632            cmp.l     %d0,this_cell
633            bne.b     LRING_eol
634            btst      &ONODE_B,msg_lrflags%(%a5)
635            beq.b     LRING_broken
636            bclr      &ONODE_B,msg_lrflags%(%a5)
637    LRING_eol:
638            cmp.l     rtpb_parent%(%a4),&root       # if not at the root context
639            bne.b     LRING_start                   # go set us to beginning of ring
640            tst.l     eip_tab+NIMRTPB               # if no nim attached
641            beq.b     LRING_start                   # go set us to beginning of ring
642            br.w      deliver_nim                   # else give to nim
643
644    NEXT_exit:
645            btst      &INLRING_B,msg_lrflags%(%a5)  # if not logical ring
646            beq.w     search_failed                 # then see about sending out ove
```

```
647         mov.l    msg_lconn_host%(%a5),%d0
648         cmp.l    %d0,this_cell            # if on the initiator's node
649         bne.w    search_failed            # go indicate broken LRING
650  LRING_broken:
651         btst     &LRDEAD_B,msg_lrflags%(%a5)  # check for first time offe
652         bne.b    LRING_error              # if we've been here before, err
653         bset     &LRDEAD_B,msg_lrflags%(%a5)  # else indicate
654         mov.b    &BROKEN_LRING,msg_xmit_stat%(%a5)
655         btst     &FROMNIM_B,MFLAGS%(%sp)  # if nim doing the delivering
656         bne.w    deliver_nim
657         br.b     LRING_eol                # broken ring and give to next m
658                                           # of the ring
659  LRING_error:
660         mov.b    &BROKEN_LRING,msg_xmit_stat%(%a5)
661         mov.l    msg_lconn_host%(%a5),msg_dconn_host%(%a5)
662         mov.l    msg_lconn_pid%(%a5),msg_dconn_pid%(%a5)
663         clr.l    msg_lconn_chan%(%a5)
664         bsr.w    return_msg
665         br.w     L%Ret_true
666
667
668  NEXT_agent:
669         btst     &INLRING_B,msg_lrflags%(%a5)  # if currently logical r
670         bne.w    LRING_exit               # then forward in LRING mode
671  NEXT_begin:
672         btst     &FROMNIM_B,MFLAGS%(%sp)  # if nim doing the delivering
673         bne.b    NEXT_loop                # preserve the state of LRING,
674         bsr.w    chk_robust
675  NEXT_loop:                               # come here for normal search
676         mov.l    rtpb_parent%(%a4),%d0    # if not at the root context
677         beq.b    NEXT_exit                # slide up to parents context
678         mov.l    %d0,%a4                  # otherwise we will search this
679         mov.w    NAMSIZ%(%sp),%d1         # context
680         mov.w    HASHID%(%sp),%d0
681         mov.l    rtpb_pht%(%a4),%a1
682         mov.l    0(%a1,%d0.w),%d0         # if hash table entry is null at
683         beq.b    NEXT_loop                # this level, bump up to parents
684  NEXT_next:
685         mov.l    %d0,%a3
686         bftst    rtpb_flags%(%a3){&2:&2}  # if process issued STEALTH or i
687         bne.b    NEXT_chain               # ABORTed, then can't deliver me
688         mov.l    %d1,%d0
689         mov.l    %d4,%a0
690         lea      rtpb_p_name%(%a3),%a1    # see if name of this rtpb match
691  L%NEXT_cmp:                              # the destination name
692         cmp.b    (%a0)+,(%a1)+
693         dbne     %d0,L%NEXT_cmp
694         beq.w    NEXT_deliver             # if it does, then go deliver it
695  NEXT_chain:
696         mov.l    rtpb_next_hash%(%a3),%d0    # else chain to next rtp
697         bne.b    NEXT_next                # if non-null, then go check its
698         br.b     NEXT_loop                # else bump up to the next level
699
700  NEXT_deliver:
701         btst     &INLRING_B,msg_lrflags%(%a5)
702         beq.w    deliver_original
703  LRING_deliver:
704         mov.l    rtpb_pid%(%a3),%d0
705         cmp.l    %d0,msg_lconn_pid%(%a5)
706         bne.w    deliver_original
707         mov.l    this_cell,%d0
708         cmp.l    %d0,msg_lconn_host%(%a5)
709         bne.w    deliver_original
710         bset     &LRCOMP_B,msg_lrflags%(%a5)
711         br.w     deliver_original
712
713
714  ##################################################################
715  #
716  # this routine handles transmission in INHERIT mode
717  # it expects the following registers to be set up
718  #     %a5 = message to be delivered
719  #     %a2 = running
720  #     %d4 = pointer to destination name (kernel space)
721
722  L%INHERIT:
723         bsr.w    chk_robust
724         mov.b    &NEXT%,msg_mode%(%a5)    # treat just like NEXT from here
725         tst.l    %d4                      # test for NULL destination poin
726         bne.b    INHERIT_hash
```

```
727             lea.l    rtpb_p_name%(%a2),%a0    # get name of sending rtpb
728             mov.l    %a0,%d4                  # use as the destination name
729     INHERIT_hash:
730             mov.l    %d4,(%sp)
731             jsr      hash                     # hash(dest)
732             lsl.w    &2,%d0                   # scale hashid for index of long
733             mov.w    %d0,HASHID%(%sp)         # save hashid
734             mov.w    %d1,NAMSIZ%(%sp)         # save size of name we're lookin
735
736             mov.l    rtpb_parent%(%a2),%a4    # tmprtpb = rtpb->parent
737             cmp.l    %a4,&root                # if not in generic context then
738             bne.w    NEXT_loop                # treat just like a NEXT at this
739             br.w     cant_deliver             # else try to give to an Error p
740
741
742     ################################################################
743     #
744     # this routine handles transmission in SELF mode
745     # it expects the following registers to be set up
746     #       %a5 = message to be delivered
747     #       %a2 = running
748     #       %d4 = should be NULL pointer
749
750     L%SELF:
751             bsr.w    chk_robust
752             btst     &NOTHERE_B,rtpb_flags%(%a2)
753             bne.w    cant_deliver
754             mov.l    %a2,%a3
755             br.w     deliver_original
756
757
758     ################################################################
759     #
760     # this routine handles transmission in CONTEXT mode
761     # it expects the following registers to be set up
762     #       %a5 = message to be delivered
763     #       %a2 = running
764     #       %d4 = should be NULL pointer
765
766     L%CONTEXT:
767             bsr.w    chk_robust
768             mov.l    rtpb_parent%(%a2),%d0    # if (running->parent == NULL)
769             beq.b    cant_deliver             # then we can't deliver the mess
770             mov.l    %d0,%a3
771             bftst    rtpb_flags%(%a3){&2:&2}  # if process issued STEALTH or i
772             bne.w    cant_deliver             # ABORTed, then can't deliver me
773             br.w     deliver_original
774
775
776     ################################################################
777     #
778     # routine expects the following:
779     #       %a5 = message to be delivered
780     #       %d0 = a scratch register
781
782     chk_robust:
783             btst     &ROBUST_B,msg_lrflags%(%a5)
784             beq.b    L%chk_robust_ret
785             mov.l    msg_lconn_host%(%a5),%d0
786             beq.b    L%chk_robust_ret
787             cmp.l    %d0,this_cell
788             beq.b    L%chk_robust_ret
789             movm.l   &0x40c0,-(%sp)                   # save d1, a0, a1
790             mov.l    %a5,-(%sp)
791             jsr      xmit_rlr_flush                   # xmit_rlr_flush(msg)
792             add.l    &4,%sp
793             movm.l   (%sp)+,&0x0302                   # restore d1, a0, a1
794             tst.l    %d0
795             beq.b    L%leave_robust
796     L%chk_robust_ret:
797             clr.b    msg_lrflags%(%a5)
798             rts
799     L%leave_robust:
800             and.b    &ROBUST,msg_lrflags%(%a5)
801             rts
802
803
804     ################################################################
805     #
806     # it expects the following registers to be set up
```

```
807  #        %a5 = message to be delivered
808  #        %a2 = running
809
810  cant_deliver:
811           tst.b      msg_xmit_stat%(%a5)
812           bne.b      L%errset
813           mov.b      &NO_DESTINATION,msg_xmit_stat%(%a5)
814  L%errset:
815           bsr.w      return_msg
816
817  L%Ret_false:
818           clr.l      %d0
819           add.l      &LOCALSIZE,%sp              # get rid of local space
820           movm.l     (%sp)+,&0x3830              # restore d4,d5 + a3,a4,a5
821           rts
822
823  L%Ret_true:
824           mov.l      &1,%d0
825           add.l      &LOCALSIZE,%sp              # get rid of local space
826           movm.l     (%sp)+,&0x3830              # restore d4,d5 + a3,a4,a5
827           rts
828
829  ##############################################################################
830  #
831  # it expects the following registers to be set up
832  #        %a5 = message to be delivered
833  #        %a2 = running
834
835  return_msg:
836           mov.b      &DIRECT%,msg_mode%(%a5)
837           bset       &ERROR_B,msg_flags%(%a5)
838           mov.l      msg_sconn_host%(%a5),%d0
839           cmp.l      %d0,this_cell
840           beq.b      L%samecell
841           tst.l      eip_tab+NIMRTPB             # if nim not available anymore,
842           beq.w      L%rooterror                 # just give to generic error pro
843           bsr.w      nim_xmit
844           tst.l      %d0                         # if successful delivery to nim
845           beq.b      L%nimfailed                 # then indicate success to nim
846           rts
847  L%nimfailed:
848           mov.b      &FAILED_DELIVERY,msg_xmit_stat%(%a5)
849           br.w       L%rooterror                 # rts in L%rooterror gets us bac
850  L%samecell:                                     # the caller of this routine
851           mov.l      msg_sconn_pid%(%a5),-(%sp)
852           jsr        findpid                     # returns rtpb in both d0 and a0
853           add.l      &4,%sp
854           br.w       DIR_ERROR                   # rts in DIR_ERROR gets us back
855                                                  # the caller of this routine
856
857
858  ##############################################################################
859  #
860  # this routine is only called from within this module
861  # to xmit an undeliverable message to the 'error' process
862  # it expects the following registers to be set up:
863  #        %a3 = rtpb
864  #        %a5 = msg
865
866  msg_err:
867           cmp.b      msg_mode%(%a5),&ALL%        # don't report errors if sent vi
868           beq.w      msg_free
869  msg_DIR_err:
870           sub.l      &4,%sp
871           clr.b      msg_flags%(%a5)
872           btst       &REPORTED_B,msg_mflags%+3(%a5)
873           bne.w      msg_free                    # if already reported, then free
874           bset       &REPORTED_B,msg_mflags%+3(%a5)  # else indicate new stat
875           mov.l      &Error,%d4
876           mov.l      %d4,(%sp)
877           jsr        hash                        # hash("error");
878           lsl.l      &2,%d0                      # scale for index into a long ar
879           tst.l      rtpb_pht%(%a3)
880           bne.b      msg_enter                   # if (rtpb->pht == NULL)
881  msg_loop1:
882           mov.l      rtpb_parent%(%a3),%a3       #       rtpb = rtpb->parent;
883  msg_enter:
884           mov.l      rtpb_pht%(%a3),%a1
885           mov.l      0(%a1,%d0.l),%d1            # if (nxtrtpb = *(p->pht + hashi
886           beq.b      msg_chkroot                 # see if we're at the root conte
```

```
887   msg_loop2:
888           mov.l       %d1,%a4
889           bftst       rtpb_flags%(%a4){&2:&2}  # if process issued STEALTH or i
890           bne.b       msg_next                 # ABORTed, then can't deliver me
891           lea.l       rtpb_p_name%(%a4),%a0
892           mov.l       %d4,%a1
893           mov.l       &5,%d1                   # number of non-zero chars in "e
894   msg_cmp:
895           cmp.b       (%a0)+,(%a1)+            # see if the name of this rtpb
896           dbne        %d1,msg_cmp              # matches "error"
897           beq.b       msg_deliver              # if so, go deliver the message
898   msg_next:
899           mov.l       rtpb_next_hash%(%a4),%d1
900           bne.b       msg_loop2
901   msg_chkroot:
902           cmp.l       %a3,&root
903           bne.w       msg_loop1                # if at root context, can't deli
904   msg_chknim:
905           tst.l       eip_tab+NIMRTPB          # if not connected to a nim
906           beq.b       msg_free                 # just free the message
907           mov.b       &NEXT%,msg_mode%(%a5)    # transmit in NEXT MODE
908           bsr.w       nim_xmit
909           tst.l       %d0
910           bne.b       msg_ret                  # if couldn't deliver to the nim
911   msg_free:                                    # just free the message
912           tst.l       msg_owner%(%a5)
913           beq.b       L%msg_free
914           mov.l       %a5,%a0
915           jsr         a_munlink
916   L%msg_free:
917           mov.l       %a5,(%sp)
918           mov.l       %a2,-(%sp)
919           jsr         free_msg                 # free_msg(running, msg);
920           add.l       &4,%sp
921   msg_ret:
922           clr.l       %d0
923           add.l       &4,%sp
924           rts
925
926   msg_deliver:
927           mov.l       %a4,(%sp)
928           mov.l       %a5,-(%sp)
929           jsr         queue_msg                # queue_msg(msg, nxtrtpb)
930           add.l       &8,%sp
931           clr.l       %d0
932           rts
933
934   ##############################################################
935
936           data        2
937   Error:
938           byte        'e','r','r','o','r',0x00
```

APPENDIX G

```
1    /****************************************************************
2     *
3     *      (C) Copyright 1987, 1988. MOTOROLA Computer X, Inc.
4     *      All Rights Reserved.
5     *
6     *      The copyright notice above does not evidence any actual or
7     *      intended publication of this source code. Reproduction by
8     *      recipient in whole or in part is forbidden except as provided
9     *      in writing by MOTOROLA Computer X, Inc.
10    *
11    *      Description    : This module implements the Kernel to NIM inte
12    *
13    ****************************************************************
14
15   #ident "@(#)nim.c     2.3 - 89/01/12"
16
17   #include <os/types.h>
18   #include <os/rtpb.h>
19   #include <os/message.h>
20   #include <os/multidest.h>
21   #include <os/eim.h>
```

```
22   #define MAXNAM PNAM_SIZE
23   /*      #ifdef MCI
24              #include <nim/mcinim.h>
25              #else
26              #include <nim/nimkern.h>
27              extern long this_cell;
28              #endif
29   */
30   #include <nim/nimkern.h>
31   extern long this_cell;
32
33   extern unsigned long map_msg();
34   extern void DISABLE_sched();
35   extern void ENABLE_sched();
36   extern void memfree();
37   extern void msg_link();
38   extern void msg_unlink();
39   extern void queue_msg();
40   extern void reperr();
41
42   extern RTPB *running;
43   MSG *alloc_indirect();
44
45   #define CREATE  1
46
47
48   bool tonim_xmit(msg, proc_name)
49   register MSG *msg;
50   char *proc_name;
51   {
52       register MSG_DESC   *tx;
53       register MSG        *ind_msg;
54       register RTPB       *nimpcb;
55       extern   RTPB       *eip_tab[];
56
57       if ((nimpcb = eip_tab[NIMLEVEL]) == NULL)
58   /*
59           if ((nimpcb = eip_tab[MCILEVEL]) == NULL)
60   */
61              return(FALSE);                          /* nim not connected */
62
63       if ((ind_msg = alloc_indirect(sizeof(MSG_DESC))) == NULL)
64           return(FALSE);
65
66       tx = (MSG_DESC *)(ind_msg->body);
67       tx->ipcmsgtype = (int)TXMSG;
68       tx->msg_addr = (unsigned char *)msg;
69       if (msg->mode != (unsigned char)DIRECT &&
70           msg->mode != (unsigned char)EXPRESS)
71       {   strncpy(tx->header.destname, proc_name, PNAM_SIZE - 1);
72           tx->header.destname[PNAM_SIZE - 1] = '\0';
73       }
74
75       if (msg->mflags & MAPPED)
76           msg->mflags &= ~MAPPED;
77       else
78       {   if (map_msg(nimpcb, msg) == 0)
79           {   memfree(ind_msg);           /* free indirect message */
80               return(FALSE);
81           }
82       }
83       msg_link(msg, nimpcb);              /* put real message on owned que
84       queue_msg(ind_msg, nimpcb);         /* queue indirect message */
85
86       return(TRUE);
87   }
88
89
90   void tonim_cxc(p_name, type)
91   char *p_name;
92   int  type;
93   {
94       register CACHE      *ca;
95       register MSG        *ind_msg;
96       extern RTPB         *nimproc;
97
98       if (this_cell && nimproc)
99       {   if ((ind_msg = alloc_indirect(sizeof(CACHE))) == NULL)
100          {   reperr(X_NIMCONTEXT, 0);
101              return;
```

```
102            }
103            ca = (CACHE *)(ind_msg->body);
104            ca->ipcmsgtype = (type == CREATE) ? (int)CONCRE : (int)CONDEL;
105            strcpy(ca->name, p_name);
106            queue_msg(ind_msg, nimproc);
107        }
108    }
109
110
111    static MSG *alloc_indirect(size)
112    register int size;
113    {
114        register MSG *ind_msg;
115        register int offset;
116
117        offset = (sizeof(MSG) + 3) & ~3;
118
119        if ((ind_msg = (MSG *) memalloc(offset + size, FALSE)) == NULL)
120            return( (MSG *) NULL );
121
122        ind_msg->body = (unsigned char *) ind_msg + offset;
123        ind_msg->size = size;
124        ind_msg->mode = 0xff;
125        ind_msg->mflags = MAPPED|INDIRECT;
126
127        return(ind_msg);
128    }
129
130
131
132    void free_indirect(addr)
133    char *addr;
134    {
135        register MSG *ind_msg;
136
137        ind_msg = (MSG *)(addr - ((sizeof(MSG) - 3) & ~3));
138
139        DISABLE_sched();
140        msg_unlink(ind_msg, running);
141        memfree(ind_msg);
142        ENABLE_sched();
143    }
144
145
146    bool xmit_mdest(msg, context, procname, cnt, fromnim)
147    MSG *msg;
148    RTPB *context;
149    char *procname;
150    register int cnt;
151    int fromnim;
152    {
153        register MULTIDEST *tx;
154        MSG *ind_msg;
155        register RTPB *rtpb;
156        register unsigned long *pid;
157        extern RTPB *mdestproc;
158        extern RTPB root;
159
160        ind_msg = alloc_indirect(sizeof(MULTIDEST) +
161                            (cnt - 1) * sizeof(unsigned long));
162        if (ind_msg == NULL)
163            return(FALSE);
164
165        tx = (MULTIDEST *)(ind_msg->body);
166
167        if (context == &root)
168            tx->flags |= IN_GENERIC;
169        if (fromnim)
170            tx->flags |= FROMNIM;
171        tx->msg = msg;
172        strncpy(tx->destname, procname, PNAM_SIZE);
173        tx->cnt = cnt;
174
175        rtpb = *(context->pht + hash(tx->destname));
176        pid = tx->procid;
177
178        while (cnt > 0)
179        {   if (rtpb != running)
180                if ( ! (rtpb->flags & (ABORTED|NOTHERE)) )
181                    if ( ! strcmp(tx->destname, rtpb->p_name) )
```

```
182                 { *pid++ = rtpb->pid;
183                   cnt--;
184                 }
185             rtpb = rtpb->next_hash;
186         }
187
188         if (msg->mflags & MAPPED)
189             msg->mflags ^= MAPPED;
190         else
191         {   if (map_msg(mdestproc, msg) == 0)
192             {   memfree(ind_msg);           /* free indirect message */
193                 return(FALSE);
194             }
195         }
196
197         msg_link(msg, mdestproc);           /* put real message on owned que
198         queue_msg(ind_msg, mdestproc);      /* queue indirect message */
199
200         return(TRUE);
201 }
202
203
204 bool xmit_rlr_flush(msg)
205 MSG *msg;
206 {
207     register MSG *ind_msg;
208     register RLR_FLUSH *flush_msg;
209
210     if ((ind_msg = alloc_indirect(sizeof(RLR_FLUSH))) == NULL)
211         return(FALSE);
212
213     flush_msg = (RLR_FLUSH *) ind_msg->body;
214     flush_msg->msgid = FLUSH_RLR;
215     flush_msg->lri_host = *((int *)(&msg->lri_conn.cnh));
216     flush_msg->lri_chan = msg->lri_conn.cn_channel;
217
218     queue_msg(ind_msg, nimproc);            /* queue indirect message */
219     return(TRUE);
220 }
```

APPENDIX H

```
 1  /*************************************************************
 2
 3          (C) Copyright 1989.  All Rights Reserved. Computer X, Inc.
 4
 5          Reproduction of this software by recipient in whole or
 6          in part is forbidden except as provided in writing by
 7          Computer X, Inc.
 8
 9          Module              : @(#)mcinim.c 3.4 89/04/11
10          Date submitted      : 89/04/11 18:20:54
11          Origin              : Computer X
12          Description         : MCI/NIM process root function. Contain
13
14                                nim()       : Main function.
15                                mci_esr()   : MCI low/high priority in
16                                sfail_esr() : Sysfail interrupt esr.
17                                check_cpus(): Check status of successo
18                                sd_reply()  : Reply to shutdown reques
19
20  *************************************************************
21
22  #ifndef lint
23  static char SrcId[] = "@(#) mcinim.c:3.4";
24  #endif
25
26
27  #include <cX.h>
28  #include <gen_codes.h>
29  #ifdef UNIX
30  #include <sys/param.h>
31  #include <os/rtpb.h>
32  #include <os/message.h>
33  #else
34  #include <os/kerntypes.h>
```

```
35    #endif
36    #include <os/event.h>
37    #include <nim/mcinim.h>
38    #include <nim/mci.h>
39    #include "wd2840.h"
40    #include "nim.h"
41    #include "dbnim.h"
42    #include <os/eim.h>
43
44    #ifdef UNIX
45    #define NIM_BADR        0xc00001
46    #define NIM_TOUT1       250
47    #define NIM_TOUT2       5000
48    #define NIM_TOUT3       250
49    #define NIM_TOUT4       2000
50    #define NIM_TOUT5       1000
51    #define NIM_TOUT6       250
52    #define NIM_TOUT7       5000
53    #define NIM_TOUT8       1000
54    #define NIM_TOUT9       30000
55    #define NIM_WIND        7
56    #define NIM_RXLN        1
57    #define NIM_TXLN        1
58    #define NIM_CACH        150
59    #define NIM_TXLT        1
60    #define NIM_INTL1       0xf8
61    #define NIM_INTL2       0xfb
62    #define TICK            10000
63    #endif
64
65    #define DIAGTAG         NOWHERE_HOST
66
67    static char *mci_esr ();        /* mci low priority signal esr */
68    static char *sfail_esr ();      /* sysfail esr entry           */
69    static char *abort_esr ();      /* abort esr entry           - */
70    static void check_cpus ();      /* check status of successor cpu*/
71    static void sd_reply ();        /* reply to shutdown requestor */
72
73    struct sfail_msg {
74        char msgid[PNAM_SIZE];
75        bool posted;
76    };
77
78    struct sfail_msg        *sysfail_msg;   /* sys fail esr msg
79    char                    *abort_msg;     /* abort esr msg
80    char                    *mci_lp_msg;    /* low priority mci esr msg
81    char                    *mci_hp_msg;    /* high priority mci esr msg
82
83
84    PROCESS(nim)
85    {
86        extern char         res_lan1;       /* non-zero if LAN2 configured
87        char                *msg;           /* resource msg
88
89        /* Initialize globals. */
90        my_nodeid = NODEID(this_cell);      /* TEMP: kernel should do this
91        init_globs();
92
93        if (mci_enabled)
94        {
95            sysfail_msg = (struct sfail_msg*)Alloc(sizeof(struct sfail_msg),
96            strcpy (sysfail_msg->msgid, "sfail esr msg");
97            sysfail_msg->posted = FALSE;
98            Connect (0x46, sfail_esr, sysfail_msg);         /* APM8100 */
99            abort_msg = Alloc (16, SUSP);
100   /*      *(uint32*)(0x4f*4) = (uint32)abort_esr; */      /* APM8100 */
101           mci_lp_msg = Alloc (16, SUSP);
102           strcpy (mci_lp_msg, "mci lp esr msg");
103           Connect (MCI_SLPVEC, mci_esr, mci_lp_msg);
104           if (my_cpuid == 0)
105           {
106               mci_hp_msg = Alloc (16, SUSP);
107               strcpy (mci_hp_msg, "mci hp esr msg");
108               Connect (MCI_SHPVEC, mci_esr, mci_hp_msg);
109           }
110       }
111
112       Connect (NIMLEVEL, mci_esr, 0);
113
114       init_mci();
```

```
115
116   #ifdef UNIX
117       if (res_lan1)
118           msg = Makemsg(500,"resource",
119               "chck=#I; proc=#s; pntf=#s; sync=#s; clss=#s; type=#s; levl=
120               Keypack('s','i','z','e'), "$&@*#nimtm","$&@*#nimtm","Err_mgt
121               "LAN", "cXLAN",
122               NIM_INTL1,NIM_INTL2,256,0,
123               NIM_TOUT1,NIM_TOUT2,NIM_TOUT3,NIM_TOUT4,
124               NIM_TOUT5,NIM_TOUT6,NIM_TOUT7,NIM_TOUT8,NIM_TOUT9,
125               TICK,0,NIM_WIND,NIM_RXLN,NIM_TXLN,NIM_CACH,NIM_TXLT, 2);
126       else
127           msg = Makemsg(500,"resource",
128               "chck=#I; proc=#s; pntf=#s; sync=#s; clss=#s; type=#s; size=
129               Keypack('s','i','z','e'),"$&@*#nimtm","$&@*#nimtm","Err_mgt_
130               "LAN","cXLAN2",
131               1024,0,NIM_TOUT1,NIM_TOUT5,NIM_TOUT6,NIM_TOUT7,NIM_TOUT8,NIM
132               TICK,NIM_WIND,NIM_CACH,2,10000,
133               "cx_372a",
134               "0x00000000",
135               "//dMAP/2",
136               "//log.cX_lan2",
137               "//config/map");
138       Put(SELF, NULL, msg);
139   #endif
140
141       while (TRUE)
142           get_ip(FALSE);
143   }
144
145
146   char *get_ip(ret)
147   bool ret;
148   {
149   #ifdef UNIX
150       extern void unix_post();
151   #endif
152       extern void send_user_msg();/* fcn to transmit user messages
153   #ifdef MMU
154       extern RTPB *makepcb();       /* fcn to get pcb address given pid
155       RTPB *pcb;                    /* pcb of process that sent disconnect
156   #else
157       extern PCB *makepcb();        /* fcn to get pcb address given pid
158       PCB *pcb;                     /* pcb of process that sent disconnect
159   #endif
160       extern int mci_config();      /* fcn to configure a MCI channel
161       extern int nim_config();      /* fcn to configure a NIM channel
162       extern int config_37x();      /* fcn to configure a MVME37x channel
163       extern void db_nim();         /* fcn to service debug requests
164       extern HASH_REC l_hash[];     /* local proc name cache hash table
165       MSGINFO msginfo;              /* additional info about received msg
166       MSG_HANDLE handle;            /* resource message handle
167       char *trpl;                   /* addr of resource message triple
168       uint32 size;                  /* size of received triple
169       int error;                    /* configuration error if non-zero
170       register int *msg;            /* addr of received message
171       register CACHE *cache;        /* addr of a process name cache record
172       CACHE *cache2;                /* addr of a process name cache record
173       NODE_INFO *ni;                /* addr of info for a node
174       register MSG_DESC *md;        /* message descriptor
175       char *sd_msg;                 /* shutdown request
176       char *sd_upst;                /* shutdown response string
177       CONNECTOR getconn;            /* connector of process that sent msg
178       int i;                        /* loop counter
179       int cnt;                      /* general counter
180
181       while (TRUE)
182       {
183           msg = (int*)Get(NULL, &getconn, NULL);
184
185           /* Ignore all messages if we have gone through the shutdown sequ
186           if (sd_phase > 2)
187           {
188               if (*msg == TXMSG)
189                   tx_user_status((MSG_DESC*)msg, FAILURE);
190               else
191                   Free(msg);
192               continue;
193           }
194
```

```
195         if (msg == (int *)mci_hp_msg)
196         {
197             serve_mci ();
198             continue;
199         }
200         if (msg == (int *)mci_lp_msg)
201         {
202             rcv_via_mci ();
203             continue;
204         }
205         if (msg == (int *)sysfail_msg)
206         {
207             Pause(20);           /* Give bug time to set MCI_BUSY (10+ ms
208             check_cpus();
209             sysfail_msg->posted = FALSE;
210             continue;
211         }
212
213         switch (*msg)
214         {
215         /* token bus controller interrupt */
216         case EEVENT_TBC:
217             event_tbc(msg);
218             break;
219
220         /* jabber detected */
221         case EEVENT_JABBER:
222             event_jabber(msg);
223             break;
224
225         /* reception from MVME37x driver */
226 #ifdef UNIX
227         case KW_RECV_37X:
228             rcv_via37x(&lan_info[0]);          /* UNIX */
229             break;
230 #else
231         case Keypack('w','r','i','t'):
232             rcv_via37x(msg, &lan_info[0]);     /* cX   */
233             break;
234 #endif
235
236         /* transmit message */
237         case TXMSG:
238             if (sd_phase > 1)
239                 tx_user_status((MSG_DESC*)msg, FAILURE);
240             else
241             {
242                 ((MSG_DESC*)msg)->header.msg_id = msgret_id++;
243                 send_user_msg ((MSG_DESC*)msg);
244             }
245             break;
246
247         /* process created */
248         case CONCRE:
249             nim_cproc((CACHE*)msg);
250             break;
251
252         /* process deleted */
253         case CONDEL:
254             nim_dproc((CACHE*)msg);
255             break;
256
257         /* periodic wakeup */
258         case KW_AWAKE:
259             elapsed_time = *rtc_ticks - elapsed_time;
260             chk_nimtmrs(elapsed_time);
261             check_cpus();
262             elapsed_time = *rtc_ticks;
263 #ifndef UNIX
264             Free(msg);
265 #endif
266             if (sd_phase == 2)
267             {
268                 ni = (NODE_INFO*)frmack_list.head;
269                 for (cnt = 0; ni && !cnt; ni = ni->next_ack)
270                 {
271                     for (i = 0; i < TX_LISTS; i++)
272                         cnt += ni->tx_list[i].memb_cnt;
273                 }
274                 if (cnt == 0)
```

```
275                 {
276                     for (i = 0; i < no_of_lans; i++)
277                         if (lan_info[i].board_addr != 0)
278                         {
279                             lan_info[i].board_addr->reset = RESET_ON;
280                             lan_info[i].board_addr->jabber = RESET_ON;
281                         }
282                     sd_reply(sd_msg, sd_upst);
283                     sd_phase = 3;
284                 }
285             }
286 #ifdef UNIX
287             if (no_of_lans != 0)
288                 rcv_via37x(&lan_info[0]);
289 #endif
290             break;
291
292             /* stop tracking robust logical ring message */
293         case FLUSH_RLR:
294             if (((RLR_FLUSH *)msg)->lri_host != MY_SELF)
295             {
296                 md = get_msg_desc();
297                 md->header.msg_type   = FLUSH_RLRING;
298                 md->header.msg_length = sizeof(struct flush_rlring);
299                 md->header.msg_origin = MY_SELF;
300                 md->header.msg_dest   = ((RLR_FLUSH *)msg)->lri_host;
301                 md->msg_addr          = md->message;
302                 ((struct flush_rlring *)md->message)->lri_channel =
303                     ((RLR_FLUSH *)msg)->lri_chan;
304                 send_any_msg(md);
305             }
306 #ifdef MMU
307             free_indirect(msg);
308 #else
309             Free(msg);
310 #endif
311             break;
312
313             /* configuration message */
314         case KW_CONFIG:
315 /*
316             if (!NewProcess("cm", "//processes/cm", FALSE, -1, &cm_conn)
317                 nim_note("failed to create process cm");
318 */
319             if (cm_tag == 0)
320             {
321                 Msg_info(msg, &msginfo);
322                 cm_tag = msginfo.tag;
323             }
324             if (!CONN_TEST(&cm_conn))
325                 cm_conn = getconn;
326             if (Ini_handle(&handle, msg, NULL, (NOFIX|SUSP)) == 0)
327                 error = cX_FORMAT;
328             else
329                 if (trpl = Get_triple(&handle, Keypack('t','y','p','e'),
330                     if (!strcmp(trpl, "cXLAN2"))
331                     {
332                         error = config_37x(msg, 0);
333                         *nim_cpuid = my_cpuid;
334                     } else
335                         if (!strcmp(trpl, "cXLAN"))
336                         {
337                             error = nim_config(&handle);
338                             /* The following is an MCI kludge. */
339                             if (error)
340                             {
341                                 if (trpl = Get_triple(&handle,
342                                             Keypack('u','p','s','t')
343                                 {
344                                     nim_up_msg = (char*)Makemsg(TRIPLESI
345                                                 strlen(trpl),
346                                                 "!synch", "upst=#s",
347                                     Reply(handle.msg_start, nim_up_msg);
348                                     nim_up_msg = 0;
349                                 }
350                                 if (max_nl_cache == 0)
351                                     max_nl_cache = 100;
352                             }
353                         } else
354                             error = mci_config(&handle);
```

```
355                 else
356                     error = mci_config(&handle);
357                 if (error)
358                     Bad_msg((char*)msg, nim_id_str, error);
359     /*
360                 else
361                     Free(msg);
362     */
363                 if (!nim_tmr_on)
364                 {
365     #ifdef UNIX
366                     msg = (int*)Makemsg(32, "alarm", NULL);
367                     timeout(NULL, unix_post, msg, HZ/4, HZ/4, 0);
368     #else
369                     msg = (int*)Makemsg(TRIPLESIZE*2 + 5*sizeof(short) + siz
370                                 "set", " rept= #5i; id  = #I",
371                                 0, 0, 0, wakeup_period/1000, wakeup_peri
372                                 KW_NIMTAG);
373                     Put(NEXT, "Clock", msg);
374     #endif
375                     elapsed_time = *rtc_ticks;
376                     nim_tmr_on = TRUE;
377                 }
378                 break;
379
380     #ifndef UNIX
381             /* MVME37x driver has been reset or deleted */
382             case KW_STATUS:
383                 Ini_handle(&handle, msg, NULL, (NOFIX|SUSP));
384                 if (trpl = Get_triple(&handle, Keypack('c','n','t','l'), NUL
385                     if (lan_info[0].board_addr == 0)
386                         config_37x(nim_res_msg, *trpl);
387                 Free(msg);
388                 break;
389     #endif
390
391             /* ld_37x, bootload or NIM diag process was created */
392             case KW_CREATED:
393                 Msg_info(msg, &msginfo);
394                 if (msginfo.tag < 0x00ffffff)
395                     bl_start(msg, (BOOTLOAD*)msginfo.tag);
396                 else
397                     if (msginfo.tag == DIAGTAG)
398                         diag_run(msg);
399                     else
400                         if (ret)
401                             return((char*)msg);
402                         else
403                             Free(msg);
404                 break;
405
406             /* creation of ld_37x, bootload or NIM diag process failed */
407             case KW_FAILED:
408                 Ini_handle(&handle, msg, NULL, (NOFIX|SUSP));
409                 if (trpl = Get_triple(&handle, Keypack('r','e','q',' '), NUL
410                     if (!strcmp(trpl, "init") && ret)
411                         return((char*)msg);
412                 Msg_info(msg, &msginfo);
413                 if (msginfo.tag <= 0x00ffffff)
414                 {
415                     bl_failed((BOOTLOAD*)msginfo.tag);
416                     Free(msg);
417                 } else
418                     if (msginfo.tag == DIAGTAG)
419                         diag_run(msg);
420                     else
421                         if (ret)
422                             return((char*)msg);
423                         else
424                             Free(msg);
425                 break;
426
427             /* ld_37x process or bootload process exited */
428             case KW_DONE:
429                 Ini_handle(&handle, msg, NULL, (NOFIX|SUSP));
430                 if (trpl = Get_triple(&handle, Keypack('r','e','q',' '), NUL
431                     if (!strcmp(trpl, "init") && ret)
432                         return((char*)msg);
433                 Msg_info(msg, &msginfo);
434                 if ((msginfo.tag != MY_SELF) &&
```

```
                      (msginfo.tag != 0) &&
                      (msginfo.tag <= 0x00ffffff))
                      bl_exited((BOOTLOAD*)msginfo.tag);
                Free(msg);
                break;

/* board diagnostics completed */
            case KW_DIAGCOMP:
                diag_comp(msg);
                break;

#ifndef UNIX
            /* debug request */
            case DBMID_REQ:
                Msg_info(msg, &msginfo);
                db_nim((DB_REQHDR*)msg, &msginfo);
                break;
endif /* set debug level */
            case Keypack('d','e','b','u'):
                Ini_handle(&handle, msg, NULL, (NOFIX|SUSP));
                if (trpl = Get_triple(&handle, Keypack('l','e','v','l'), &si
                    if (size != sizeof(int))
                        Bad_msgf((char*)msg, nim_id_str, cX_LENGTH);
                    else
                    {   nimdb_lvl = *(int*)trpl;
                        Free(msg);
                    }
                else
                    Bad_msgf((char*)msg, nim_id_str, cX_PARAMETER);
                break;

/* dump frames */                              /* TEMP DEBUG
            case Keypack('d','u','m','p'):                 /* TEMP DEBUG
                db_dump(msg);                              /* TEMP DEBUG
                break;                                     /* TEMP DEBUG /* provide MVME372 with tick counter address */ /* TEMP DEBUG
            case Keypack('s','y','n','c'):                 /* TEMP DEBUG
                Free(msg);                                 /* TEMP DEBUG
                db_sync(&lan_info[0]);                     /* TEMP DEBUG
                break;                                     /* TEMP DEBUG /* provide MVME372 with tick counter address */ /* TEMP DEBUG
            case Keypack('t','e','s','t'):                 /* TEMP DEBUG
                Ini_handle(&handle, msg, NULL, (NOFIX|SUSP));/* TEMP DEBUG
                if (trpl = Get_triple(&handle, Keypack('d','e','s','t'), &si
                    if (size != sizeof(int))               /* TEMP DEBUG
                        Bad_msgf(msg, nim_id_str, cX_LENGTH);/* TEMP DEBUG
                    else                                   /* TEMP DEBUG
                    {                                      /* TEMP DEBUG
                        db_txtst(*(uint32*)trpl, &lan_info[0]);/* TEMP DEBUG
                        Free(msg);                         /* TEMP DEBUG
                    }                                      /* TEMP DEBUG
                else                                       /* TEMP DEBUG
                    Bad_msgf(msg, nim_id_str, cX_PARAMETER);/* TEMP DEBUG
                break;                                     /* TEMP DEBUG /*
             * Config_mgt had a fatal error causing it to suspend itself. It
             * removed from the name cache to avoid hanging remote nodes whe
             * try to talk to it. NOTE that this is intended to be a tempora
             * solution which will be removed when a node shutdown mechanism
             * designed/implemented.
             */
            case Keypack('d','i','s','c'):
                Free(msg);
                if (pcb = makepcb(CONN_PROCID(&getconn)))
                    if (cache = srch_cache(l_hash, pcb->p_name))
                        if (cache->instances != 0)
                            if (--cache->instances == 0)
                                if (cache->flags & UPD_MSG_SENT)
                                    send_upd_msg(cache);
                                else
                                    rem_fr_cache(l_hash, cache);
                break;

case Keypack('s','h','u','t'):
                if (Ini_handle(&handle, msg, NULL, (NOFIX|SUSP)) == 0)
```

```
515                        error = cX_FORMAT;
516                    else
517                    {
518                        trpl = Get_triple(&handle, Keypack('p','h','a','s'), NUL
519                        if (trpl == NULL)
520                            error = cX_PARAMETER;
521                        else
522                        {
523                            if (!strcmp(trpl, "receive_off"))
524                                if (sd_phase == 0)
525                                    sd_phase = 1;
526                                else
527                                    error = cX_VALUE;
528                            else if (!strcmp(trpl, "disc_NIM"))
529                                if (sd_phase == 1)
530                                    sd_phase = (*nim_cpuid == my_cpuid) ? 2 : 3;
531                                else
532                                    error = cX_VALUE;
533                            else
534                                error = cX_VALUE;
535                        }
536                    }
537
538                    if (error)
539                    {
540                        Bad_msg((char*)msg, nim_id_str, error);
541                        sd_phase = 0;
542                    } else
543                    {
544                        sd_upst = Get_triple(&handle, Keypack('u','p','s','t'),
545                        sd_msg = (char*)msg;
546                        switch (sd_phase)
547                        {
548                        case 1:
549                            for (i = 0; i < PHTSIZE; i++)
550                            {
551                                cache = (CACHE*)l_hash[i].hash_list.head;
552                                for ( ; cache != 0; cache = cache2)
553                                {
554                                    cache2 = cache->next;
555                                    cache->instances = 0;
556                                    if (cache->flags & UPD_MSG_SENT)
557                                        send_upd_msg(cache);
558                                    else
559                                        rem_fr_cache(l_hash, cache);
560                                }
561                            }
562                            sd_reply(sd_msg, sd_upst);
563                            break;
564                        case 2:
565                            break;
566                        case 3:
567                            sd_reply(sd_msg, sd_upst);
568                            break;
569                        }
570                    }
571                    break;
572
573                default:
574                    Bad_msg ((char*)msg, nim_id_str, cX_MSG_ID);
575                    break;
576            }
577        }
578    }
579
580
581    static char *mci_esr (frame)
582    INTERRUPT_FRAME frame;
583    {
584        ((MCI_PROC *)PROC_REGS)->intenbl = 0;
585        ((MCI_PROC *)PROC_REGS)->intenbl = mci_intrs;
586
587        return (frame.esr_parameter);
588    }
589
590
591    #define SR2      *((short *)0xfc0404)
592    #define SR7      *((short *)0xfc040e)
593    #define CR2      *((short *)0xfc0404)
594    #define CR3      *((short *)0xfc0406)
```

```
static char *sfail_esr (frame)
INTERRUPT_FRAME frame;
{
    uint16 sr_save;              /* processor status register contents /* Inhibit further sysfail interrupts. */
    sr_save = set_sr (IPM7);
    CR2 = 0x3f01 | (SR2 & 0x7e);
    (void)set_sr (sr_save);
    if (((struct sfail_msg*)frame.esr_parameter)->posted)
        return(NULL);
    ((struct sfail_msg*)frame.esr_parameter)->posted = TRUE;
    return (frame.esr_parameter);
} ifdef NEVER
static char *abort_esr (frame)
INTERRUPT_FRAME frame;
{
    uint16 sr7;

/*      sr7 = SR7; */
/*      CR3 = 0x0631; */
/*      CR3 = 0x0611; */
    for (;;);
    return (NULL);
}
endif static void check_cpus()
{
    bool notify = FALSE;
    register MCI_CHANNEL *channel;
    register MSG_DESC *md;
    register uint8 cpuid, tofrom;
    uint8 val;
    bool not_gone;
    char str[80];

if (!mci_enabled || ProcCount <= 1)
        return;
    cpuid = (my_cpuid == NOCPU-1) ? 0 : my_cpuid+1;
    for ( ; cpuid != my_cpuid; cpuid = (cpuid == NOCPU-1) ? 0 : cpuid+1)
    {
        channel = Get_channel(cpuid, my_cpuid);
        if (channel->status == MCI_ACTIVE)
        {
            if (not_gone =
                    (bool)cx_probe(MP_RDB, &channel->mci_intf->procstat
                if (!(val & MCI_BUSY))
                    break;
            channel = Get_channel(cpuid, 0);
            for (tofrom = 0; tofrom < NOCPU; tofrom++, channel++)
                channel->status = MCI_IDLE;
            if (not_gone)
                sprintf(str, "CPU %d has failed (BUSY flag set)", cpuid)
            else
                sprintf(str, "CPU %d has failed (probe failed)", cpuid);
            nim_note(str);
            notify = TRUE;
        }
    } if (notify)
    {
        fail_calls(MY_SELF, HOST(cpuid,my_nodeid));
        md = get_msg_desc();
        md->header.msg_type   = NEW_SUCCESSOR;
        md->header.msg_dest   = md->header.msg_origin = MY_SELF;
        md->header.msg_length = sizeof(struct new_successor);
        md->msg_addr          = md->message;
        ((struct new_successor *)md->msg_addr)->succ_addr =
            HOST(cpuid,my_nodeid);
        send_to_next(md);
    }
}
```

```
static void sd_reply(sd_msg, sd_upst)
char *sd_msg;              /* shutdown request message      */
char *sd_upst;             /* shutdown response string      */
{
    char *msg;
    register MCI_CHANNEL *channel;
    register int i;

if (sd_upst != 0)
        msg = Makemsg(TRIPLESIZE + strlen(sd_upst), "!synch", " upst = #
    else
        msg = Makemsg(TRIPLESIZE, "!synch", "");
    if (mci_enabled && sd_phase == 3)

for (channel = Get_channel(my_cpuid, 0), i = 0; i < NOCPU; i++,
            channel->status = MCI_IDLE;
    Reply(sd_msg, msg);
} void nim_note(text)
register char    *text;
{
    extern char         nim_id_str[];
    register char       *msg;

#ifdef UNIX
    printf("%s: %s\n", nim_id_str, text);
#else
    /* Build a "log" message, leaving room for the time field */
    if ((msg = Makemsg(((uint32)TRIPLESIZE*3 + 7*sizeof(int16) +
                strlen(nim_id_str) + 2 + strlen(text) + 2),
                "log", "ref #s; desc #s", nim_id_str, text)))
    {
        Put(NEXT, "Sys_log", msg);
    }
endif
}
```

APPENDIX I

```
#***********************************************************************

#       (C) Copyright 1987, 1988, 1989. MOTOROLA Computer X, Inc.
#       All Rights Reserved.

#       The copyright notice above does not evidence any actual or
#       intended publication of this source code. Reproduction by
#       recipient in whole or in part is forbidden except as provided
#       in writing by MOTOROLA Computer X, Inc.

#       Description     :
#               This module provides the interface to, and much
#               of the code for, the kernel primitives.

*********************************************************************** ident   "@(#)kentry.s   3.4 - 89/03/17"

include "os/MMU_defs.hs"
#include "os/kerntypes.hs"
#include "os/eim.hs"

set     MAXPRIM,        35 set     RDY_TO_RUN_B,   7             # from rtpb->sched field
        set     SUSPENDED_B,    6
        set     SUSPENDME_B,    5 set     ABORTED_B,      5             # from rtpb->flags field
        set     NOWAIT_B,       2
        set     VALIDMSG_B,     1
        set     SELECTGET_B,    0
```

```
35
36          set     CALLED_B,       5                       # from msg->flags
37
38          set     MAPPED_B,       0                       # from msg->mflags
39
40          set     ROBUST_B,       0                       # from msg->lrflags
41
42          set     msg_sconn_host%,msg_src_conn% + connector_cnh%
43          set     msg_sconn_pid%, msg_src_conn% + connector_cn_procid%
44          set     msg_sconn_chan%,msg_src_conn% + connector_cn_channel%
45
46          set     msg_dconn_host%,msg_dst_conn% + connector_cnh%
47          set     msg_dconn_pid%, msg_dst_conn% + connector_cn_procid%
48          set     msg_dconn_chan%,msg_dst_conn% + connector_cn_channel%
49
50          set     msg_lconn_host%,msg_lri_conn% + connector_cnh%
51          set     msg_lconn_pid%, msg_lri_conn% + connector_cn_procid%
52          set     msg_lconn_chan%,msg_lri_conn% + connector_cn_channel%
53
54
55          text
56
57          global  running                 # defined in rtkern/glob.c
58          global  sched_lock              # defined in rtkern/glob.c
59          global  a_putfor                # putfor.s
60          global  a_mlink, a_munlink      # queues.s
61          global  a_append_rtrq           # rtkern/schedule.m4
62          global  extract_rtrq            # rtkern/schedule.m4
63          global  reschedule              # rtkern/schedule.m4
64          global  findpid                 # rtkern/pid_prim.m4
65          global  probe                   # misc.c
66          global  eim_connect             # rtkern/eim.c
67          global  eim_disconnect          # rtkern/eim.c
68          global  w_cur_user              # rtkern/userio.s
69          global  fcu_long, fcu_pid       # rtkern/userio.s
70          global  reperr                  # event.s
71          global  alloc_msg, free_msg, realloc_msg
72          global  map_msg, unmap_msg
73          global  heap_size, heap_maint
74          global  map_physical, get_pagelist
75          global  panic_entry
76          global  cx_timestamp            # timestamp.s in clock
77
78          global  k_entry
79
80          nop
81  k_entry:
82          movm.l  &0xc0c0,-(%sp)          # save d0-d1 + a0-a1
83          mov.l   %a2,-(%sp)              # save a2
84          mov.b   &1,sched_lock+3         # don't allow any premptive sche
85                                          # use low byte of long
86          mov.l   running,%a2
87          mov.l   %sp,rtpb_uregs%(%a2)    # save pointer to user registers
88
89          cmp.l   %d0,&MAXPRIM
90          bge.w   L%primerr
91          add.w   %d0,%d0
92          mov.w   10(%pc,%d0.w),%d0       # dispatch to the appropriate
93          jmp     6(%pc,%d0.w)            # kernel primitive handler
94
95          swbeg   &MAXPRIM
96  PD_table:
97          short   L%primerr - PD_table
98          short   L%PUT - PD_table
99          short   L%FORWARD - PD_table
100         short   L%primerr - PD_table
101         short   L%primerr - PD_table
102         short   L%REPLY - PD_table
103         short   L%primerr - PD_table
104         short   L%CONNECT - PD_table
105         short   L%DISCONNECT - PD_table
106         short   L%ALLOCMEM - PD_table
107         short   L%FREEMEM - PD_table
108         short   L%primerr - PD_table
109         short   L%MSG_PARM - PD_table
110         short   L%primerr - PD_table
111         short   L%primerr - PD_table
112         short   L%primerr - PD_table
113         short   L%HEAPMAINT - PD_table
114         short   L%MPROBE - PD_table
```

```
115            short    L%MPHYS - PD_table
116            short    L%REALLOC - PD_table
117            short    L%ANY_MSG - PD_table
118            short    L%CALL - PD_table
119            short    L%GET - PD_table
120            short    L%MSG_INFO - PD_table
121            short    L%RESUME - PD_table
122            short    L%SUSPEND - PD_table
123            short    L%STEALTH - PD_table
124            short    L%HEAPGROW - PD_table
125            short    L%PHYSMAP - PD_table
126            short    L%TIMESTAMP - PD_table
127            short    L%primerr - PD_table
128            short    L%primerr - PD_table
129            short    L%primerr - PD_table
130            short    L%MEM_STAT - PD_table
131            short    L%ASYNCIO - PD_table
132
133
134    ################################################################
135
136    L%HALTCPU:
137            clr.l    %d0
138            mov.w    %sr,%d0
139            mov.l    %d0,-(%sp)
140            stop     &0x2700
141            mov.l    (%sp)+,%d0
142            mov.w    %d0,%sr
143            jmp      reschedule
144
145
146    ################################################################
147
148    L%PUT:
149            mov.w    %sr,%d0                    # if we are at hardware priority
150            and.w    &INTMASK,%d0               # when we issue a system call, p
151            bne.w    L%panic_entry              # we'll try for something else,
152
153            mov.l    %a1,%d0
154            jsr      find_header
155            beq.w    L%fakemsg
156            mov.l    %d0,%a1
157            cmp.l    %a2,msg_owner%(%a1)
158            bne.w    L%stolenmsg
159
160            btst     &CALLED_B,msg_flags%(%a1)  # if sending a message
161            bne.b    L%put_call                 # with CALLED bit still set
162    L%putok:
163            clr.b    msg_xmit_stat%(%a1)        # indicate no error
164            clr.b    msg_flags%(%a1)
165            mov.l    this_cell,msg_sconn_host%(%a1)
166            mov.l    rtpb_pid%(%a2),msg_sconn_pid%(%a1)
167            clr.l    msg_sconn_chan%(%a1)
168
169            mov.l    uregs_d1%(%sp),%d1         # restore transmission mode
170            mov.l    uregs_a0%(%sp),%a0         # restore destination pointer
171            pea      reschedule                 # rts in a_putfor goes to resche
172            jmp      a_putfor                   # a_putfor(running->d1,a0,a1);
173
174    L%put_call:
175            bsr.w    L%fail_call
176            br.b     L%putok
177
178    ################################################################
179
180
181    L%FORWARD:
182            mov.w    %sr,%d0                    # if we are at hardware priority
183            and.w    &INTMASK,%d0               # when we issue a system call, p
184            bne.w    L%panic_entry              # we'll try for something else,
185
186            mov.l    %a1,%d0
187            jsr      find_header
188            beq.w    L%fakemsg
189            mov.l    %d0,%a1
190            cmp.l    %a2,msg_owner%(%a1)
191            bne.w    L%stolenmsg
192            tst.l    msg_sconn_pid%(%a1)        # if (!msg.src_conn->pid)
193            beq.w    L%allocedmsg               #   then reperr (X_ALLOCEDMSG);
194
```

```
195             mov.l       uregs_d1%(%sp),%d1      # restore transmission mode
196             mov.l       uregs_a0%(%sp),%a0      # restore destination pointer
197             jsr         a_putfor                # a_putfor(running->d1,a0,a1);
198             mov.l       %d0,uregs_d0%(%sp)
199             jmp         reschedule
200
201     ##################################################################
202
203
204     L%GET:
205             mov.w       %sr,%d0                 # if we are at hardware priority
206             and.w       &INTMASK,%d0            # when we issue a system call, p
207             bne.w       L%panic_entry           # we'll try for something else,
208
209             mov.l       %a0,%d1                 # check to see if we're doing a
210             bne.b       get_select              # selective get
211             bclr        &SELECTGET_B,rtpb_flags%(%a2)
212             mov.w       &NOINTRS,%sr            # DISABLE all interrupts
213             mov.l       rtpb_m_first%(%a2),%d0  # if not, see if message present
214             beq.w       get_suspend
215             mov.l       %d0,%a0                 # if present, return it to calle
216     got_first_message:
217             cmp.l       %a0,rtpb_m_elast%(%a2)
218             bne.b       L%unlink
219             clr.l       rtpb_m_elast%(%a2)
220     L%unlink:
221             mov.l       msg_next%(%a0),%d1
222             mov.l       %d1,rtpb_m_first%(%a2)  # rtpb->m_first = msg->next
223             beq.b       L%only_msg
224             mov.l       %d1,%a1
225             clr.l       msg_prev%(%a1)
226             br.b        get_deliver             # if not only message, then done
227     L%only_msg:
228             clr.l       rtpb_m_last%(%a2)       # else rtpb->m_last = NULL;
229     get_deliver:
230             mov.w       &SUPERVISOR,%sr         # ENABLE all interrupts
231             br.w        L%chk_map
232
233     get_select:
234             clr.b       sched_lock+3
235             jsr         fcu_pid                 # fcu_pid(&conn)
236             mov.l       %d0,rtpb_arg1%(%a2)     # %d0 contains HOSTID
237             mov.l       %d1,rtpb_arg0%(%a2)     # %d1 contains PROCID
238             mov.b       &1,sched_lock+3
239
240             bset        &SELECTGET_B,rtpb_flags%(%a2)
241             mov.b       &GET%,rtpb_k_code%(%a2) # in case ISR posts to us
242             lea.l       rtpb_m_first%(%a2),%a0
243             mov.l       %d2,-(%sp)              # temporary work register
244     get_loop:
245             mov.l       msg_next%(%a0),%d2      # chain down to next, if NULL
246             beq.b       get_nomatch             # then at the end of the queue
247             mov.l       %d2,%a0
248             cmp.l       %d1,msg_sconn_pid%(%a0) # see if message sender matches
249             bne.b       get_loop                # value specified in the 'Get'
250             cmp.l       %d0,msg_sconn_host%(%a0)
251             bne.b       get_loop
252             mov.l       (%sp)+,%d2
253     got_msg:                                    # SUCCESS!!
254             mov.w       &NOINTRS,%sr            # MASK all interrupts
255             tst.b       rtpb_k_code%(%a2)       # see if an ISR posted a message
256             beq.b       get_satisfied           # satisfying the get_by_pid
257             clr.b       rtpb_k_code%(%a2)
258             cmp.l       %a0,rtpb_m_first%(%a2)  # if (m == rtpb->m_first)
259             beq.w       got_first_message       # then we found the first queued
260             mov.l       msg_prev%(%a0),%a1
261             mov.l       msg_next%(%a0),msg_next%(%a1)
262             bne.b       L%took_middle
263             mov.l       %a1,rtpb_m_last%(%a2)
264             br.b        select_deliver
265     L%took_middle:
266             mov.l       msg_next%(%a0),%a1
267             mov.l       msg_prev%(%a0),msg_prev%(%a1)
268
269     select_deliver:
270             cmp.l       %a0,rtpb_m_elast%(%a2)
271             bne.w       get_deliver
272             mov.l       msg_prev%(%a0),rtpb_m_elast%(%a2)
273             br.w        get_deliver
274
```

```
275  get_nomatch:
276         mov.l      (%sp)+,%d2
277         mov.w      &NOINTRS,%sr
278         tst.b      rtpb_k_code%(%a2)
279         bne.b      L%wait_msg
280  get_satisfied:
281         clr.b      sched_lock+3              # use low byte of long
282         br.b       L%delivered               # go deliver message
283
284  get_suspend:
285         mov.b      &GET%,rtpb_k_code%(%a2)   # non-selective Get
286  L%wait_msg:
287         bset       &SUSPENDME_B,rtpb_sched%(%a2)
288         mov.w      rtpb_rtpb_priobase%(%a2),rtpb_c_pri%(%a2)
289         mov.w      rtpb_rtpb_quantbase%(%a2),rtpb_quantleft%(%a2)
290         mov.w      rtpb_rtpb_quantbase%(%a2),rtpb_rtpb_quantcurr%(%a2)
291         jsr        schedule                  # preserves current interrupt ma
292  L%delivered:                                # return with scheduling enabled
293         mov.w      &SUPERVISOR,%sr           # enable ALL interrupts
294         mov.l      rtpb_arg0%(%a2),%d0
295         beq.w      L%null_delivery           # can only happen to a Call
296         mov.l      %d0,%a0
297         mov.b      &1,sched_lock+3           # don't allow premption
298
299         tst.l      msg_owner%(%a0)
300         bne.b      dont_map
301  L%chk_map:
302         jsr        a_mlink
303         btst       &MAPPED_B,msg_mflags%+3(%a0)
304         bne.b      dont_map
305  L%junk:
306         mov.l      %a0,-(%sp)
307         mov.l      %a2,-(%sp)
308  L%map_msg:
309         jsr        map_msg                   # map_msg(running, msg)
310         tst.l      %d0                       # test for null virtual address
311         bne.b      L%restore_stack
312         mov.l      &1,-(%sp)                 # wait for 1 page to be availabl
313         jsr        rt_memwait
314         add.l      &4,%sp
315         br.b       L%map_msg                 # arguments still on stack
316  L%restore_stack:
317         add.l      &4,%sp                    # get rid of running
318         mov.l      (%sp)+,%a0                # restore msg pointer
319  dont_map:
320         mov.w      &NOINTRS,%sr              # disable ALL interrupts
321         bclr       &VALIDMSG_B,rtpb_flags%(%a2)
322         and.b      &CALLED,msg_flags%(%a0)   # save CALLED bit state
323         and.b      &0xfc,msg_mflags%+3(%a0)  # turn off MAPPED and REPORTED b
324         clr.b      sched_lock+3              # use low byte of long
325         mov.w      &SUPERVISOR,%sr           # enable ALL interrupts
326
327         mov.l      msg_body%(%a0),uregs_d0%(%sp)   # pass back adr of msg b
328         mov.l      msg_size%(%a0),uregs_a0%(%sp)   # and the size
329         mov.l      uregs_a1%(%sp),%d0        # get pointer to conn_in
330         beq.w      L%reschedule              # if null, don't pass info
331         mov.l      &sizeof_connector%,-(%sp) # xfer count
332         pea.l      msg_src_conn%(%a0)        # kernel virtual address
333         mov.l      %d0,-(%sp)                # user virtual address
334         jsr        w_cur_user                # write connector info to user
335         add.l      &12,%sp
336         jmp        reschedule
337  L%null_delivery:
338         clr.l      uregs_d0%(%sp)            # return Call failure to user
339         jmp        reschedule                # for now
340
341  ##############################################################################
342
343
344  L%CALL:
345         mov.w      %sr,%d0                   # if we are at hardware priority
346         and.w      &INTMASK,%d0              # when we issue a system call, p
347         bne.w      L%panic_entry             # we'll try for something else,
348
349         mov.l      %a1,%d0
350         jsr        find_header
351         beq.w      L%fakemsg
352         mov.l      %d0,%a1
353         cmp.l      %a2,msg_owner%(%a1)
354         bne.w      L%stolenmsg
```

```
355
356              btst       &CALLED_B,msg_flags%(%a1)    # if sending a message
357              bne.b      L%call_call                  # with CALLED bit still set
358  L%callok:
359              mov.b      &CALLED,msg_flags%(%a1)
360              clr.b      msg_xmit_stat%(%a1)
361              mov.l      this_cell,msg_sconn_host%(%a1)
362              mov.l      rtpb_pid%(%a2),msg_sconn_pid%(%a1)
363              clr.l      msg_sconn_chan%(%a1)
364
365              mov.b      &CALL%,rtpb_k_code%(%a2)     # indicate suspended in
366              mov.l      uregs_d1%(%sp),%d1           # restore transmission mode
367              mov.l      uregs_a0%(%sp),%a0           # restore destination pointer
368              jsr        a_putfor                     # a_putfor(running->d1,a0,a1);
369              tst.l      %d0                          # if putfor fails immediately,
370              beq.b      L%call_fail                  # go fail the call
371              mov.l      uregs_a2%(%sp),uregs_a1%(%sp)  # set up conn_in for del
372
373              mov.w      &NOINTRS,%sr                 # DISABLE all interrupts
374              tst.b      rtpb_k_code%(%a2)
375              bne.w      L%wait_msg
376              br.w       L%delivered
377  L%call_fail:
378              clr.b      rtpb_k_code%(%a2)
379              clr.l      uregs_d0%(%sp)               # return NULL to caller
380              jmp        reschedule
381
382  L%call_call:
383              bsr.w      L%fail_call
384              br.b       L%callok
385
386  ################################################################
387
388
389  L%REPLY:
390              mov.w      %sr,%d0                      # if we are at hardware priority
391              and.w      &INTMASK,%d0                 # when we issue a system call, p
392              bne.w      L%panic_entry                # we'll try for something else,
393
394              mov.l      %a0,%d0
395              jsr        find_header                  # returns header pointer in d0
396              beq.w      L%fakemsg
397              mov.l      %d0,%a0
398              cmp.l      %a2,msg_owner%(%a0)
399              bne.w      L%stolenmsg
400              tst.l      msg_sconn_pid%(%a0)          # if (!msg->pid)
401              beq.w      L%allocedmsg                 #    then reperr (X_ALLOCEDMSG);
402
403              mov.l      uregs_a1%(%sp),%a1
404              cmp.l      %a1,msg_body%(%a0)           # see if they are one and the sa
405              beq.b      L%samemsg                    # if same, then duplicate msg hd
406
407              mov.l      %a0,-(%sp)
408              mov.l      %a1,%d0
409              jsr        find_header                  # condition codes have been set
410              mov.l      (%sp)+,%a0                   # does not affect Condition Code
411              beq.w      L%fakemsg
412              mov.l      %d0,%a1
413              cmp.l      %a2,msg_owner%(%a1)
414              bne.w      L%stolenmsg
415  L%samemsg:                                          # d0 still valid from 1st find_h
416              mov.l      %d0,%a1
417              clr.l      %d1
418              btst       &CALLED_B,msg_flags%(%a0)
419              beq.b      L%notcalled
420              bclr       &CALLED_B,msg_flags%(%a0)
421              mov.l      &REPLIED,%d1
422  L%notcalled:
423              btst       &CALLED_B,msg_flags%(%a1)
424              bne.b      L%reply_call
425  L%replyok:
426              mov.l      msg_tag%(%a0),msg_tag%(%a1)
427              mov.l      msg_dconn_chan%(%a0),msg_dconn_chan%(%a1)
428              mov.b      %d1,msg_flags%(%a1)
429              clr.b      msg_xmit_stat%(%a1)
430              mov.l      msg_sconn_host%(%a0),msg_dconn_host%(%a1)
431              mov.l      msg_sconn_pid%(%a0),msg_dconn_pid%(%a1)
432              mov.l      this_cell,msg_sconn_host%(%a1)
433              mov.l      rtpb_pid%(%a2),msg_sconn_pid%(%a1)
434              clr.l      msg_sconn_chan%(%a1)
```

```
435
436             mov.l       &X_REPLY%,%d1
437             pea         reschedule              # rts in a_putfor goes to resche
438             jmp         a_putfor                # a_putfor(RETSNDR, msg_out)
439
440     L%reply_call:
441             bsr.w       L%fail_call
442             br.b        L%replyok
443
444     ################################################################
445
446
447     L%CONNECT:
448             mov.w       %sr,%d0                 # if we are at hardware priority
449             and.w       &INTMASK,%d0            # when we issue a system call,
450             bne.w       L%panic_entry           # we'll try for something else,
451
452             mov.l       %a0,%d0
453             beq.w       L%esrerr
454             cmp.l       %d1,&EVLO               # make sure we're trying to conn
455             blt.w       L%lvlerr                # to a valid level
456             cmp.l       %d1,&EVHI
457             bgt.w       L%lvlerr
458             movm.l      &0x40c0,-(%sp)
459             jsr         eim_connect             # eim_connect(running->d1,a0);
460             add.w       &12,%sp
461             mov.l       %d0,uregs_d0%(%sp)
462             jmp         reschedule              # return value to the user
463
464     ################################################################
465
466
467     L%DISCONNECT:
468             mov.w       %sr,%d0                 # if we are at hardware priority
469             and.w       &INTMASK,%d0            # when we issue a system call, p
470             bne.w       L%panic_entry           # we'll try for something else,
471
472             cmp.l       %d1,&EVLO               # make sure we're disconnecting
473             blt.w       L%lvlerr                # a valid level
474             cmp.l       %d1,&EVHI
475             bgt.w       L%lvlerr
476             mov.l       %d1,-(%sp)
477             jsr         eim_disconnect          # eim_disconnect(running->d1);
478             add.l       &4,%sp
479             mov.l       %d0,uregs_d0%(%sp)
480             jmp         reschedule              # return value to the user
481
482     ################################################################
483
484
485     L%HEAPGROW:
486             mov.w       %sr,%d0                 # if we are at hardware priority
487             and.w       &INTMASK,%d0            # when we issue a system call, p
488             bne.w       L%panic_entry           # we'll try for something else,
489
490             mov.b       rtpb_flags%(%a2),%d0    # save existing rtpb flags
491             mov.l       %d0,-(%sp)
492             tst.l       uregs_a0%+4(%sp)        # check suspend code from user
493             bne.b       L%hg_wait
494             bset        &NOWAIT_B,rtpb_flags%(%a2)
495             br.b        L%heapgrow
496     L%hg_wait:
497             bclr        &NOWAIT_B,rtpb_flags%(%a2)
498     L%heapgrow:
499             mov.b       &ALLOCMEM%,rtpb_k_code%(%a2)
500             mov.l       %d1,-(%sp)
501             mov.l       %a2,-(%sp)
502             jsr         heap_size               # heap_size(running, delta)
503             add.l       &8,%sp
504             clr.b       rtpb_k_code%(%a2)
505             mov.l       (%sp)+,%d1              # restore rtpb flags
506             mov.b       %d1,rtpb_flags%(%a2)
507
508             mov.l       %d0,uregs_d0%(%sp)
509             beq.b       heapgrow_fail           # check for allocation failure
510             jmp         reschedule              # return value to the user
511
512     heapgrow_fail:
513             mov.l       &-1,%d0
514             mov.l       %d0,uregs_d0%(%sp)
```

```
515            jmp      reschedule
516
517  ####################################################################
518
519
520  L%HEAPMAINT:
521            mov.w    %sr,%d0                        # if we are at hardware priority
522            and.w    &INTMASK,%d0                   # when we issue a system call, p
523            bne.w    L%panic_entry                  # we'll try for something else,
524
525            mov.b    &ALLOCMEM%,rtpb_k_code%(%a2)
526            mov.l    %a1,-(%sp)
527            mov.l    %a0,-(%sp)
528            mov.l    %d1,-(%sp)
529            mov.l    %a2,-(%sp)
530            jsr      heap_maint                     # heap_maint(running, op, arg1,
531            add.l    &16,%sp
532            clr.b    rtpb_k_code%(%a2)
533            mov.l    rtpb_heap_control%(%a2),%a0
534            mov.l    msg_body%(%a0),uregs_a0%(%sp)
535            mov.l    %d0,uregs_d0%(%sp)
536            jmp      reschedule
537
538  ####################################################################
539
540
541  L%ALLOCMEM:
542            mov.w    %sr,%d0                        # if we are at hardware priority
543            and.w    &INTMASK,%d0                   # when we issue a system call, p
544            bne.w    L%panic_entry                  # we'll try for something else,
545
546            tst.l    %d1
547            beq.w    alloc_fail
548
549            mov.b    rtpb_flags%(%a2),%d0           # save existing rtpb flags
550            mov.l    %d0,-(%sp)
551            tst.l    uregs_a0%+4(%sp)               # check suspend code from user
552            beq.b    L%nowait                       # not set, can't wait for memory
553            bclr     &NOWAIT_B,rtpb_flags%(%a2)
554            br.b     L%allocmem
555  L%nowait:
556            bset     &NOWAIT_B,rtpb_flags%(%a2)
557  L%allocmem:
558            mov.b    &ALLOCMEM%,rtpb_k_code%(%a2)
559            clr.l    -(%sp)
560            mov.l    %d1,-(%sp)
561            mov.l    %a2,-(%sp)
562            jsr      alloc_msg                      # alloc_msg(running, size, full_
563            add.l    &12,%sp
564            clr.b    rtpb_k_code%(%a2)
565            mov.l    (%sp)+,%d1                     # restore rtpb flags
566            mov.b    %d1,rtpb_flags%(%a2)
567
568            tst.l    %d0                            # returns pointer in both a0 and
569            beq.b    alloc_fail                     # check for allocation failure
570
571            mov.l    msg_body%(%a0),uregs_d0%(%sp)
572            jsr      a_mlink                        # a_mlink(addr, running)
573            jmp      reschedule
574
575  alloc_fail:
576            clr.l    uregs_d0%(%sp)                 # return NULL to the caller
577            jmp      reschedule
578
579  ####################################################################
580
581
582  L%REALLOC:
583            mov.w    %sr,%d0                        # if we are at hardware priority
584            and.w    &INTMASK,%d0                   # when we issue a system call, p
585            bne.w    L%panic_entry                  # we'll try for something else,
586
587            tst.l    %d1
588            beq.w    alloc_fail
589            mov.l    %a0,%d0
590            jsr      find_header                    # returns header in d0
591            beq.w    L%fakemsg
592            mov.l    %d0,%a0
593            cmp.l    %a2,msg_owner%(%a0)
594            bne.w    L%stolenmsg
```

```
595
596              mov.b    rtpb_flags%(%a2),%d0      # save existing rtpb flags
597              mov.l    %d0,-(%sp)
598              tst.l    uregs_a1%+4(%sp)                    # check suspend code fro
599              beq.b    L%setnowait                         # not set, can't wait for memory
600              bclr     &NOWAIT_B,rtpb_flags%(%a2)
601              br.b     L%realloc
602 L%setnowait:
603              bset     &NOWAIT_B,rtpb_flags%(%a2)
604 L%realloc:
605              mov.b    &ALLOCMEM%,rtpb_k_code%(%a2)
606              mov.l    uregs_d1%+4(%sp),-(%sp)
607              mov.l    %a0,-(%sp)
608              mov.l    %a2,-(%sp)
609              jsr      realloc_msg              # realloc_msg(rtpb, msg, size)
610              add.l    &12,%sp
611              clr.b    rtpb_k_code%(%a2)
612              mov.l    (%sp)+,%d1
613              mov.b    %d1,rtpb_flags%(%a2)     # restore rtpb flags
614
615              tst.l    %d0                      # returns pointer in both a0 and
616              beq.b    realloc_fail             # check for allocation failure
617              mov.l    msg_body%(%a0),uregs_d0%(%sp)
618              jmp      reschedule
619
620 realloc_fail:
621              clr.l    uregs_d0%(%sp)           # return NULL to the caller
622              jmp      reschedule
623
624 ###############################################################################
625
626
627 L%FREEMEM:
628              mov.w    %sr,%d0                  # if we are at hardware priority
629              and.w    &INTMASK,%d0             # when we issue a system call, p
630              bne.w    L%panic_entry            # we'll try for something else,
631
632              mov.l    %a0,%d0
633              jsr      find_header              # returns header pointer in d0
634              beq.w    L%fakemsg
635              mov.l    %d0,%a0
636              cmp.l    %a2,msg_owner%(%a0)
637              bne.w    L%stolenmsg
638
639              btst     &ROBUST_B,msg_lrflags%(%a0)
640              beq.b    L%free
641              mov.l    msg_lconn_host%(%a0),%d0
642              beq.b    L%free
643              mov.l    %a0,-(%sp)
644              jsr      xmit_rlr_flush
645              mov.l    (%sp)+,%a0
646              clr.b    msg_lrflags%(%a0)
647 L%free:
648              jsr      a_munlink                # munlink(msg, running)
649              btst     &CALLED_B,msg_flags%(%a0)    # if freeing a message
650              bne.b    L%free_call                  # with CALLED bit still set
651
652              mov.l    %a0,-(%sp)
653              mov.l    %a2,-(%sp)
654              jsr      free_msg                 # free_msg(running, msg)
655              add.l    &8,%sp
656              jmp      reschedule               # we may have woken someone upa
657
658 L%free_call:
659              mov.l    %a0,-(%sp)
660              jsr      unmap_msg                # unmap_msg(msg)
661              mov.l    (%sp)+,%a0
662              bsr.w    L%call_err
663              jmp      reschedule
664
665 ###############################################################################
666
667
668 L%SUSPEND:
669              mov.w    %sr,%d0                  # if we are at hardware priority
670              and.w    &INTMASK,%d0             # when we issue a system call, p
671              bne.w    L%panic_entry            # we'll try for something else,
672
673              clr.b    sched_lock+3             # use low byte of long
674              pea      connector_cn_procid%(%a0)
```

```
675             jsr     fcu_long                # fetch procid portion of connec
676             mov.l   %d0,(%sp)               # use slot from 'pea'
677             jsr     findpid                 # findpid(conn->procid);
678             add.l   &4,%sp
679             mov.b   &1,sched_lock+3         # use low byte of long
680
681     suspend_check:
682             tst.l   %d0
683             beq.b   suspend_fail
684             btst    &SUSPENDED_B,rtpb_sched%(%a0)
685             bne.b   suspend_fail
686             bset    &SUSPENDED_B,rtpb_sched%(%a0)
687             btst    &RDY_TO_RUN_B,rtpb_sched%(%a0)
688             beq.b   L%SS00
689             mov.l   %a0,-(%sp)
690             jsr     extract_rtrq
691             add.l   &4,%sp
692             bset    &RDY_TO_RUN_B,rtpb_sched%(%a0)
693     L%SS00:
694             cmp.l   %a2,%a0                 # see if we're suspending oursel
695             bne.b   suspend_done
696     suspend_myself:
697             bset    &SUSPENDME_B,rtpb_sched%(%a2)
698     suspend_done:
699             mov.l   &1,uregs_d0%(%sp)
700             jmp     reschedule
701     suspend_fail:
702             clr.l   uregs_d0%(%sp)
703             jmp     reschedule
704
705     ################################################################
706
707
708     L%RESUME:
709             mov.w   %sr,%d0                 # if we are at hardware priority
710             and.w   &INTMASK,%d0            # when we issue a system call, p
711             bne.w   L%panic_entry           # we'll try for something else,
712
713             clr.b   sched_lock+3            # use low byte of long
714             pea     connector_cn_procid%(%a0)
715             jsr     fcu_long                # fetch procid portion of connec
716             mov.l   %d0,(%sp)               # use slot from 'pea'
717             jsr     findpid                 # p = findpid(procid);
718             add.l   &4,%sp
719             mov.b   &1,sched_lock+3         # use low byte of long
720
721             tst.l   %d0
722             beq.b   L%resume_fail
723             btst    &SUSPENDED_B,rtpb_sched%(%a0)
724             beq.b   L%resume_fail
725             mov.w   &NOINTRS,%sr            # disable all interrupts
726
727             btst    &ABORTED_B,rtpb_flags%(%a0)
728             beq.b   L%resume_process
729             cmp.l   rtpb_parent%(%a0),&root
730             bne.b   L%resume_process
731             mov.l   %a0,-(%sp)
732             mov.l   &CREATE,-(%sp)
733             pea.l   rtpb_p_name%(%a0)
734             jsr     tonim_cxc               # notify NIM of status change
735             add.l   &8,%sp
736             mov.l   (%sp)+,%a0
737
738     L%resume_process:
739             bclr    &SUSPENDED_B,rtpb_sched%(%a0)
740             bclr    &ABORTED_B,rtpb_flags%(%a0)
741             btst    &RDY_TO_RUN_B,rtpb_sched%(%a0)
742             beq.b   L%resume_done
743             bclr    &RDY_TO_RUN_B,rtpb_sched%(%a0)
744             mov.l   %a0,%a1
745             jsr     a_append_rtrq           # a_append_rtrq(p)
746     L%resume_done:
747             mov.w   &SUPERVISOR,%sr         # enable all interrupts
748             mov.l   &1,uregs_d0%(%sp)
749             jmp     reschedule
750     L%resume_fail:
751             clr.l   uregs_d0%(%sp)
752             jmp     reschedule
753
754     ################################################################
```

```
L%ANY_MSG:
        mov.w   %sr,%d0              # if we are at hardware priority
        and.w   &INTMASK,%d0         # when we issue a system call, p
        bne.w   L%panic_entry        # we'll try for something else, mov.l   rtpb_m_first%(%a2),%d1  # check for an empty queue
        beq.b   f_anymsg
        mov.l   %a0,%d0              # if (conn_ptr == NULL)
        beq.b   t_anymsg             #     return(TRUE);

clr.b   sched_lock+3         # use low byte of long
        jsr     fcu_pid              # fcu_pid(&conn)
                                     # %d0 contains HOSTID
        mov.l   %d1,%a1              # %d1 contains PROCID
        mov.b   &1,sched_lock+3      # use low byte of long
        mov.l   rtpb_m_first%(%a2),%d1
msg_loop:
        mov.l   %d1,%a0
        cmp.l   %a1,msg_sconn_pid%(%a0)
        bne.b   L%anymsg_nxt
        cmp.l   %d0,msg_sconn_host%(%a0)
        beq.b   t_anymsg
L%anymsg_nxt:
        mov.l   msg_next%(%a0),%d1
        bne.b   msg_loop
f_anymsg:
        clr.l   uregs_d0%(%sp)
        jmp     reschedule           # return(FALSE);
t_anymsg:
        mov.l   &1,uregs_d0%(%sp)
        jmp     reschedule           # return(TRUE);

################################################################

L%MSG_INFO:
        mov.w   %sr,%d0              # if we are at hardware priority
        and.w   &INTMASK,%d0         # when we issue a system call, p
        bne.w   L%panic_entry        # we'll try for something else, mov.l   %a0,%d0
        jsr     find_header          # returns header ptr in d0
        beq.w   L%fakemsg
        mov.l   %d0,%a0
        cmp.l   %a2,msg_owner%(%a0)
        bne.w   L%stolenmsg clr.b   sched_lock+3         # use low byte of long mov.l   uregs_a1%(%sp),%a1   # %a1 clobbered by find_header
        mov.l   &sizeof_msg_i%,-(%sp)  # size of msg_info struct
        pea     msg_size%(%a0)       # kernel virtual addr in msg hdr
        mov.l   %a1,-(%sp)           # user vaddr of struct
        jsr     w_cur_user
        add.l   &12,%sp
        jmp     reschedule

################################################################

L%MSG_PARM:
        mov.w   %sr,%d0              # if we are at hardware priority
        and.w   &INTMASK,%d0         # when we issue a system call, p
        bne.w   L%panic_entry        # we'll try for something else, mov.l   %a0,%d0
        jsr     find_header          # returns header ptr in d0
        beq.w   L%fakemsg
        mov.l   %d0,%a0
        cmp.l   %a2,msg_owner%(%a0)
        bne.w   L%stolenmsg mov.l   uregs_d1%(%sp),msg_tag%(%a0)
        jmp     reschedule

################################################################
```

```
835  L%MPROBE:
836         mov.w    %sr,%d0              # if we are at hardware priority
837         and.w    &INTMASK,%d0         # when we issue a system call, p
838         bne.w    L%panic_entry        # we'll try for something else,
839
840         movm.l   &0x40c0,-(%sp)
841         jsr      probe                # probe(fcn, physaddr, valuep);
842         add.l    &12,%sp
843         mov.l    %d0,uregs_d0%(%sp)
844         jmp      reschedule
845
846  ###############################################################
847
848
849  L%MPHYS:
850         mov.w    %sr,%d0              # if we are at hardware priority
851         and.w    &INTMASK,%d0         # when we issue a system call, p
852         bne.w    L%panic_entry        # we'll try for something else,
853
854  mphys_loop:
855         mov.l    %d1,-(%sp)
856         mov.l    %a0,-(%sp)
857         mov.l    %a2,-(%sp)
858         jsr      map_physical         # map_physical(running,paddr,nby
859         add.l    &12,%sp
860
861         tst.l    %d0                  # see if map_physical failed
862         beq.w    L%mphys_fail
863         mov.l    uregs_a0%(%sp),%d0
864         cmp.l    %d0,&-1              # are we doing a Getcpages()?
865         bne.b    L%mphys_norm
866         clr.l    %d0
867  L%mphys_norm:
868         and.l    &PAGESIZE-1,%d0
869         add.l    msg_body%(%a0),%d0
870         mov.l    %d0,uregs_d0%(%sp)
871         jsr      a_mlink              # a_mlink(msg, running)
872         jmp      reschedule
873
874  L%mphys_fail:
875         mov.l    uregs_a0%(%sp),%d0
876         cmp.l    %d0,&-1              # are we doing a Getcpages()?
877         bne.w    L%nospace            # do something better later
878         mov.l    uregs_a1%(%sp),%d0   # should we wait for memory?
879         beq.w    L%mphys_nullret
880         mov.b    &ALLOCMEM%,rtpb_k_code%(%a2)
881         mov.l    uregs_d1%(%sp),%d0   # get original size back
882         add.l    &PAGESIZE-1,%d0      # determine number of pages we n
883         lsr.l    &PAGESHIFT,%d0
884         mov.l    %d0,-(%sp)
885         jsr      rt_memwait
886         add.l    &4,%sp
887         mov.l    uregs_d1%(%sp),%d1   # get original size arg
888         mov.l    uregs_a0%(%sp),%a0   # get original paddr (-1)
889         br.w     mphys_loop
890
891  L%mphys_nullret:
892         clr.l    uregs_d0%(%sp)
893         jmp      reschedule
894
895  ###############################################################
896
897
898  L%PHYSMAP:
899         mov.w    %sr,%d0              # if we are at hardware priority
900         and.w    &INTMASK,%d0         # when we issue a system call, p
901         bne.w    L%panic_entry        # we'll try for something else,
902
903         mov.l    %a1,-(%sp)
904         mov.l    %d1,-(%sp)
905         mov.l    %a0,-(%sp)
906         mov.l    %a2,%a1              # running -> a1
907         clr.l    %d1
908         mov.b    rtpb_dspace%(%a1),%d1 # address space to search
909         mov.l    %a0,%d0              # va
910         jsr      va_to_reg
911         mov.l    %d0,-(%sp)
912         beq.b    L%cant_map
913         clr.b    sched_lock+3         # use low byte of long
914         jsr      get_pagelist         # get_pagelist(reg, va, nbytes,
```

```
915             mov.b    &1,sched_lock+3        # use low byte of long
916     L%pm_done:
917             add.l    &16,%sp
918             mov.l    %d0,uregs_d0%(%sp)
919             jmp      reschedule
920
921     L%cant_map:
922             mov.l    &-1,%d0
923             br.b     L%pm_done
924
925     ###############################################################
926
927
928     L%STEALTH:
929             mov.w    %sr,%d0                # if we are at hardware priority
930             and.w    &INTMASK,%d0           # when we issue a system call, p
931             bne.w    L%panic_entry          # we'll try for something else,
932
933             or.b     &NOTHERE,rtpb_flags%(%a2)
934             jmp      reschedule
935
936     ###############################################################
937
938
939     L%TIMESTAMP:
940             mov.w    %sr,%d0                # if we are at hardware priority
941             and.w    &INTMASK, %d0          # when we issue a system call, p
942             bne.w    L%panic_entry          # we'll try for something else,
943
944             jsr      cx_timestamp
945     L%copytime:
946             mov.l    %d0,uregs_d0%(%sp)     # return (secs_at_boot != 0)
947             mov.l    %d1,uregs_d1%(%sp)     # return seconds in d1
948             mov.l    %a1,uregs_a1%(%sp)     # return micro-seconds in a1
949             jmp      reschedule
950
951     ###############################################################
952
953
954     L%MEM_STAT:
955             mov.w    %sr,%d0                # if we are at hardware priority
956             and.w    &INTMASK,%d0           # when we issue a system call, p
957             bne.w    L%panic_entry          # we'll try for something else,
958
959             mov.l    freemem,%d0
960             mov.l    &memory_stats,%a1
961             mov.l    %d0,memstat_freemem%(%a1)
962             mov.l    %d0,memstat_contig%(%a1)
963             mov.l    &sizeof_memstat%,-(%sp) # size of memstat struct
964             mov.l    %a1,-(%sp)
965             mov.l    %a0,-(%sp)             # user vaddr of struct
966             jsr      w_cur_user
967             add.l    &12,%sp
968             jmp      reschedule
969
970     ###############################################################
971
972
973     L%ASYNCIO:
974             mov.w    %sr,%d0                # if we are at hardware priority
975             and.w    &INTMASK,%d0           # when we issue a system call, p
976             bne.w    L%panic_entry          # we'll try for something else,
977
978             mov.l    %a0,%d0
979             jsr      find_header
980             beq.w    L%fakemsg
981             mov.l    %d0,%a1
982             cmp.l    %a2,msg_owner%(%a1)
983             bne.w    L%stolenmsg
984
985             mov.l    %a1,-(%sp)
986             jsr      cx_asyncio
987             add.l    &4,%sp
988             mov.l    %d0,uregs_d0%(%sp)
989             jmp      reschedule             # return(TRUE);
990
991     ###############################################################
992
993
994     L%fail_call:
```

```
995          movm.l   &0xc0c0,-(%sp)            # save a0/a1/d0/d1
996          mov.l    %a1,-(%sp)
997          jsr      dup_msg                   # returns in both a0 and d0
998          add.l    &4,%sp
999          tst.l    %d0
1000         beq.b    L%cantdup
1001         bsr.w    L%call_err
1002 L%cantdup:
1003         movm.l   (%sp)+,&0x0303             # restore a0/a1/d0/d1
1004         rts
1005
1006 L%call_err:
1007         mov.l    %a0,%a1                   # get message to send
1008         or.b     &ERROR,msg_flags%(%a1)
1009         mov.b    &CALL_REFUSAL,msg_xmit_stat%(%a1)
1010         mov.l    &X_REPLY%,%d1
1011         jmp      a_putfor                  # rts in a_putfor gets us back to c
1012
1013 ##################################################################
1014
1015
1016 L%nospace:
1017         mov.l    &X_FREEDMSG,%d0
1018         br.b     L%repfix
1019
1020 L%fakemsg:
1021         mov.l    &X_FAKEMSG,%d0
1022         br.b     L%repfix
1023
1024 L%stolenmsg:
1025         mov.l    &X_STOLENMSG,%d0
1026         br.b     L%repfix
1027
1028 L%allocedmsg:
1029         mov.l    &X_ALLOCEDMSG,%d0
1030         br.b     L%repfix
1031
1032 L%primerr:
1033         mov.l    &X_PRIMITIVE,%d0
1034         br.b     L%repfix
1035
1036 L%ptrerr:
1037         mov.l    &X_POINTER,%d0
1038         br.b     L%repfix
1039
1040 L%esrerr:
1041         mov.l    &X_BADESR,%d0
1042         br.b     L%repfix
1043
1044 L%lvlerr:
1045         mov.l    &X_LEVEL,%d0
1046 L%repfix:
1047         mov.l    &1,-(%sp)
1048         mov.l    %d0,-(%sp)
1049         jsr      reperr                     # reperr(soft_exception, 1)
1050         add.l    &8,%sp
1051         jmp      reschedule
1052
1053
1054 L%panic_entry:
1055         jmp      panic_entry
1056
1057 ##################################################################
1058
1059 L%reschedule:
1060         jmp      reschedule
```

What is claimed is:

1. A method for monitoring communication between processes in a data processing system comprising a plurality of processor hosts, including first, second, and third processor hosts each coupled to a network and a plurality of processes resident on different ones of said processor hosts, wherein said first processor host comprises a message-holding queue for storing information regarding messages transmitted among said processes said information including a copy of messages which are transmitted and identifiers for identifying the source and current location of said messages, said method comprising the steps of:

(a) transmitting a first message from a first process resident on said first processor host to a second process resident on said second processor host;

(b) storing in an entry of said message-holding queue a copy of said first message, a first identifier identifying said first process as the source of said first message, and a second identifier identifying said second processor host as the processor host where said first message currently resides;

(c) transmitting said first message from said second process to a third process resident on said third processor host;

(d) generating a forward notification message by said second processor host, said forward notification message comprising said first identifier and a third identifier identifying said third processor host as the processor host where said first message currently resides; and (e) transmitting said forward notification message from said second processor host to said first processor host.

2. The method recited in claim 1 and further comprising the steps of:

(f) receiving said forward notification message by said first processor host; and (g) responsive to the receipt by said first processor host of said forward notification message, storing said third identifier in said message-holding queue.

3. The method recited in claim 2 and further comprising the steps of:

(h) when said first message is received by said third processor host, generating an additional forward notification message by said third processor host, said additional forward notification message comprising said first identifier and said third identifier identifying said third processor host; and (i) transmitting said additional forward notification message from said third processor host to said first processor host.

4. The method recited in claim 3 and further comprising the steps of:

(j) receiving said additional forward notification message by said first processor host; and (k) responsive to the receipt by said first processor host of said additional forward notification message, storing said third identifier in said message-holding queue.

5. The method recited in claim 4, and further comprising the step of:

(l) repeating steps (c) through (k) in an effort to transmit said first message successively from a process on one processor host to a process on a different processor host until said first message returns to said first processor host, wherein if said first message returns to said first process in said first processor host, deleting said entry in said message-holding queue, and wherein if any processor host on which said first message is resident becomes disconnected from said first processor host or becomes inoperative, i) transmitting a failure message over said network regarding the status of said disconnected or inoperative processor host;

ii) receiving said failure message by said first processor host;

iii) dequeuing said copy of said first message from said message-holding queue by said first processor host;

iv) transmitting said first message by said first processor host to a process on one of said processor hosts; and v) repeating steps (b) through (k) in an effort to transmit said first message successively from a process on one processor host to a process on a different processor host until said first message returns to said first processor host.

6. The method recited in claim 4, and further comprising the step of:

(l) repeating steps (c) through (k) in an effort to transmit said first message successively from a process on one processor host to a process on a different processor host until said first message returns to said first processor host, wherein if said first message returns to said first process in said first processor host, deleting said entry in said message-holding queue, and wherein if any process becomes inactive after receiving said first message and before transmitting said first message to a process located on a different processor host, i) transmitting a failure message over said network regarding the status of said inactive process;

ii) receiving said failure message by said first processor host;

iii) dequeuing said copy of said first message from said message-holding queue by said first processor host;

iv) transmitting said first message by said first processor host to a process on one of said processor hosts: and v) repeating steps (b) through (k) in an effort to transmit said first message successively from a process on one processor host to a process on a different processor host until said first message returns to said first processor host.

7. The method recited in claim 4, and further comprising the step of:

(l) repeating steps (c) through (k) in an effort to transmit said first message successively from a process on one processor host to a process on a different processor host until said first message returns to said first processor host, wherein if said first message returns to said first process in said first processor host, deleting said entry in said message-holding queue, and wherein if any process is unable to transmit said first message to a process located on a different processor host, i) transmitting a failure message over said network regarding the status of said incapacitated process;

ii) receiving said failure message by said first processor host;

iii) dequeuing said copy of said first message from said message-holding queue by said first processor host;

iv) transmitting said first message by said first processor host to one of said processor hosts; and v) repeating steps (b) through (k) in an effort to transmit said first message successively from a process on one processor host to a process on a different processor host until said first message returns to said first processor host.

* * * * *